US012754906B2

(12) United States Patent
Kulkarni et al.

(10) Patent No.: US 12,754,906 B2
(45) Date of Patent: Oct. 6, 2026

(54) NATURAL LANGUAGE TO QUERY LANGUAGE TRANSFORMATION

(71) Applicant: ThoughtSpot, Inc., Mountain View, CA (US)

(72) Inventors: Pankaj Kulkarni, Bangalore (IN); Akshay Mehra, Bengaluru (IN); Alok Yadav, New Delhi (IN); Anurag Tomer, Ghaziabad (IN); Kedar Milind Kulkarni, Bangalore (IN)

(73) Assignee: ThoughtSpot, Inc., Mountain View, CA (US)

( * ) Notice: Subject to any disclaimer, the term of this patent is extended or adjusted under 35 U.S.C. 154(b) by 289 days.

(21) Appl. No.: 18/587,079

(22) Filed: Feb. 26, 2024

(65) Prior Publication Data

US 2024/0303235 A1 Sep. 12, 2024

Related U.S. Application Data

(60) Provisional application No. 63/489,176, filed on Mar. 8, 2023.

(51) Int. Cl.
*G06F 17/27* (2006.01)
*G06F 16/2452* (2019.01)

(52) U.S. Cl.
CPC .............................. *G06F 16/24522* (2019.01)

(58) Field of Classification Search
CPC ........... G06F 16/3329; G06F 16/24522; G06F 16/242; G06F 16/245; G06F 16/2452; G06F 16/2453; G06F 16/24575; G06F 16/3325; G06F 16/3338; G06F 16/953; G06F 16/2433; G06F 16/24534; G06F 16/367;

(Continued)

(56) References Cited

U.S. PATENT DOCUMENTS

| | | | | |
|---|---|---|---|---|
| 11,960,500 B1 * | 4/2024 | Sboychakova | ......... | G06F 40/20 |
| 2023/0177024 A1 * | 6/2023 | Anand | .................. | G06N 5/022 |
| | | | | 707/791 |
| 2024/0311575 A1 * | 9/2024 | Baeuml | .................. | G06N 20/00 |

(Continued)

OTHER PUBLICATIONS

OpenAI FAQ, "What are tokens and how to count them?", retrieved on Feb. 12, 2024 from https://help.openai.com/en/ articles/4936856-what-are-tokens-and-how-to-count-them, 7 pgs.

(Continued)

*Primary Examiner* — Michael Ortiz-Sanchez
(74) *Attorney, Agent, or Firm* — Young Basile Hanlon & MacFarlance, P.C.

(57) ABSTRACT

Obtaining artificial data analysis request data includes obtaining triggering event data including at least one primary data source identifier, obtaining large language model input data for obtaining the artificial data analysis request, obtaining large language model generated data output by a large language model in response to the large language model input data, wherein the large language model generated data includes at least one candidate artificial data analysis request tuple, and validating the large language model generated data, wherein validating the large language model generated data includes validating the at least one candidate artificial data analysis request tuple in accordance with a defined data-analytics grammar implemented by the data access and analysis system.

20 Claims, 7 Drawing Sheets

(58) Field of Classification Search
CPC ...... G06N 20/00; G06N 3/0475; G06N 3/044; G06N 3/042
See application file for complete search history.

(56) References Cited

U.S. PATENT DOCUMENTS

| | | | | |
|---|---|---|---|---|
| 2024/0362208 | A1* | 10/2024 | Naufel | G06F 16/243 |
| 2024/0419835 | A1* | 12/2024 | Karlberg | G06F 16/9024 |

OTHER PUBLICATIONS

Karimi, "Beam Search Algorithm", May 17, 2023, retrieved Feb. 12, 2024 from https://www.baeldung.com/cs/beam-search, 7 pgs.
Manning et al., Introduction to Information Retrieval: Tokenization, Cambridge University Press. 2008, retrieved Feb. 12, 2024 from https://nlp.stanford.edu/IR-book/html/htmledition/tokenization-1.html, 3 pgs.
OpenAI, "Models", retrieved Feb. 12, 2024 from https://platform.openai.com/docs/models/davinci, 9 pgs.
General Data Protectuion Regulation, Checklist, retrieved Feb. 12, 2024 from https://gdpr.eu/checklist/, 4 pgs.
DBPal: An End-to-end Neural Natural Language Interface for Databases; Prasetya Utama et al.; Apr. 2, 2018; 12 pages.
DBPal: A Fully Pluggable NL2SQL Training Pipeline; Nathaniel Weir et al.; Jun. 14-19, 2020; pp. 2347-2361; 15 pages total.

* cited by examiner

NATURAL LANGUAGE TO QUERY LANGUAGE TRANSFORMATION

CROSS-REFERENCE TO RELATED APPLICATION(S)

This application claims priority to and the benefit of U.S. Provisional Application Patent Ser. No. 63/489,176, filed Mar. 8, 2023, the entire disclosure of which is hereby incorporated by reference.

BACKGROUND

Advances in computer storage and database technology have led to exponential growth in the amount of data being created. Businesses are overwhelmed by the volume of the data stored in their computer systems. Existing database analytic tools are inefficient, costly to utilize, and require substantial configuration and training.

SUMMARY

Disclosed herein are implementations obtaining artificial data analysis request data.

An aspect of the disclosure is a method of obtaining artificial data analysis request data including obtaining, by a data access and analysis system, artificial data analysis request data and outputting at least a portion of the artificial data analysis request data for presenting to a user. Obtaining the artificial data analysis request data may include obtaining triggering event data indicating an occurrence of an event in the data access and analysis system identified in accordance with one or more event definitions in the data access and analysis system, wherein obtaining the triggering event data includes obtaining primary data source data including at least one primary data source identifier and, in response to obtaining the triggering event data, obtaining large language model input data for obtaining the artificial data analysis request data. Obtaining the large language model input data may include obtaining prompt context data. Obtaining the prompt context data may include obtaining data source data including at least one secondary data source identifier associated with the primary data source in accordance with the triggering event data, including the data source data in the prompt context data, obtaining sample values data in accordance with the at least one secondary data source identifier, and including the sample values data in the prompt context data. Obtaining the large language model input data may include including the prompt context data in the large language model input data. Obtaining the artificial data analysis request data may include obtaining large language model generated data output by a large language model in response to the large language model input data, wherein the large language model generated data includes at least one candidate artificial data analysis request tuple, wherein a respective candidate artificial data analysis request tuple includes a large language model generated natural language data portion, a corresponding large language model generated resolved request data portion, and a corresponding large language model generated description data portion. Obtaining the artificial data analysis request data may include validating the large language model generated data, wherein validating the large language model generated data includes validating the at least one candidate artificial data analysis request tuple in accordance with a defined data-analytics grammar implemented by the data access and analysis system.

Another aspect of the disclosure is a non-transitory computer-readable storage medium, comprising executable instructions that, when executed by a processor, facilitate performance of operations, comprising obtaining artificial data analysis request data including obtaining, by a data access and analysis system, artificial data analysis request data and outputting at least a portion of the artificial data analysis request data for presenting to a user. Obtaining the artificial data analysis request data may include obtaining triggering event data indicating an occurrence of an event in the data access and analysis system identified in accordance with one or more event definitions in the data access and analysis system, wherein obtaining the triggering event data includes obtaining primary data source data including at least one primary data source identifier and, in response to obtaining the triggering event data, obtaining large language model input data for obtaining the artificial data analysis request data. Obtaining the large language model input data may include obtaining prompt context data. Obtaining the prompt context data may include obtaining data source data including at least one secondary data source identifier associated with the primary data source in accordance with the triggering event data, including the data source data in the prompt context data, obtaining sample values data in accordance with the at least one secondary data source identifier, and including the sample values data in the prompt context data. Obtaining the large language model input data may include including the prompt context data in the large language model input data. Obtaining the artificial data analysis request data may include obtaining large language model generated data output by a large language model in response to the large language model input data, wherein the large language model generated data includes at least one candidate artificial data analysis request tuple, wherein a respective candidate artificial data analysis request tuple includes a large language model generated natural language data portion, a corresponding large language model generated resolved request data portion, and a corresponding large language model generated description data portion. Obtaining the artificial data analysis request data may include validating the large language model generated data, wherein validating the large language model generated data includes validating the at least one candidate artificial data analysis request tuple in accordance with a defined data-analytics grammar implemented by the data access and analysis system.

Another aspect of the disclosure is an apparatus for use in a data access and analysis system. The apparatus includes a non-transitory computer readable medium and a processor configured to execute instructions stored on the non-transitory computer readable medium to obtain artificial data analysis request data. To obtain the artificial data analysis request data the processor may execute the instructions to obtain triggering event data indicating an occurrence of an event in the data access and analysis system identified in accordance with one or more event definitions in the data access and analysis system, wherein to obtain the triggering event data the processor executes the instructions to obtain primary data source data that includes at least one primary data source identifier. To obtain the artificial data analysis request data the processor may execute the instructions to, in response to the triggering event data, obtain large language model input data for obtaining the artificial data analysis request data. To obtain the large language model input data the processor may execute the instructions to obtain prompt context data. To obtain the prompt context data the processor may execute the instructions to obtain data source data that includes at least one secondary data source identifier associated with the primary data source in accordance with the triggering event data, include the data source data in the prompt context data, obtain sample values data in accordance with the at least one secondary data source identifier, and include the sample values data in the prompt context data. To obtain the large language model input data the processor may execute the instructions to include the prompt context data in the large language model input data. To obtain the artificial data analysis request data the processor may execute the instructions to obtain large language model generated data output by a large language model in response to the large language model input data, wherein the large language model generated data includes at least one candidate artificial data analysis request tuple, wherein a respective candidate artificial data analysis request tuple includes a large language model generated natural language data portion, a corresponding large language model generated resolved request data portion, and a corresponding large language model generated description data portion. To obtain the artificial data analysis request data the processor may execute the instructions to validate the large language model generated data, wherein to validate the large language model generated data the processor executes the instructions to validate the at least one candidate artificial data analysis request tuple in accordance with a defined data-analytics grammar implemented by the data access and analysis system. The processor may execute the instructions to output at least a portion of the artificial data analysis request data for presentation to a user.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
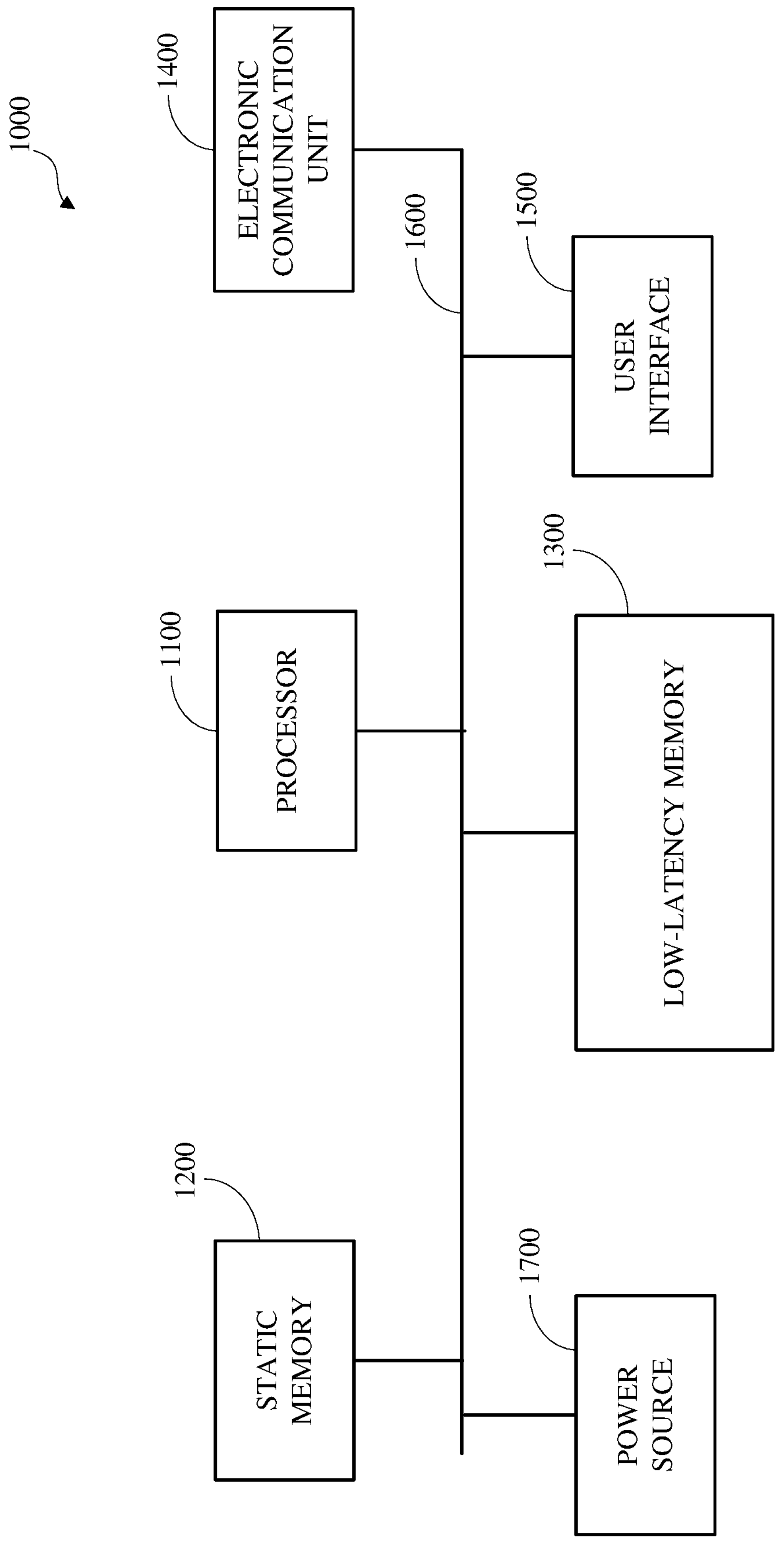
FIG. 1 is a block diagram of an example of a computing device.

Businesses and other organizations store large amounts of data, such as business records, transaction records, and the like, in data storage systems, such as relational database systems that store data as records, or rows, having values, or fields, corresponding to respective columns in tables that can be interrelated using key values. Database structures are often normalized or otherwise organized to maximize data density and to maximize transactional data operations at the expense of increased complexity and reduced accessibility for analysis. Individual records and tables may have little or no utility without substantial correlation, interpretation, and analysis. The complexity of these data structures and systems, the large volumes of data that can be stored therein, and the processing of such data and requests to access such data, result in high utilization of system resources, such as computational and communications resources, and limit the accessibility and the utility of the systems and data stored therein.

To improve the accessibility and utility of these systems, and the data stored therein, system interfaces may be implemented. For example, a database, or a database management system, may implement a defined structured query language and one or more interfaces for obtaining, processing, and responding to code expressed in accordance with the defined structured query language. In another example, a system may implement one or more interfaces, such as graphical user interfaces or application programming interfaces, which may be utilized for specific, narrowly defined, purposes.

Implementing and utilizing such systems and interfaces may inefficiently utilize system resources, increase risk with respect to performance, reliability, security, and accuracy, and limit access to and the use of the data. Furthermore, the complexity of the data structures, and the large volume of the data (e.g., millions or billions of rows) stored therein may render access to or the use of some data impracticable or impossible to achieve by the human mind using the tools that are available for accessing these systems.

The data access and analysis system described herein improves the efficiency with which system resources are utilized to access and use data, reduces the risks associated with the access and use of data, and increases access to and the utility of the data. For example, the data access and analysis system described herein indexes data to improve the efficiency, accuracy, and expressibility of obtaining and processing user input with respect to accessing and using the data, such as by implementing predictive and generative input techniques. In another example, aspects of the data access and analysis system described herein are implemented in a clustered or distributed computing configuration to improve performance, reliability, and security. In another example, the data access and analysis system described herein improves the efficiency with which system resources are utilized to access and use data by optimizing the generation and execution of data queries by a data source, such as an internal database of the data access and analysis system or an external database accessible by the data access and analysis system.

Natural language input, such as text, or string, input included in data expressing usage intent, may be transformed, or resolved, to obtain, or generate, a representation thereof, such as a resolved request, which may be, or may include, an ordered sequence of tokens, in accordance with a defined data-analytics grammar, which may include using natural language processing, which may include using one or more machine learning, or artificial intelligence, models, such as one or more large language models, such as one or more generative pre-trained transformer (GPT) models. Obtaining the representation of natural language input in accordance with the defined data-analytics grammar may include obtaining, from the large language model, a representation, of the natural language input, expressed in accordance with a defined structured query language, and obtaining the representation of natural language input in accordance with the defined data-analytics grammar by transforming the representation, of the natural language input, expressed in accordance with the defined structured query language. The representation of natural language input in accordance with the defined data-analytics grammar may be automatically transformed to obtain a representation thereof in accordance with a defined structured query language associated with, such as implemented by, a data source, such as a database.

The use of natural language processing of natural language input using one or more large language models reduces the resource utilization and increases accuracy associated human-machine interactions for obtaining, processing, or both, manual input to obtain equivalent results, such as to safely and securely explore, interact, analyze, and interrogate data, automatically generate narratives to explain insights, and augment data modeling through automatically generated descriptions and synonyms. Natural language processing of natural language input using one or more large language models may include accessing previously generated analytical objects, automatically generating insights, automatically generating visualizations, automatically generating narratives to explain insights, accessing and interrogating one or more data models, and the like.

The representation of the natural language input obtained from, or using, the large language model, or another artificial intelligence or machine learning model, the resolved request obtained therefrom, or both, may suboptimally, inaccurately, or both, express the natural language input. The data access and analysis system described herein may obtain demonstration data, which may be, or include, user input data. The demonstration data, or validated resolved request data, may include data indicating whether the representation of the natural language input obtained from, or using, the large language model, or the resolved request obtained therefrom, accurately or inaccurately (or suboptimally), expresses or represents the natural language input in the data access and analysis system. The demonstration data, or validated resolved request data, may include data indicating revisions of one or more portions of the resolved request, the representation of the natural language input obtained from, or using, the large language model, or both. To further improve the efficiency, accuracy, and expressibility, of obtaining and processing user input with respect to accessing and using the data, such as by implementing predictive and generative input techniques, the data access and analysis system described herein may use the validated resolved request data to automatically improve other representations, of other natural language input, obtained from, or using, the large language model, the resolved requests obtained therefrom, or both.

FIG. 1 is a block diagram of an example of a computing device 1000. One or more aspects of this disclosure may be implemented using the computing device 1000. The computing device 1000 includes a processor 1100, static memory 1200, low-latency memory 1300, an electronic communication unit 1400, a user interface 1500, a bus 1600, and a power source 1700. Although shown as a single unit, any one or more element of the computing device 1000 may be integrated into any number of separate physical units. For example, the low-latency memory 1300 and the processor 1100 may be integrated in a first physical unit and the user interface 1500 may be integrated in a second physical unit. Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may include a cache, or cache memory, for internal storage of operating data or instructions. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the static memory 1200, the low-latency memory 1300, the electronic communication unit 1400, the user interface 1500, the bus 1600, the power source 1700, or any combination thereof. The processor may execute, which may include controlling, such as by sending electronic signals to, receiving electronic signals from, or both, the static memory 1200, the low-latency memory 1300, the electronic communication unit 1400, the user interface 1500, the bus 1600, the power source 1700, or any combination thereof to execute, instructions, programs, code, applications, or the like, which may include executing one or more aspects of an operating system, and which may include executing one or more instructions to perform one or more aspects described herein, alone or in combination with one or more other processors.

The static memory 1200 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the static memory 1200 may be implemented as multiple logical or physical units.

The static memory 1200 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The low-latency memory 1300 is coupled to the processor 1100 via the bus 1600 and may include any storage medium with low-latency data access including, for example, DRAM modules such as DDR SDRAM, Phase-Change Memory (PCM), flash memory, or a solid-state drive. Although shown as a single block in FIG. 1, the low-latency memory 1300 may be implemented as multiple logical or physical units. Other configurations may be used. For example, low-latency memory 1300, or a portion thereof, and processor 1100 may be combined, such as by using a system on a chip design.

The low-latency memory 1300 (e.g., a non-transitory computer readable medium) may store executable instructions or data, such as application data for low-latency access by the processor 1100. The executable instructions may include, for example, one or more application programs that may be executed by the processor 1100 (e.g., to facilitate performance of operations). The executable instructions may be organized into programmable modules or algorithms, functional programs, codes, code segments, and/or combinations thereof to perform various functions described herein.

The low-latency memory 1300 may be used to store data that is analyzed or processed using the systems or methods described herein. For example, storage of some or all data in low-latency memory 1300 instead of static memory 1200 may improve the execution speed of the systems and methods described herein by permitting access to data more quickly by an order of magnitude or greater (e.g., nanoseconds instead of microseconds).

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE), or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active-matrix organic light emitting diode (AMOLED), or other suitable display. In some implementations, the user interface 1500, or a portion thereof, may be part of another computing device (not shown). For example, a physical user interface, or a portion thereof, may be omitted from the computing device 1000 and a remote or virtual interface may be used, such as via the electronic communication unit 1400.

The bus 1600 is coupled to the static memory 1200, the low-latency memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 1000.

Figure 2:
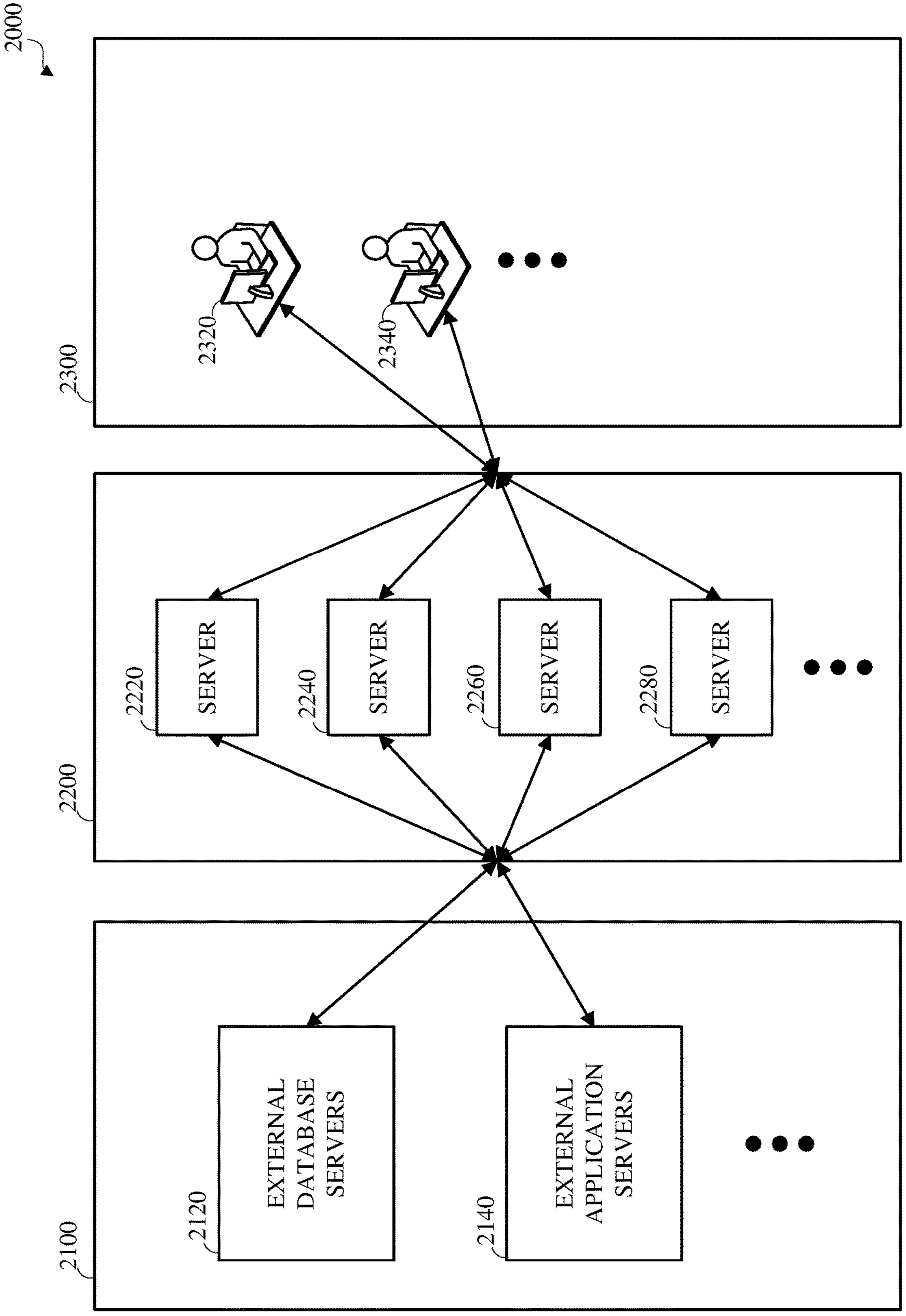
FIG. 2 is a block diagram of an example of a computing system.

FIG. 2 is a block diagram of an example of a computing system 2000. As shown, the computing system 2000 includes an external data source portion 2100, an internal database analysis portion 2200, and a system interface portion 2300. The computing system 2000 may include other elements not shown in FIG. 2, such as computer network elements.

The external data source portion 2100 may be associated with, such as controlled by, an external person, entity, or organization (second party). The internal database analysis portion 2200 may be associated with, such as created by or controlled by, a person, entity, or organization (first party). The system interface portion 2300 may be associated with, such as created by or controlled by, the first party and may be accessed by the first party, the second party, third parties, or a combination thereof, such as in accordance with access and authorization permissions and procedures.

The external data source portion 2100 is shown as including external database servers 2120 and external application servers 2140. The external data source portion 2100 may include other elements not shown in FIG. 2. The external data source portion 2100 may include external computing devices, such as the computing device 1000 shown in FIG. 1, which may be used by or accessible to the external person, entity, or organization (second party) associated with the external data source portion 2100, including but not limited to external database servers 2120 and external application servers 2140. The external computing devices may include data regarding the operation of the external person, entity, or organization (second party) associated with the external data source portion 2100.

The external database servers 2120 may be one or more computing devices configured to store data in a format and schema determined externally from the internal database analysis portion 2200, such as by a second party associated with the external data source portion 2100, or a third party. For example, the external database server 2120 may use a relational database and may include a database catalog with a schema. In some embodiments, the external database server 2120 may include a non-database data storage structure, such as a text-based data structure, such as a comma separated variable structure or an extensible markup language formatted structure or file. For example, the external database servers 2120 can include data regarding the production of materials by the external person, entity, or organization (second party) associated with the external data source portion 2100, communications between the external person, entity, or organization (second party) associated with the external data source portion 2100 and third parties, or a combination thereof. Other data may be included. The external database may be a structured database system, such as a relational database operating in a relational database management system (RDBMS), which may be an enterprise database. In some embodiments, the external database may be an unstructured data source. The external data may include data or content, such as sales data, revenue data, profit data, tax data, shipping data, safety data, sports data, health data, meteorological data, or the like, or any other data, or combination of data, that may be generated by or associated with a user, an organization, or an enterprise and stored in a database system. For simplicity and clarity, data stored in or received from the external data source portion 2100 may be referred to herein as enterprise data.

The external application server 2140 may include application software, such as application software used by the external person, entity, or organization (second party) associated with the external data source portion 2100. The external application server 2140 may include data or metadata relating to the application software.

The external database servers 2120, the external application servers 2140, or both, shown in FIG. 2 may represent logical units or devices that may be implemented on one or more physical units or devices, which may be controlled or operated by the first party, the second party, or a third party.

The external data source portion 2100, or aspects thereof, such as the external database servers 2120, the external application servers 2140, or both, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

The internal database analysis portion 2200 is shown as including servers 2220, 2240, 2260, and 2280. The servers 2220, 2240, 2260, and 2280 may be computing devices, such as the computing device 1000 shown in FIG. 1. Although four servers 2220, 2240, 2260, and 2280 are shown in FIG. 2, other numbers, or cardinalities, of servers may be used. For example, the number of computing devices may be determined based on the capability of individual computing devices, the amount of data to be processed, the complexity of the data to be processed, or a combination thereof. Other metrics may be used for determining the number of computing devices.

The internal database analysis portion 2200 may store data, process data, or store and process data. The internal database analysis portion 2200 may include a distributed cluster (not expressly shown) which may include two or more of the servers 2220, 2240, 2260, and 2280. The operation of the distributed cluster, such as the operation of the servers 2220, 2240, 2260, and 2280 individually, in combination, or both, may be managed by a distributed cluster manager. For example, the server 2220 may be the distributed cluster manager. In another example, the distributed cluster manager may be implemented on another computing device (not shown). The data and processing of the distributed cluster may be distributed among the servers 2220, 2240, 2260, and 2280, such as by the distributed cluster manager.

Enterprise data from the external data source portion 2100, such as from the external database server 2120, the external application server 2140, or both may be imported into the internal database analysis portion 2200. The external database server 2120, the external application server 2140, or both may be one or more computing devices and may communicate with the internal database analysis portion 2200 via electronic communication. The imported data may be distributed among, processed by, stored on, or a combination thereof, one or more of the servers 2220, 2240, 2260, and 2280. Importing the enterprise data may include importing or accessing the data structures of the enterprise data. Importing the enterprise data may include generating internal data, internal data structures, or both, based on the enterprise data. The internal data, internal data structures, or both may accurately represent and may differ from the enterprise data, the data structures of the enterprise data, or both. In some implementations, enterprise data from multiple external data sources may be imported into the internal database analysis portion 2200. For simplicity and clarity, data stored or used in the internal database analysis portion 2200 may be referred to herein as internal data. For example, the internal data, or a portion thereof, may represent, and may be distinct from, enterprise data imported into or accessed by the internal database analysis portion 2200.

The system interface portion 2300 may include one or more client devices 2320, 2340. The client devices 2320, 2340 may be computing devices, such as the computing device 1000 shown in FIG. 1. For example, one of the client devices 2320, 2340 may be a desktop or laptop computer and the other of the client devices 2320, 2340 may be a mobile device, smartphone, or tablet. One or more of the client devices 2320, 2340 may access the internal database analysis portion 2200. For example, the internal database analysis portion 2200 may provide one or more services, application interfaces, or other electronic computer communication interfaces, such as a web site, and the client devices 2320, 2340 may access the interfaces provided by the internal database analysis portion 2200, which may include accessing the internal data stored in the internal database analysis portion 2200.

In an example, one or more of the client devices 2320, 2340 may send a message or signal indicating a request for data, which may include a request for data analysis, to the internal database analysis portion 2200. The internal database analysis portion 2200 may receive and process the request, which may include distributing the processing among one or more of the servers 2220, 2240, 2260, and 2280, may generate a response to the request, which may include generating or modifying internal data, internal data structures, or both, and may output the response to the client device 2320, 2340 that sent the request. Processing the request may include accessing one or more internal data indexes, an internal database, or a combination thereof. The client device 2320, 2340 may receive the response, including the response data or a portion thereof, and may store, output, or both, the response, or a representation thereof, such as a representation of the response data, or a portion thereof, which may include presenting the representation via a user interface on a presentation device of the client device 2320, 2340, such as to a user of the client device 2320, 2340.

The system interface portion 2300, or aspects thereof, such as one or more of the client devices 2320, 2340, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

Figure 3:
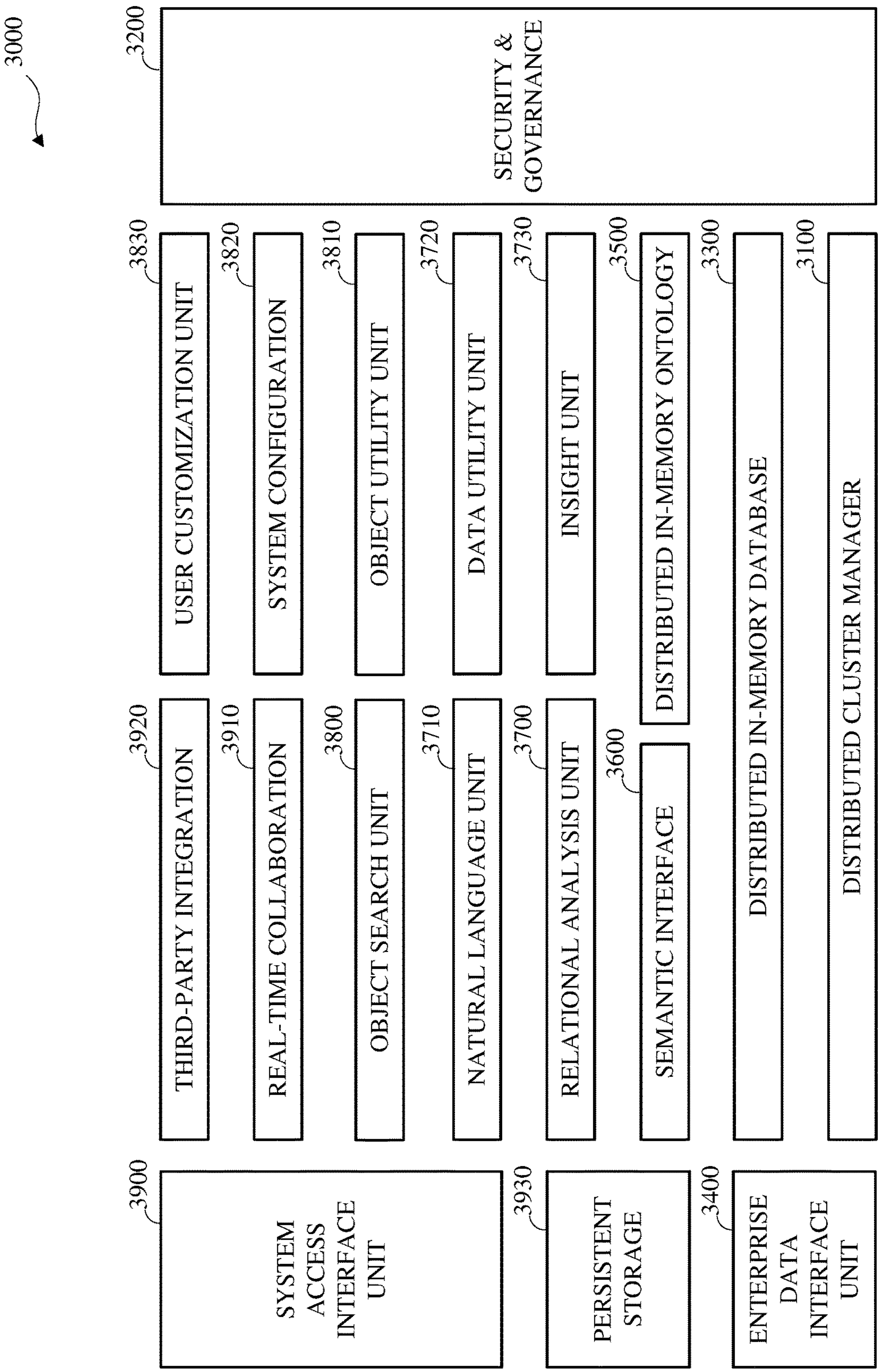
FIG. 3 is a block diagram of an example of a low-latency data access and analysis system.

FIG. 3 is a block diagram of an example of a low-latency data access and analysis system 3000. The low-latency data access and analysis system 3000, or aspects thereof, may be similar to the internal database analysis portion 2200 shown in FIG. 2, except as described herein or otherwise clear from context. The low-latency data access and analysis system 3000, or aspects thereof, may be implemented on one or more computing devices, such as servers 2220, 2240, 2260, and 2280 shown in FIG. 2, which may be in a clustered or distributed computing configuration. As used herein, the terms "low-latency data access and analysis system," "low-latency data analysis system," and "low-latency database analysis system" indicate a computer implemented system, such as the low-latency data access and analysis system 3000 shown in FIG. 3, that obtains, stores, organizes, processes, automatically analyzes, and outputs data and visualizations thereof.

The low-latency data access and analysis system 3000, which may be a low-latency database analysis system, may store and maintain the internal data, or a portion thereof, such as low-latency data, in a low-latency memory device, such as the low-latency memory 1300 shown in FIG. 1, or any other type of data storage medium or combination of data storage devices with relatively fast (low-latency) data access, organized in a low-latency data structure. In some embodiments, the low-latency data access and analysis system 3000 may be implemented as one or more logical devices in a cloud-based configuration optimized for automatic database analysis.

As shown, the low-latency data access and analysis system 3000 includes a distributed cluster manager 3100, a security and governance unit 3200, a distributed in-memory database 3300, an enterprise data interface unit 3400, a distributed in-memory ontology unit 3500, a semantic interface unit 3600, a relational analysis unit 3700, a natural language processing unit 3710, a data utility unit 3720, an insight unit 3730, an object search unit 3800, an object utility unit 3810, a system configuration unit 3820, a user customization unit 3830, a system access interface unit 3900, a real-time collaboration unit 3910, a third-party integration unit 3920, and a persistent storage unit 3930, which may be collectively referred to as the components of the low-latency data access and analysis system 3000.

Although not expressly shown in FIG. 3, one or more of the components of the low-latency data access and analysis system 3000 may be implemented on one or more operatively connected physical or logical computing devices, such as in a distributed cluster computing configuration, such as the internal database analysis portion 2200 shown in FIG. 2. Although shown separately in FIG. 3, one or more of the components of the low-latency data access and analysis system 3000, or respective aspects thereof, may be combined or otherwise organized.

The low-latency data access and analysis system 3000 may include different, fewer, or additional components not shown in FIG. 3. The aspects or components implemented in an instance of the low-latency data access and analysis system 3000 may be configurable. For example, the insight unit 3730 may be omitted or disabled. One or more of the components of the low-latency data access and analysis system 3000 may be implemented in a manner such that aspects thereof are divided or combined into various executable modules or libraries in a manner which may differ from that described herein.

The low-latency data access and analysis system 3000 may implement an application programming interface (API), which may monitor, receive, or both, input signals or messages from external devices and systems, client systems, process received signals or messages, transmit corresponding signals or messages to one or more of the components of the low-latency data access and analysis system 3000, and output, such as transmit or send, output messages or signals to respective external devices or systems. The low-latency data access and analysis system 3000 may be implemented in a distributed computing configuration.

The distributed cluster manager 3100 manages the operative configuration of the low-latency data access and analysis system 3000. Managing the operative configuration of the low-latency data access and analysis system 3000 may include controlling the implementation of and distribution of processing and storage across one or more logical devices operating on one or more physical devices, such as the servers 2220, 2240, 2260, and 2280 shown in FIG. 2. The distributed cluster manager 3100 may generate and maintain configuration data for the low-latency data access and analysis system 3000, such as in one or more tables, identifying the operative configuration of the low-latency data access and analysis system 3000. For example, the distributed cluster manager 3100 may automatically update the low-latency data access and analysis system configuration data in response to an operative configuration event, such as a change in availability or performance for a physical or logical unit of the low-latency data access and analysis system 3000. One or more of the component units of low-latency data access and analysis system 3000 may access the data analysis system configuration data, such as to identify intercommunication parameters or paths.

The security and governance unit 3200 may describe, implement, enforce, or a combination thereof, rules and procedures for controlling access to aspects of the low-latency data access and analysis system 3000, such as the internal data of the low-latency data access and analysis system 3000 and the features and interfaces of the low-latency data access and analysis system 3000. The security and governance unit 3200 may apply security at an ontological level to control or limit access to the internal data of the low-latency data access and analysis system 3000, such as to columns, tables, rows, or fields, which may include using row-level security.

Although shown as a single unit in FIG. 3, the distributed in-memory database 3300 may be implemented in a distributed configuration, such as distributed among the servers 2220, 2240, 2260, and 2280 shown in FIG. 2, which may include multiple in-memory database instances. Each in-memory database instance may utilize one or more distinct resources, such as processing or low-latency memory resources, that differ from the resources utilized by the other in-memory database instances. In some embodiments, the in-memory database instances may utilize one or more shared resources, such as resources utilized by two or more in-memory database instances.

The distributed in-memory database 3300 may generate, maintain, or both, a low-latency data structure and data stored or maintained therein (low-latency data). The low-latency data may include principal data, which may represent enterprise data, such as enterprise data imported from an external enterprise data source, such as the external data source portion 2100 shown in FIG. 2. In some implementations, the distributed in-memory database 3300 may include system internal data representing one or more aspects, features, or configurations of the low-latency data access and analysis system 3000. The distributed in-memory database 3300 and the low-latency data stored therein, or a portion thereof, may be accessed using commands, messages, or signals in accordance with a defined structured query language associated with, such as implemented by, the distributed in-memory database 3300.

The low-latency data, or a portion thereof, may be organized as tables in the distributed in-memory database 3300. A table may be a data structure to organize or group the data or a portion thereof, such as related or similar data. A table may have a defined structure. For example, each table may define or describe a respective set of one or more columns.

A column may define or describe the characteristics of a discrete aspect of the data in the table. For example, the definition or description of a column may include an identifier, such as a name, for the column within the table, and one or more constraints, such as a data type, for the data corresponding to the column in the table. The definition or description of a column may include other information, such as a description of the column. The data in a table may be accessible or partitionable on a per-column basis. The set of tables, including the column definitions therein, and information describing relationships between elements, such as tables and columns, of the database may be defined or described by a database schema or design. The cardinality of columns of a table, and the definition and organization of the columns, may be defined by the database schema or design. Adding, deleting, or modifying a table, a column, the definition thereof, or a relationship or constraint thereon, may be a modification of the database design, schema, model, or structure.

The low-latency data, or a portion thereof, may be stored in the database as one or more rows or records in respective tables. Each record or row of a table may include a respective field or cell corresponding to each column of the table. A field may store a discrete data value. The cardinality of rows of a table, and the values stored therein, may be variable based on the data. Adding, deleting, or modifying rows, or the data stored therein may omit modification of the database design, schema, or structure. The data stored in respective columns may be identified or defined as a measure data, attribute data, or enterprise ontology data (e.g., metadata).

Measure data, or measure values, include quantifiable or additive numeric values, such as integer or floating-point values, which may include numeric values indicating sizes, amounts, degrees, or the like. A column defined as representing measure values may be referred to herein as a measure or fact. A measure may be a property on which quantitative operations (e.g., sum, count, average, minimum, maximum) may be performed to calculate or determine a result or output.

Attribute data, or attribute values, include non-quantifiable values, such as text or image data, which may indicate names and descriptions, quantifiable values designated, defined, or identified as attribute data, such as numeric unit identifiers, or a combination thereof. A column defined as including attribute values may be referred to herein as an attribute or dimension. For example, attributes may include text, identifiers, timestamps, or the like.

Enterprise ontology data may include data that defines or describes one or more aspects of the database, such as data that describes one or more aspects of the attributes, measures, rows, columns, tables, relationships, or other aspects of the data or database schema. For example, a portion of the database design, model, or schema may be represented as enterprise ontology data in one or more tables in the database.

Distinctly identifiable data in the low-latency data may be referred to herein as a data portion. For example, the low-latency data stored in the distributed in-memory database 3300 may be referred to herein as a data portion, a table from the low-latency data may be referred to herein as a data portion, a column from the low-latency data may be referred to herein as a data portion, a row or record from the low-latency data may be referred to herein as a data portion, a value from the low-latency data may be referred to herein as a data portion, a relationship defined in the low-latency data may be referred to herein as a data portion, enterprise ontology data describing the low-latency data may be referred to herein as a data portion, or any other distinctly identifiable data, or combination thereof, from the low-latency data may be referred to herein as a data portion.

The distributed in-memory database 3300 may create or add one or more data portions, such as a table, may read from or access one or more data portions, may update or modify one or more data portions, may remove or delete one or more data portions, or a combination thereof. Adding, modifying, or removing data portions may include changes to the data model of the low-latency data. Changing the data model of the low-latency data may include notifying one or more other components of the low-latency data access and analysis system 3000, such as by sending, or otherwise making available, a message or signal indicating the change. For example, the distributed in-memory database 3300 may create or add a table to the low-latency data and may transmit or send a message or signal indicating the change to the semantic interface unit 3600.

In some implementations, a portion of the low-latency data may represent a data model of an external enterprise database and may omit the data stored in the external enterprise database, or a portion thereof. For example, prioritized data may be cached in the distributed in-memory database 3300 and the other data may be omitted from storage in the distributed in-memory database 3300, which may be stored in the external enterprise database. In some implementations, requesting data from the distributed in-memory database 3300 may include requesting the data, or a portion thereof, from the external enterprise database.

The distributed in-memory database 3300 may receive one or more messages or signals indicating respective data queries for the low-latency data, or a portion thereof, which may include data queries for modified, generated, or aggregated data generated based on the low-latency data, or a portion thereof. For example, the distributed in-memory database 3300 may receive a data query from the semantic interface unit 3600, such as in accordance with a request for data. The data queries received by the distributed in-memory database 3300 may be agnostic to the distributed configuration of the distributed in-memory database 3300. A data query, or a portion thereof, may be expressed in accordance with the defined structured query language implemented by the distributed in-memory database 3300. In some implementations, a data query, or a portion thereof, may be expressed in accordance with a defined structured query language implemented by a defined database other than the distributed in-memory database 3300, such as an external database. In some implementations, a data query may be included, such as stored or communicated, in a data-query data structure or container.

The distributed in-memory database 3300 may execute or perform one or more queries to generate or obtain response data responsive to the data query based on the low-latency data. Unless expressly described, or otherwise clear from context, descriptions herein of a table in the context of performing, processing, or executing a data query that include accessing, such as reading, writing, or otherwise using, a table, or data from a table, may refer to a table stored, or otherwise maintained, in the distributed in-memory database independently of the data query or may refer to tabular data obtained, such as generated, in accordance with the data query.

The distributed in-memory database 3300 may interpret, evaluate, or otherwise process a data query to generate one or more distributed-queries, which may be expressed in accordance with the defined structured query language. For example, an in-memory database instance of the distributed in-memory database 3300 may be identified as a query coordinator. The query coordinator may generate a query plan, which may include generating one or more distributed-queries, based on the received data-query. The query plan may include query execution instructions for executing one or more queries, or one or more portions thereof, based on the received data-query by the one or more of the in-memory database instances. Generating the query plan may include optimizing the query plan. The query coordinator may distribute, or otherwise make available, the respective portions of the query plan, as query execution instructions, to the corresponding in-memory database instances.

The respective in-memory database instances may receive the corresponding query execution instructions from the query coordinator. The respective in-memory database instances may execute the corresponding query execution instructions to obtain, process, or both, data (intermediate results data) from the low-latency data. The respective in-memory database instances may output, or otherwise make available, the intermediate results data, such as to the query coordinator.

The query coordinator may execute a respective portion of query execution instructions (allocated to the query coordinator) to obtain, process, or both, data (intermediate results data) from the low-latency data. The query coordinator may receive, or otherwise access, the intermediate results data from the respective in-memory database instances. The query coordinator may combine, aggregate, or otherwise process, the intermediate results data to obtain results data.

In some embodiments, obtaining the intermediate results data by one or more of the in-memory database instances may include outputting the intermediate results data to, or obtaining intermediate results data from, one or more other in-memory database instances, in addition to, or instead of, obtaining the intermediate results data from the low-latency data.

The distributed in-memory database 3300 may output, or otherwise make available, the results data to the semantic interface unit 3600.

The enterprise data interface unit 3400 may interface with, or communicate with, an external enterprise data system. For example, the enterprise data interface unit 3400 may receive or access enterprise data from or in an external system, such as an external database. The enterprise data interface unit 3400 may import, evaluate, or otherwise process the enterprise data to populate, create, or modify data stored in the low-latency data access and analysis system 3000. The enterprise data interface unit 3400 may receive, or otherwise access, the enterprise data from one or more external data sources, such as the external data source portion 2100 shown in FIG. 2, and may represent the enterprise data in the low-latency data access and analysis system 3000 by importing, loading, or populating the enterprise data as principal data in the distributed in-memory database 3300, such as in one or more low-latency data structures. The enterprise data interface unit 3400 may implement one or more data connectors, which may transfer data between, for example, the external data source and the distributed in-memory database 3300, which may include altering, formatting, evaluating, or manipulating the data.

The enterprise data interface unit 3400 may receive, access, or generate metadata that identifies one or more parameters or relationships for the principal data, such as based on the enterprise data, and may include the generated metadata in the low-latency data stored in the distributed in-memory database 3300. For example, the enterprise data interface unit 3400 may identify characteristics of the principal data such as, attributes, measures, values, unique identifiers, tags, links, keys, or the like, and may include metadata representing the identified characteristics in the low-latency data stored in the distributed in-memory database 3300. The characteristics of the data can be automatically determined by receiving, accessing, processing, evaluating, or interpreting the schema in which the enterprise data is stored, which may include automatically identifying links or relationships between columns, classifying columns (e.g., using column names), and analyzing or evaluating the data.

Although not shown separately in FIG. 3, the low-latency data access and analysis system 3000 implements a canonical, or system-defined, chronometry. The system-defined chronometry defines the measurement, storage, processing, organization, scale, expression, and representation of time and temporal data in the low-latency database analysis system 3000. For example, the system-defined chronometry may correspond with a Gregorian calendar, or a defined variant thereof. The system-defined chronometry defines one or more chronometric units, which may be nominal, or named, representations of respective temporal intervals. A reference chronometric unit, such as a 'second' chronometric unit, may represent a minimal temporal interval in the low-latency database analysis system. One or more aspects of the system-defined chronometry may be defined by the operating environment of the low-latency database analysis system, such as by a hardware component, an operating system, or a combination thereof. For example, a hardware component, such as a system clock (clock circuit) may define the temporal interval of the reference chronometric unit and an operating system may define one or more other chronometric units with reference to the reference chronometric unit.

The low-latency database analysis system 3000 may define or describe one or more chronometric unit types, such as a 'minute' chronometric unit type, an 'hour' chronometric unit type, a 'day' chronometric unit type, a 'week' chronometric unit type, a 'month' chronometric unit type, a 'quarter' chronometric unit type, a 'year' chronometric unit type, or any other type of chronometric unit. A temporal point may be represented, such as stored or processed, in the low-latency database analysis system as an epoch value, which may be an integer value, such that each temporal point from the contiguous sequence of temporal points that comprises the temporal continuum corresponds with a respective epoch value. A temporal location may be represented in the low-latency database analysis system as an epoch value and may be expressed in the low-latency database analysis system using one or more chronometric units, or respective values thereof. The system-defined chronometry defines respective descriptors, such as a day-of-week-name, month-name, and the like. Data defining or describing the system-defined chronometry may be stored in the low-latency data access and analysis system as a chronometric dataset. In some implementations, the low-latency data access and analysis system may define or describe a domain-specific chronometry that differs from the system-defined chronometry. The chronometric units defined or described by the domain-specific chronometry, except for the reference chronometric unit, may differ from the chronometric units defined or described by the system-defined chronometry. Data defining or describing the domain-specific chronometry may be stored in the low-latency data access and analysis system as a chronometric dataset.

Distinctly identifiable operative data units or structures representing one or more data portions, one or more entities, users, groups, or organizations represented in the internal data, or one or more aggregations, collections, relations, analytical results, visualizations, or groupings thereof, may be represented in the low-latency data access and analysis system 3000 as objects. An object may include a unique identifier for the object, such as a fully qualified name. An object may include a name, such as a displayable value, for the object.

For example, an object may represent a user, a group, an entity, an organization, a privilege, a role, a table, a column, a data relationship, a worksheet, a view, an access context, an answer, an insight, a pinboard, a tag, a comment, a trigger, a defined variable, a data source, an object-level security rule, a row-level security rule, or any other data capable of being distinctly identified and stored or otherwise obtained in the low-latency data access and analysis system 3000. An object may represent or correspond with a logical entity. Data describing an object may include data operatively or uniquely identifying data corresponding to, or represented by, the object in the low-latency data access and analysis system. For example, a column in a table in a database in, or accessible by, the low-latency data access and analysis system may be represented in the low-latency data access and analysis system as an object and the data describing or defining the object may include data operatively or uniquely identifying the column.

A worksheet (worksheet object), or worksheet table, may be a logical table, or a definition thereof, which may be a collection, a subset (such as a subset of columns from one or more tables), or both, of data from one or more data sources, such as columns in one or more tables, such as in the distributed in-memory database 3300, or in an external database. A worksheet, or a definition thereof, may include one or more data organization or manipulation definitions, such as join paths or worksheet-column definitions, which may be user defined. A worksheet may be a data structure that may contain one or more rules or definitions that may define or describe how a respective tabular set of data may be obtained, which may include defining one or more sources of data, such as one or more columns from the distributed in-memory database 3300, or from an external database. A worksheet may be a data source. For example, a worksheet may include references to one or more data sources, such as columns in one or more tables, such as in the distributed in-memory database 3300, or in an external database, and a request for data referencing the worksheet may access the data from the data sources referenced in the worksheet. In some implementations, a worksheet may omit aggregations of the data from the data sources referenced in the worksheet. A worksheet may be processed, or transformed, automatically, which may be similar to transforming a resolved request, or an analytical object, to obtain a data query, as described herein, except as is described herein or as is otherwise clear from context, to generate one or more data queries that may be executed by the corresponding data source to generate data, or content, corresponding to the worksheet.

For example, a worksheet may include one or more tables, or one or more columns thereof, associated with an organizing characteristic, or use case. A worksheet may reduce the complexity of the data model, or data models, storing the data, such as by combining data, using worksheet-specific names, descriptions, or both, of data elements, such as column names. A worksheet may reduce the complexity of the data model, or data models, storing the data, such as by using worksheet-specific classifications, or types, of data elements, such as columns including numeric data. For example, a column including numeric data may be a measure column in the data model and may be used as an attribute column in a worksheet. A worksheet may reduce the complexity of the data model, or data models, storing the data, such as by using worksheet-specific aggregation functions. A worksheet may reduce the complexity of the data model, or data models, storing the data, such as by using worksheet-specific formatting and currency symbols. A worksheet may reduce the complexity of the data model, or data models, storing the data, such as by using worksheet-specific identification of columns that contain geographical data. A worksheet may reduce the complexity of the data model, or data models, storing the data, such as by using worksheet-specific vocabulary, which may include mapping the worksheet-specific vocabulary to data. A worksheet may reduce the complexity of the data model, or data models, storing the data, such as by using worksheet-specific formulas for consistency and governance. A worksheet may reduce the complexity of the data model, or data models, storing the data, such as by using worksheet-specific user or group access to one or more portions or parts of the constituent data. A worksheet may reduce the complexity of the data model, or data models, storing the data, such as by using a worksheet-specific filtered set of data.

An answer (answer object), or report, may represent a defined, such as previously generated, request for data, such as a resolved request. An answer may include information describing a visualization of data responsive to the request for data.

A visualization (visualization object) may be a defined representation or expression of data, such as a visual representation of the data, for presentation to a user or human observer, such as via a user interface. Although described as a visual representation, in some implementations, a visualization may include non-visual aspects, such as auditory or haptic presentation aspects. A visualization may be generated to represent a defined set of data in accordance with a defined visualization type or template (visualization template object), such as in a chart, graph, or tabular form. Example visualization types may include, and are not limited to, choropleths, cartograms, dot distribution maps, proportional symbol maps, contour/isopleth/isarithmic maps, dasymetric map, self-organizing map, timeline, time series, connected scatter plots, Gantt charts, steam graph/theme river, arc diagrams, polar area/rose/circumplex charts, Sankey diagrams, alluvial diagrams, pie charts, histograms, tag clouds, bubble charts, bubble clouds, bar charts, radial bar charts, tree maps, scatter plots, line charts, step charts, area charts, stacked graphs, heat maps, parallel coordinates, spider charts, box and whisker plots, mosaic displays, waterfall charts, funnel charts, or radial tree maps. A visualization template may define or describe one or more visualization parameters, such as one or more color parameters. Visualization data for a visualization may include values of one or more of the visualization parameters of the corresponding visualization template.

A view (view object) may be a logical table, or a definition thereof, which may be a collection, a sub-set, or both, of data from one or more data sources, such as columns in one or more tables, such as in the distributed in-memory database 3300, or in an external database. For example, a view may be generated based on an answer, such as by storing the answer as a view. A view may define or describe a data aggregation. A view may be a data source. For example, a view may include references to one or more data sources, such as columns in one or more tables, such as in the distributed in-memory database 3300, or in an external database, which may include a definition or description of an aggregation of the data from a respective data source, and a request for data referencing the view may access the aggregated data, the data from the unaggregated data sources referenced in the worksheet, or a combination thereof. The unaggregated data from data sources referenced in the view defined or described as aggregated data in the view may be unavailable based on the view. A view may be a materialized view or an unmaterialized view. A request for data referencing a materialized view may obtain data from a set of data previously obtained (view-materialization) in accordance with the definition of the view and the request for data. A request for data referencing an unmaterialized view may obtain data from a set of data currently obtained in accordance with the definition of the view and the request for data.

A pinboard (pinboard object), or dashboard, may be a defined collection or grouping of objects, such as visualizations, answers, or insights. Pinboard data for a pinboard may include information associated with the pinboard, which may be associated with respective objects included in the pinboard.

An access context (access-context object) may be a set or collection of data associated with, such as including, data expressing usage intent, such as a request for data, data responsive to data expressing usage intent, or a discretely related sequence or series of requests for data or other interactions with the low-latency data access and analysis system 3000, and a corresponding data structure for containing such data. For example, data expressing usage intent may be generated by the low-latency data access and analysis system 3000, or a component thereof, such as the system access interface unit 3900, such as in response to input, such as user input, obtained by the low-latency data access and analysis system 3000. In another example, data expressing usage intent may be obtained, received, or otherwise accessed, by the low-latency data access and analysis system 3000, or a component thereof, from an external device or system.

A definition may be a set of data describing the structure or organization of a data portion. For example, in the distributed in-memory database 3300, a column definition may define one or more aspects of a column in a table, such as a name of the column, a description of the column, a datatype for the column, or any other information about the column that may be represented as discrete data.

A data source object may represent a source or repository of data accessible by the low-latency data access and analysis system 3000. A data source object may include data indicating an electronic communication location, such as an address, of a data source, connection information, such as protocol information, authentication information, or a combination thereof, or any other information about the data source that may be represented as discrete data. For example, a data source object may represent a table in the distributed in-memory database 3300, or in an external database, and include data for accessing the table from the database, such as information identifying the database, information identifying a schema within the database, and information identifying the table within the schema within the database. A data source object (external data source object) may represent an external data source. For example, an external data source object may include data indicating an electronic communication location, such as an address, of an external data source, connection information, such as protocol information, authentication information, or a combination thereof, or any other information about the external data source that may be represented as discrete data.

A sticker (sticker object) may be a description of a classification, category, tag, subject area, or other information that may be associated with one or more other objects such that objects associated with a sticker may be grouped, sorted, filtered, or otherwise identified based on the sticker. In the distributed in-memory database 3300 a tag may be a discrete data portion that may be associated with other data portions, such that data portions associated with a tag may be grouped, sorted, filtered, or otherwise identified based on the tag.

The distributed in-memory ontology unit 3500 generates, maintains, or both, information (ontological data) defining or describing the operative ontological structure of the objects represented in the low-latency data access and analysis system 3000, such as in the low-latency data stored in the distributed in-memory database 3300, which may include describing attributes, properties, states, or other information about respective objects and may include describing relationships among respective objects.

Objects may be referred to herein as primary objects, secondary objects, or tertiary objects. Other types of objects may be used.

Primary objects may include objects representing distinctly identifiable operative data units or structures representing one or more data portions in the distributed in-memory database 3300, or another data source in, or accessible by, the low-latency data access and analysis system 3000. For example, primary objects may be data source objects, table objects, column objects, relationship objects, or the like. Primary objects may include worksheets, views, filters, such as row-level-security filters and table filters, variables, or the like. Primary objects may be referred to herein as data objects or queryable objects.

Secondary objects may be objects representing distinctly identifiable operative data units or structures representing analytical data aggregations, collections, analytical results, visualizations, or groupings thereof, such as pinboard objects, answer objects, insights, visualization objects, resolved-request objects, and the like. Secondary objects may be referred to herein as analytical objects.

Tertiary objects may be objects representing distinctly identifiable operative data units or structures representing operational aspects of the low-latency data access and analysis system 3000, such as one or more entities, users, groups, or organizations represented in the internal data, such as user objects, user-group objects, role objects, sticker objects, and the like.

The distributed in-memory ontology unit 3500 may represent the ontological structure, which may include the objects therein, as a graph having nodes and edges. A node may be a representation of an object in the graph structure of the distributed in-memory ontology unit 3500. A node, representing an object, can include one or more components. The components of a node may be versioned, such as on a per-component basis. For example, a node can include a header component, a content component, or both. A header component may include information about the node. A content component may include the content of the node. An edge may represent a relationship between nodes, which may be directional.

In some implementations, the distributed in-memory ontology unit 3500 graph may include one or more nodes, edges, or both, representing one or more objects, relationships or both, corresponding to a respective internal representation of enterprise data stored in an external enterprise data storage unit, wherein a portion of the data stored in the external enterprise data storage unit represented in the distributed in-memory ontology unit 3500 graph is omitted from the distributed in-memory database 3300.

In some embodiments, the distributed in-memory ontology unit 3500 may generate, modify, or remove a portion of the ontology graph in response to one or more messages, signals, or notifications from one or more of the components of the low-latency data access and analysis system 3000. For example, the distributed in-memory ontology unit 3500 may generate, modify, or remove a portion of the ontology graph in response to receiving one or more messages, signals, or notifications from the distributed in-memory database 3300 indicating a change to the low-latency data structure. In another example, the distributed in-memory database 3300 may send one or more messages, signals, or notifications indicating a change to the low-latency data structure to the semantic interface unit 3600 and the semantic interface unit 3600 may send one or more messages, signals, or notifications indicating the change to the low-latency data structure to the distributed in-memory ontology unit 3500.

The distributed in-memory ontology unit 3500 may be distributed, in-memory, multi-versioned, transactional, consistent, durable, or a combination thereof. The distributed in-memory ontology unit 3500 is transactional, which may include implementing atomic concurrent, or substantially concurrent, updating of multiple objects. The distributed in-memory ontology unit 3500 is durable, which may include implementing a robust storage that prevents data loss subsequent to or as a result of the completion of an atomic operation. The distributed in-memory ontology unit 3500 is consistent, which may include performing operations associated with a request for data with reference to or using a discrete data set, which may mitigate or eliminate the risk of inconsistent results.

The distributed in-memory ontology unit 3500 may generate, output, or both, one or more event notifications. For example, the distributed in-memory ontology unit 3500 may generate, output, or both, a notification, or notifications, in response to a change of the distributed in-memory ontology. The distributed in-memory ontology unit 3500 may identify a portion of the distributed in-memory ontology (graph) associated with a change of the distributed in-memory ontology, such as one or more nodes depending from a changed node, and may generate, output, or both, a notification, or notifications indicating the identified relevant portion of the distributed in-memory ontology (graph). One or more aspects of the low-latency data access and analysis system 3000 may cache object data and may receive the notifications from the distributed in-memory ontology unit 3500, which may reduce latency and network traffic relative to systems that omit caching object data or omit notifications relevant to changes to portions of the distributed in-memory ontology (graph).

The distributed in-memory ontology unit 3500 may implement prefetching. For example, the distributed in-memory ontology unit 3500 may predictively, such as based on determined probabilistic utility, fetch one or more nodes, such as in response to access to a related node by a component of the low-latency data access and analysis system 3000.

The distributed in-memory ontology unit 3500 may implement a multi-version concurrency control graph data storage unit. Each node, object, or both, may be versioned. Changes to the distributed in-memory ontology may be reversible. For example, the distributed in-memory ontology may have a first state prior to a change to the distributed in-memory ontology, the distributed in-memory ontology may have a second state subsequent to the change, and the state of the distributed in-memory ontology may be reverted to the first state subsequent to the change, such as in response to the identification of an error or failure associated with the second state.

In some implementations, reverting a node, or a set of nodes, may omit reverting one or more other nodes. In some implementations, the distributed in-memory ontology unit 3500 may maintain a change log indicating a sequential record of changes to the distributed in-memory ontology (graph), such that a change to a node or a set of nodes may be reverted and one or more other changes subsequent to the reverted change may be reverted for consistency.

The distributed in-memory ontology unit 3500 may implement optimistic locking to reduce lock contention times. The use of optimistic locking permits improved throughput of data through the distributed in-memory ontology unit 3500.

The semantic interface unit 3600 may implement procedures and functions to provide a semantic interface between the distributed in-memory database 3300, or an external database, and one or more of the other components of the low-latency data access and analysis system 3000.

The semantic interface unit 3600 may implement ontological data management, data-query generation, authentication and access control, object statistical data collection, or a combination thereof.

Ontological data management may include object lifecycle management, object data persistence, ontological modifications, or the like. Object lifecycle management may include creating one or more objects, reading or otherwise accessing one or more objects, updating or modifying one or more objects, deleting or removing one or more objects, or a combination thereof. For example, the semantic interface unit 3600 may interface or communicate with the distributed in-memory ontology unit 3500, which may store the ontological data, object data, or both, to perform object lifecycle management, object data persistence, ontological modifications, or the like.

For example, the semantic interface unit 3600 may receive, or otherwise access, a message, signal, or notification, such as from the distributed in-memory database 3300, or from an external database, indicating the creation or addition of a data portion, such as a table, in the low-latency data stored in the distributed in-memory database 3300, or in an external database, and the semantic interface unit 3600 may communicate with the distributed in-memory ontology unit 3500 to create an object in the ontology representing the added data portion. The semantic interface unit 3600 may transmit, send, or otherwise make available, a notification, message, or signal to the relational analysis unit 3700 indicating that the ontology has changed.

The semantic interface unit 3600 may receive, or otherwise access, a request message or signal, such as from the relational analysis unit 3700, indicating a request for information describing changes to the ontology (ontological updates request). The semantic interface unit 3600 may generate and send, or otherwise make available, a response message or signal to the relational analysis unit 3700 indicating the changes to the ontology (ontological updates response). The semantic interface unit 3600 may identify one or more data portions for indexing based on the changes to the ontology. For example, the changes to the ontology may include adding a table to the ontology, the table including multiple rows, and the semantic interface unit 3600 may identify each row as a data portion for indexing. The semantic interface unit 3600 may include information describing the ontological changes in the ontological updates response. The semantic interface unit 3600 may include one or more data-query definitions, such as data-query definitions for indexing data queries, for each data portion identified for indexing in the ontological updates response. For example, the data-query definitions may include a sampling data query, which may be used to query the distributed in-memory database 3300, or an external database, for sample data from the added data portion, an indexing data query, which may be used to query the distributed in-memory database 3300, or an external database, for data from the added data portion, or both.

The semantic interface unit 3600 may receive, or otherwise access, internal signals or messages including data expressing usage intent, such as data indicating requests to access or modify the low-latency data stored in the distributed in-memory database 3300 (e.g., a request for data). The request to access or modify the low-latency data received by the semantic interface unit 3600 may include a resolved request (resolved-request data), such as in a resolved-request object, such as a resolved-request object generated by the relational analysis unit 3700. The resolved request data, which may be database and visualization agnostic, may be expressed or communicated as an ordered sequence of tokens, which may represent semantic data.

The resolved-request data may include tokenization binding data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used.

The resolved-request data may include phrasing data indicating phrasing with respect to the sequence of tokens in the resolved request, wherein tokens, such as one or more sequential tokens, are included in a respective phrase. The phrasing data may include phrase type data for respective phrases. For some tokens, or sequences of tokens, the phrasing data may indicate that the sequence of tokens corresponds with a value stored in a data source, such as in a column in a table, wherein the phrasing data includes data uniquely identifying the data source, such as a column identifier.

A token is a unit of data in the low-latency data access and analysis system 3000 that represents, in accordance with one or more defined grammars implemented by the low-latency data access and analysis system 3000, a data portion accessed by or stored in the low-latency data access and analysis system 3000, an operation of the low-latency data access and analysis system 3000, an object represented in the low-latency data access and analysis system 3000, or a class or type of data portion, operation, or object in the low-latency data access and analysis system 3000. A token may be a value (token value), such as a string value, which may be a word, a character, a sequence of characters, a symbol, a combination of symbols, or the like. In some implementations, the token value may express a data pattern that defines or describes values, operations, or objects that the token represents. For example, the data pattern expressed by the token value may identify a data type, such as positive integer, such that positive integer values, or string values that may be represented as positive integer values, may be identified as matching the token. A token may be a defined data structure (token data structure) that includes a token value. A token data structure may include data other than the token value, such as token type data.

The defined grammars implemented by the low-latency data access and analysis system 3000 may define or describe the tokens. The defined grammars implemented by the low-latency data access and analysis system 3000 may define or describe token types or classes, such as ontological tokens, control-word tokens, pattern tokens, literal tokens, chronometric tokens, and a skip token. Other token types may be used.

An ontological token may represent a data portion in the low-latency data access and analysis system, such as an object represented in the low-latency data access and analysis system 3000, or a portion thereof, a table stored in the distributed in-memory database or stored in an external database, a column of a table stored in the distributed in-memory database or stored in an external database, or a value (constituent data) stored in a row and column of a table stored in the distributed in-memory database or stored in an external database. In some grammars implemented by the low-latency data access and analysis system 3000 the ontological tokens may include measure tokens representing measure data portions (measure columns), attribute tokens representing attribute data portions (attribute columns), and value tokens representing the respective values stored in the corresponding measure columns or attribute columns. For example, a worksheet object (analytical object) represented in the low-latency data access and analysis system 3000 may include a column that includes values generated based on values stored in one or more tables in the distributed in-memory database, and an ontological token may represent the column of the worksheet object.

A control-word token may be a character, a symbol, a word, or a defined ordered sequence of characters or symbols, defined or described in one or more grammars of the low-latency data access and analysis system 3000 as having one or more defined grammatical functions, which may be contextual. For example, the control-word token "sum" may be defined or described in one or more grammars of the low-latency data access and analysis system 3000 as indicating an additive aggregation. In another example, the control-word token "top" may be defined or described in one or more grammars of the low-latency data access and analysis system 3000 as indicating a maximal value from an ordered set. In another example, the control-word token "table" may be defined or described in one or more grammars of the low-latency data access and analysis system 3000 as indicating a table stored in the low-latency data access and analysis system 3000 or stored externally and accessed by the low-latency data access and analysis system 3000. The control-word tokens may include operator tokens, such as the equality operator token ("="), delimiter tokens, which may be paired, such as opening and closing brackets ("[", "]"). The control-word tokens may include stop-word tokens, such as "the" or "an".

A pattern token may be a definition or a description of units of data in the low-latency data access and analysis system, which may be expressed as a data type, such as positive integer, defined or described in one or more grammars of the low-latency data access and analysis system 3000.

A literal, or constant, token may include a literal, or constant, value such as "100" or the Boolean value TRUE. The literal, or constant, tokens may include number-word tokens (numerals or named numbers), such as number-word tokens for the positive integers between zero and one million, inclusive, or for the numerator, denominator, or both of fractional values, or combinations thereof. For example, "one hundred twenty-eight and three-fifths".

A chronometric token may represent a chronometric unit, such as a chronometric unit from the system-defined chronometry or a chronometric unit from a domain-specific chronometry defined or described in the low-latency data access and analysis system 3000. The chronometric tokens are automatically generated based on the respective chronometric datasets. For example, chronometric tokens corresponding to the chronometric units for the system-defined chronometry, such as "date", "day", "days", "daily", "week", "weeks", "weekly", "month", "months", "monthly", "quarter", "quarters", "quarterly", "year", "years", "yearly", and the like, may be automatically generated based on the chronometric dataset for the system-defined chronometry.

The skip token may represent discrete data portions, such as respective portions of a string that are unresolvable in accordance with the other tokens defined or described in a respective grammar of the low-latency data access and analysis system 3000.

The relational analysis unit 3700 may automatically generate respective tokens representing the attributes, the measures, the tables, the columns, the values, unique identifiers, tags, links, keys, or any other data portion, or combination of data portions, or a portion thereof.

For example, the relational analysis unit 3700 may tokenize, identify semantics, or both, based on input data, such as input data representing user input, to generate the resolved request. The resolved request may include an ordered sequence of tokens that represent the request for data corresponding to the input data, and may transmit, send, or otherwise make accessible, the resolved request to the semantic interface unit 3600. The semantic interface unit 3600 may process or respond to a received resolved request.

The semantic interface unit 3600 may process or transform the received resolved request, which may be, at least in part, incompatible with the distributed in-memory database 3300, or an external database, to generate one or more corresponding data-queries that are compatible with the distributed in-memory database 3300, or an external database, which may include generating a proto-query representing the resolved request, generating a pseudo-query representing the proto-query, and generating the data query representing the pseudo-query.

The semantic interface unit 3600 may generate an analytical object, such as an answer object, representing the resolved request, which may include representing the data expressing usage intent, such as by representing the request for data indicated by the data expressing usage intent.

The semantic interface unit 3600 may generate a proto-query based on the resolved request. A proto-query, which may be database agnostic, may be structured or formatted in a form, language, or protocol that differs from the defined structured query language of the distributed in-memory database 3300, or the external database. Generating the proto-query may include identifying visualization identification data, such as an indication of a type of visualization, associated with the request for data, and generating the proto-query based on the resolved request and the visualization identification data.

The semantic interface unit 3600 may transform the proto-query to generate a pseudo-query. The pseudo-query, which may be database agnostic, may be structured or formatted in a form, language, or protocol that differs from the defined structured query language of the distributed in-memory database 3300, or the external database. Generating a pseudo-query may include applying a defined transformation, or an ordered sequence of transformations. Generating a pseudo-query may include incorporating row-level security filters in the pseudo-query.

The semantic interface unit 3600 may generate a data query based on the pseudo-query, such as by serializing the pseudo-query. The data query, or a portion thereof, may be structured or formatted using the defined structured query language of the distributed in-memory database 3300. In some implementations, a data query may be structured or formatted using a defined structured query language of another database, such as an external database or data source, which may differ from the defined structured query language of the distributed in-memory database 3300. Generating the data query may include using one or more defined rules for expressing the structure and content of a pseudo-query in the respective defined structured query language.

The semantic interface unit 3600 may communicate, or issue, the data query to the distributed in-memory database 3300, or the external database. In some implementations, processing or responding to a resolved request may include generating and issuing multiple data-queries to the distributed in-memory database 3300, or the external database.

The semantic interface unit 3600 may receive results data from the distributed in-memory database 3300, or the external database, responsive to one or more resolved requests. The semantic interface unit 3600 may process, format, or transform the results data to obtain visualization data. For example, the semantic interface unit 3600 may identify a visualization for representing or presenting the results data, or a portion thereof, such as based on the results data or a portion thereof. For example, the semantic interface unit 3600 may identify a bar chart visualization for results data including one measure and attribute.

Although not shown separately in FIG. 3, the semantic interface unit 3600 may include a data visualization unit. In some embodiments, the data visualization unit may be a distinct unit, separate from the semantic interface unit 3600. In some embodiments, the data visualization unit may be included in the system access interface unit 3900. The data visualization unit, the system access interface unit 3900, or a combination thereof, may generate a user interface, or one or more portions thereof. For example, data visualization unit, the system access interface unit 3900, or a combination thereof, may obtain the results data, such as the visualization data, and may generate user interface elements (visualizations) representing the results data.

The semantic interface unit 3600 may implement object-level security, row-level security, or a combination thereof.

In some implementations, the security and governance unit 3200 may implement, or partially implement, the object-level security, row-level security, or a combination thereof, in combination with the semantic interface unit 3600. Object-level security may include security associated with an object, such as a table, a column, a worksheet, an answer, or a pinboard. The object-level security may include column-level security, which include user-based or group-based access control of columns of data in the low-latency data, the indexes, or both. Row-level security may include user-based or group-based access control of rows of data in the low-latency data, the indexes, or both. The semantic interface unit 3600 may implement one or more authentication procedures, access control procedures, or a combination thereof. The object-level security, row-level security, column-level security, a combination thereof, or a portion thereof, may be represented, expressed, defined, or described as access-control data. The semantic interface unit 3600, or one or more other components of the low-latency data access and analysis system 3000, may control, such as grant, restrict, or prevent, access to one or more features, functions, units of data, or combinations thereof, in accordance with the access-control data. For example, in response to a request for data that includes a user identifier, the semantic interface unit 3600, or one or more other components of the low-latency data access and analysis system 3000, may obtain access-control data for the user identifier and may obtain results data in accordance with the access-control data such that a unit of data, such as a row or a column, that is identified in the access-control data as accessible to the user identifier and is responsive to the request for data is included in the results data and such that a unit of data, such as a row or a column, that is identified in the access-control data as inaccessible to the user identifier, or for which the access-control data omits or excludes corresponding data indicating that the unit of data is accessible to the user identifier, is omitted or excluded from the results data.

The semantic interface unit 3600 may implement one or more user-data integration features. For example, the semantic interface unit 3600 may generate and output a user interface, or a portion thereof, for inputting, uploading, or importing user data, may receive user data, and may import the user data. For example, the user data may be enterprise data.

The semantic interface unit 3600 may implement object statistical data collection. Object statistical data may include, for respective objects, temporal access information, access frequency information, access recency information, access requester information, or the like. For example, the semantic interface unit 3600 may obtain object statistical data as described with respect to the data utility unit 3720, the object utility unit 3810, or both. The semantic interface unit 3600 may send, transmit, or otherwise make available, the object statistical data for data objects to the data utility unit 3720. The semantic interface unit 3600 may send, transmit, or otherwise make available, the object statistical data for analytical objects to the object utility unit 3810.

The semantic interface unit 3600 may implement or expose one or more services or application programming interfaces. For example, the semantic interface unit 3600 may implement one or more services for access by the system access interface unit 3900. In some implementations, one or more services or application programming interfaces may be exposed to one or more external devices or systems.

The semantic interface unit 3600 may generate and transmit, send, or otherwise communicate, one or more external communications, such as e-mail messages, such as periodically, in response to one or more events, or both. For example, the semantic interface unit 3600 may generate and transmit, send, or otherwise communicate, one or more external communications including a portable representation, such as a portable document format representation of one or more pinboards in accordance with a defined schedule, period, or interval. In another example, the semantic interface unit 3600 may generate and transmit, send, or otherwise communicate, one or more external communications in response to input data indicating an express request for a communication. In another example, the semantic interface unit 3600 may generate and transmit, send, or otherwise communicate, one or more external communications in response to one or more defined events, such as the expiration of a recency of access period for a user.

Although shown as a single unit in FIG. 3, the relational analysis unit 3700 may be implemented in a distributed configuration, which may include a primary relational analysis unit instance and one or more secondary relational analysis unit instances.

The relational analysis unit 3700 may generate, maintain, operate, or a combination thereof, one or more indexes, such as one or more of an ontological index, a constituent data index, a control-word index, a numeral index, or a constant index, based on the low-latency data stored in the distributed in-memory database 3300, or the external database, the low-latency data access and analysis system 3000, or both. An index may be a defined data structure, or combination of data structures, for storing tokens, terms, or string keys, representing a set of data from one or more defined data sources in a form optimized for searching. For example, an index may be a collection of index shards. In some implementations, an index may be segmented into index segments and the index segments may be sharded into index shards. In some implementations, an index may be partitioned into index partitions, the index partitions may be segmented into index segments and the index segments may be sharded into index shards.

Generating, or building, an index may be performed to create or populate a previously unavailable index, which may be referred to as indexing the corresponding data, and may include regenerating, rebuilding, or reindexing to update or modify a previously available index, such as in response to a change in the indexed data (constituent data).

The ontological index may be an index of data (ontological data) describing the ontological structure or schema of the low-latency data access and analysis system 3000, the low-latency data stored in the distributed in-memory database 3300, or the external database, or a combination thereof. For example, the ontological index may include data representing the table and column structure of the distributed in-memory database 3300, or the external database. The relational analysis unit 3700 may generate, maintain, or both, the ontological index by communicating with, such as requesting ontological data from, the distributed in-memory ontology unit 3500, the semantic interface unit 3600, or both. Each record in the ontological index may correspond to a respective ontological token, such as a token that identifies a column by name.

The control-word index may be an index of a defined set of control-word tokens. For example, the control-word index may include the control-word token "sum", which may be identified in one or more grammars of the low-latency data access and analysis system 3000 as indicating an additive aggregation. The constant index may be an index of constant, or literal, tokens such as "100" or "true". The numeral index may be an index of number word tokens (or named numbers), such as number word tokens for the positive integers between zero and one million, inclusive.

The constituent data index may be an index of the constituent data values stored in the low-latency data access and analysis system 3000, or the external database, such as in the distributed in-memory database 3300. The relational analysis unit 3700 may generate, maintain, or both, the constituent data index by communicating with, such as requesting data from, the distributed in-memory database 3300, or the external database. For example, the relational analysis unit 3700 may send, or otherwise communicate, a message or signal to the distributed in-memory database 3300 indicating a request to perform an indexing data query, the relational analysis unit 3700 may receive response data from the distributed in-memory database 3300 in response to the requested indexing data query, and the relational analysis unit 3700 may generate the constituent data index, or a portion thereof, based on the response data. For example, the constituent data index may index data objects.

An index shard may be used for token searching, such as exact match searching, prefix match searching, substring match searching, or suffix match searching. Exact match searching may include identifying tokens in the index shard that matches a defined target value. Prefix match searching may include identifying tokens in the index shard that include a prefix, or begin with a value, such as a character or string, that matches a defined target value. Substring match searching may include identifying tokens in the index shard that include a value, such as a character or string, that matches a defined target value. Suffix match searching may include identifying tokens in the index shard that include a suffix, or end with a value, such as a character or string, that matches a defined target value. In some implementations, an index shard may include multiple distinct index data structures. For example, an index shard may include a first index data structure optimized for exact match searching, prefix match searching, and suffix match searching, and a second index data structure optimized for substring match searching. Traversing, or otherwise accessing, managing, or using, an index may include identifying one or more of the index shards of the index and traversing the respective index shards. In some implementations, one or more indexes, or index shards, may be distributed, such as replicated on multiple relational analysis unit instances. For example, the ontological index may be replicated on each relational analysis unit instance.

The relational analysis unit 3700 may receive a request for data from the low-latency data access and analysis system 3000. For example, the relational analysis unit 3700 may receive data expressing usage intent indicating the request for data in response to input, such as user input, obtained via a user interface, such as a user interface generated, or partially generated, by the system access interface unit 3900, which may be a user interface operated on an external device, such as one of the client devices 2320, 2340 shown in FIG. 2. In some implementations, the relational analysis unit 3700 may receive the data expressing usage intent from the system access interface unit 3900 or from the semantic interface unit 3600. For example, the relational analysis unit 3700 may receive or access the data expressing usage intent in a request for data message or signal.

The relational analysis unit 3700 may process, parse, identify semantics, tokenize, or a combination thereof, the request for data to generate a resolved request, which may include identifying a database and visualization agnostic ordered sequence of tokens based on the data expressing usage intent. The data expressing usage intent, or request for data, may include request data, such as resolved-request data, unresolved request data, or a combination of resolved-request data and unresolved request data. The relational analysis unit 3700 may identify the resolved-request data. The relational analysis unit 3700 may identify the unresolved request data and may tokenize the unresolved request data.

Resolved-request data may be request data identified in the data expressing usage intent as resolved-request data. Each resolved-request data portion may correspond with a respective token in the low-latency data access and analysis system 3000. The data expressing usage intent may include information identifying one or more portions of the request data as resolved-request data.

Unresolved request data may be request data identified in the data expressing usage intent as unresolved request data, or request data for which the data expressing usage intent omits information identifying the request data as resolved-request data. Unresolved request data may include text or string data, which may include a character, sequence of characters, symbol, combination of symbols, word, sequence of words, phrase, or the like, for which information, such as tokenization binding data, identifying the text or string data as resolved-request data is absent or omitted from the request data. The data expressing usage intent may include information identifying one or more portions of the request data as unresolved request data. The data expressing usage intent may omit information identifying whether one or more portions of the request data are resolved-request data. The relational analysis unit 3700 may identify one or more portions of the request data for which the data expressing usage intent omits information identifying whether the one or more portions of the request data are resolved-request data as unresolved request data.

For example, the data expressing usage intent may include a request string and one or more indications that one or more portions of the request string are resolved-request data. One or more portions of the request string that are not identified as resolved-request data in the data expressing usage intent may be identified as unresolved request data. For example, the data expressing usage intent may include the request string "example text"; the data expressing usage intent may include information indicating that the first portion of the request string, "example", is resolved-request data; and the data expressing usage intent may omit information indicating that the second portion of the request string, "text", is resolved-request data.

The information identifying one or more portions of the request data as resolved-request data may include tokenization binding data indicating a previously identified token corresponding to the respective portion of the request data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used. In some implementations, the data expressing usage intent may omit the tokenization binding data and may include an identifier that identifies the tokenization binding data.

The relational analysis unit 3700 may implement or access one or more grammar-specific tokenizers, such as a tokenizer for a defined data-analytics grammar or a tokenizer for a natural-language grammar. For example, the relational analysis unit 3700 may implement one or more of a formula tokenizer, a row-level-security tokenizer, a data-analytics tokenizer, or a natural language tokenizer. Other tokenizers may be used. In some implementations, the relational analysis unit 3700 may implement one or more of the grammar-specific tokenizers, or a portion thereof, by accessing another component of the low-latency data access and analysis system 3000 that implements the respective grammar-specific tokenizer, or a portion thereof. For example, the natural language processing unit 3710 may implement the natural language tokenizer and the relational analysis unit 3700 may access the natural language processing unit 3710 to implement natural language tokenization. In another example, the semantic interface 3600, the database, or both, may implement a tokenizer for a grammar for the defined structured query language compatible with or implemented by the database. In some implementations, the low-latency data access and analysis system 3000, such as the semantic interface unit 3600, may implement a tokenizer for a grammar for a defined structured query language compatible with or implemented by an external database.

A tokenizer, such as the data-analytics tokenizer, may parse text or string data (request string), such as string data included in a data expressing usage intent, in a defined read order, such as from left to right, such as on a character-by-character or symbol-by-symbol basis. For example, a request string may include a single character, symbol, or letter, and tokenization may include identifying one or more tokens matching, or partially matching, the input character.

Tokenization may include parsing the request string to identify one or more words or phrases. For example, the request string may include a sequence of characters, symbols, or letters, and tokenization may include parsing the sequence of characters in a defined order, such as from left to right, to identify distinct words or terms and identifying one or more tokens matching the respective words. In some implementations, word or phrase parsing may be based on one or more of a set of defined delimiters, such as a whitespace character, a punctuation character, or a mathematical operator.

The relational analysis unit 3700 may traverse one or more of the indexes to identify one or more tokens corresponding to a character, word, or phrase identified in the request string. Tokenization may include identifying multiple candidate tokens matching a character, word, or phrase identified in the request string. Candidate tokens may be ranked or ordered, such as based on probabilistic utility.

Tokenization may include match-length maximization. Match-length maximization may include ranking or ordering candidate matching tokens in descending magnitude order. For example, the longest candidate token, having the largest cardinality of characters or symbols, matching the request string, or a portion thereof, may be the highest ranked candidate token. For example, the request string may include a sequence of words or a semantic phrase, and tokenization may include identifying one or more tokens matching the input semantic phrase. In another example, the request string may include a sequence of phrases, and tokenization may include identifying one or more tokens matching the input word sequence. In some implementations, tokenization may include identifying the highest ranked candidate token for a portion of the request string as a resolved token for the portion of the request string.

The relational analysis unit 3700 may implement one or more finite state machines. For example, tokenization may include using one or more finite state machines. A finite state machine may model or represent a defined set of states and a defined set of transitions between the states. A state may represent a condition of the system represented by the finite state machine at a defined temporal point. A finite state machine may transition from a state (current state) to a subsequent state in response to input (e.g., input to the finite state machine). A transition may define one or more actions or operations that the relational analysis unit 3700 may implement. One or more of the finite state machines may be non-deterministic, such that the finite state machine may transition from a state to zero or more subsequent states.

The relational analysis unit 3700 may generate, instantiate, or operate a tokenization finite state machine, which may represent the respective tokenization grammar. Generating, instantiating, or operating a finite state machine may include operating a finite state machine traverser for traversing the finite state machine. Instantiating the tokenization finite state machine may include entering an empty state, indicating the absence of received input. The relational analysis unit 3700 may initiate or execute an operation, such as an entry operation, corresponding to the empty state in response to entering the empty state. Subsequently, the relational analysis unit 3700 may receive input data, and the tokenization finite state machine may transition from the empty state to a state corresponding to the received input data. In some embodiments, the relational analysis unit 3700 may initiate one or more data queries in response to transitioning to or from a respective state of a finite state machine. In the tokenization finite state machine, a state may represent a possible next token in the request string. The tokenization finite state machine may transition between states based on one or more defined transition weights, which may indicate a probability of transiting from a state to a subsequent state.

The tokenization finite state machine may determine tokenization based on probabilistic path utility. Probabilistic path utility may rank or order multiple candidate traversal paths for traversing the tokenization finite state machine based on the request string. The candidate paths may be ranked or ordered based on one or more defined probabilistic path utility metrics, which may be evaluated in a defined sequence. For example, the tokenization finite state machine may determine probabilistic path utility by evaluating the weights of the respective candidate transition paths, the lengths of the respective candidate transition paths, or a combination thereof. In some implementations, the weights of the respective candidate transition paths may be evaluated with high priority relative to the lengths of the respective candidate transition paths.

In some implementations, one or more transition paths evaluated by the tokenization finite state machine may include a bound state such that the candidate tokens available for tokenization of a portion of the request string may be limited based on the tokenization of a previously tokenized portion of the request string.

Tokenization may include matching a portion of the request string to one or more token types, such as a constant token type, a column name token type, a value token type, a control-word token type, a date value token type, a string value token type, or any other token type defined by the low-latency data access and analysis system 3000. A constant token type may be a fixed, or invariant, token type, such as a numeric value. A column name token type may correspond with a name of a column in the data model. A value token type may correspond with an indexed data value. A control-word token type may correspond with a defined set of control-words. A date value token type may be similar to a control-word token type and may correspond with a defined set of control-words for describing temporal information. A string value token type may correspond with an unindexed value.

Token matching may include ordering or weighting candidate token matches based on one or more token matching metrics. Token matching metrics may include whether a candidate match is within a defined data scope, such as a defined set of tables, wherein a candidate match outside the defined data scope (out-of-scope) may be ordered or weighted lower than a candidate match within the defined data scope (in-scope). Token matching metrics may include whether, or the degree to which, a candidate match increases query complexity, such as by spanning multiple roots, wherein a candidate match that increases complexity may be ordered or weighted lower than a candidate match that does not increase complexity or increases complexity to a lesser extent. Token matching metrics may include whether the candidate match is an exact match or a partial match, wherein a candidate match that is a partial may be ordered or weighted lower than a candidate match that is an exact match. In some implementations, the cardinality of the set of partial matches may be limited to a defined value.

Token matching metrics may include a token score (TokenScore), wherein a candidate match with a relatively low token score may be ordered or weighted lower than a candidate match with a relatively high token score. The token score for a candidate match may be determined based on one or more token scoring metrics. The token scoring metrics may include a finite state machine transition weight metric (FSMScore), wherein a weight of transitioning from a current state of the tokenization finite state machine to a state indicating a candidate matching token is the finite state machine transition weight metric. The token scoring metrics may include a cardinality penalty metric (CardinalityScore), wherein a cardinality of values (e.g., unique values) corresponding to the candidate matching token is used as a penalty metric (inverse cardinality), which may reduce the token score. The token scoring metrics may include an index utility metric (IndexScore), wherein a defined utility value, such as one, associated with an object, such as a column wherein the matching token represents the column or a value from the column, is the index utility metric. In some implementations, the defined utility values may be configured, such as in response to user input, on a per object (e.g., per column) basis. The token scoring metrics may include a usage metric (UBRScore). The usage metric may be determined based on a usage based ranking index, one or more usage ranking metrics, or a combination thereof. Determining the usage metric (UBRScore) may include determining a usage boost value (UBRBoost). The token score may be determined based on a defined combination of token scoring metrics. For example, determining the token score may be expressed as the following:

$$TokenScore = FSMScore * (IndexScore + UBRScore * UBRBoost) + \mathrm{Min}(CardinalityScore, 1).$$

Token matching may include grouping candidate token matches by match type, ranking or ordering on a per-match type basis based on token score, and ranking or ordering the match types. For example, the match types may include a first match type for exact matches (having the highest match type priority order), a second match type for prefix matches on ontological data (having a match type priority order lower than the first match type), a third match type for substring matches on ontological data and prefix matches on data values (having a match type priority order lower than the second match type), a fourth match type for substring matches on data values (having a match type priority order lower than the third match type), and a fifth match type for matches omitted from the first through fourth match types (having a match type priority order lower than the fourth match type). Other match types and match type orders may be used.

Tokenization may include ambiguity resolution. Ambiguity resolution may include token ambiguity resolution, join-path ambiguity resolution, or both. In some implementations, ambiguity resolution may cease tokenization in response to the identification of an automatic ambiguity resolution error or failure.

Token ambiguity may correspond with identifying two or more exactly matching candidate matching tokens. Token ambiguity resolution may be based on one or more token ambiguity resolution metrics. The token ambiguity resolution metrics may include using available previously resolved token matching or binding data and token ambiguity may be resolved in favor of available previously resolved token matching or binding data, other relevant tokens resolved from the request string, or both. The token ambiguity resolution may include resolving token ambiguity in favor of integer constants. The token ambiguity resolution may include resolving token ambiguity in favor of control-words, such as for tokens at the end of a request for data, such as last, that are not being edited.

Join-path ambiguity may correspond with identifying matching tokens having two or more candidate join paths. Join-path ambiguity resolution may be based on one or more join-path ambiguity resolution metrics. The join-path ambiguity resolution metrics may include using available previously resolved join-path binding data and join-path ambiguity may be resolved in favor of available previously resolved join-paths. The join-path ambiguity resolution may include favoring join paths that include in-scope objects over join paths that include out-of-scope objects. The join-path ambiguity resolution metrics may include a complexity minimization metric, which may favor a join path that omits or avoids increasing complexity over join paths that increase complexity, such as a join path that may introduce a chasm trap.

The relational analysis unit 3700 may identify a resolved request based on the request string. The resolved request, which may be database and visualization agnostic, may be expressed or communicated as an ordered sequence of tokens representing the request for data indicated by the request string. The relational analysis unit 3700 may instantiate, or generate, one or more resolved-request objects. For example, the relational analysis unit 3700 may create or store a resolved-request object corresponding to the resolved request in the distributed in-memory ontology unit 3500. The relational analysis unit 3700 may transmit, send, or otherwise make available, the resolved request to the semantic interface unit 3600.

In some implementations, the relational analysis unit 3700 may transmit, send, or otherwise make available, one or more resolved requests, or portions thereof, to the semantic interface unit 3600 in response to finite state machine transitions. For example, the relational analysis unit 3700 may instantiate a data-analysis object in response to a first transition of a finite state machine. The relational analysis unit 3700 may include a first data-analysis object instruction in the data-analysis object in response to a second transition of the finite state machine. The relational analysis unit 3700 may send the data-analysis object including the first data-analysis object instruction to the semantic interface unit 3600 in response to the second transition of the finite state machine. The relational analysis unit 3700 may include a second data-analysis object instruction in the data-analysis object in response to a third transition of the finite state machine. The relational analysis unit 3700 may send the data-analysis object including the data-analysis object instruction, or a combination of the first data-analysis object instruction and the second data-analysis object instruction, to the semantic interface unit 3600 in response to the third transition of the finite state machine. The data-analysis object instructions may be represented using any annotation, instruction, text, message, list, pseudo-code, comment, or the like, or any combination thereof that may be converted, transcoded, or translated into structured data-analysis instructions for accessing, retrieving, analyzing, or a combination thereof, data from the low-latency data, which may include generating data based on the low-latency data.

The relational analysis unit 3700 may provide an interface to permit the creation of user-defined syntax. For example, a user may associate a string with one or more tokens. Accordingly, when the string is entered, the pre-associated tokens are returned in lieu of searching for tokens to match the input.

The relational analysis unit 3700 may include a localization unit (not expressly shown). The localization, globalization, regionalization, or internationalization, unit may obtain source data expressed in accordance with a source expressive-form and may output destination data representing the source data, or a portion thereof, and expressed using a destination expressive-form. The data expressive-forms, such as the source expressive-form and the destination expressive-form, may include regional or customary forms of expression, such as numeric expression, temporal expression, currency expression, alphabets, natural-language elements, measurements, or the like. For example, the source expressive-form may be expressed using a canonical-form, which may include using a natural-language, which may be based on English, and the destination expressive-form may be expressed using a locale-specific form, which may include using another natural-language, which may be a natural-language that differs from the canonical-language. In another example, the destination expressive-form and the source expressive-form may be locale-specific expressive-forms and outputting the destination expressive-form representation of the source expressive-form data may include obtaining a canonical-form representation of the source expressive-form data and obtaining the destination expressive-form representation based on the canonical-form representation. Although, for simplicity and clarity, the grammars described herein, such as the data-analytics grammar and the natural language search grammar, are described with relation to the canonical expressive-form, the implementation of the respective grammars, or portions thereof, described herein may implement locale-specific expressive-forms. For example, the data-analytics tokenizer may include multiple locale-specific data-analytics tokenizers.

The natural language processing unit 3710 may receive input data including a natural language string, such as a natural language string generated in accordance with user input. The natural language string may represent a data request expressed in an unrestricted natural language form, for which data identified or obtained prior to, or in conjunction with, receiving the natural language string by the natural language processing unit 3710 indicating the semantic structure, correlation to the low-latency data access and analysis system 3000, or both, for at least a portion of the natural language string is unavailable or incomplete. Although not shown separately in FIG. 3, in some implementations, the natural language string may be generated or determined based on processing an analog signal, or a digital representation thereof, such as an audio stream or recording or a video stream or recording, which may include using speech-to-text conversion.

The natural language processing unit 3710 may analyze, process, or evaluate the natural language string, or a portion thereof, to generate or determine the semantic structure, correlation to the low-latency data access and analysis system 3000, or both, for at least a portion of the natural language string. For example, the natural language processing unit 3710 may identify one or more words or terms in the natural language string and may correlate the identified words to tokens defined in the low-latency data access and analysis system 3000. In another example, the natural language processing unit 3710 may identify a semantic structure for the natural language string, or a portion thereof. In another example, the natural language processing unit 3710 may identify a probabilistic intent for the natural language string, or a portion thereof, which may correspond to an operative feature of the low-latency data access and analysis system 3000, such as retrieving data from the internal data, analyzing data the internal data, or modifying the internal data.

The natural language processing unit 3710 may send, transmit, or otherwise communicate request data indicating the tokens, relationships, semantic data, probabilistic intent, or a combination thereof or one or more portions thereof, identified based on a natural language string to the relational analysis unit 3700.

The data utility unit 3720 may receive, process, and maintain user-agnostic utility data, such as system configuration data, user-specific utility data, such as utilization data, or both user-agnostic and user-specific utility data. The utility data may indicate whether a data portion, such as a column, a record, an insight, or any other data portion, has high utility or low utility within the system, such as among the users of the system. For example, the utility data may indicate that a defined column is a high-utility column or a low-utility column. The data utility unit 3720 may store the utility data, such as using the low-latency data structure. For example, in response to a user using, or accessing, a data portion, data utility unit 3720 may store utility data indicating the usage, or access, event for the data portion, which may include incrementing a usage event counter associated with the data portion. In some embodiments, the data utility unit 3720 may receive the information indicating the usage, or access, event for the data portion from the insight unit 3730, and the usage, or access, event for the data portion may indicate that the usage is associated with an insight.

As used herein, the term "utility" refers to a computer accessible data value, or values, representative of the usefulness of an aspect of the low-latency data access and analysis system, such as a data portion, an object, or a component of the low-latency data access and analysis system with respect to improving the efficiency, accuracy, or both, of the low-latency data access and analysis system. Unless otherwise expressly indicated, or otherwise clear from context, utility is relative within a defined data-domain or scope. For example, the utility of an object with respect to a user may be high relative to the utility of other objects with respect to the user. Express utility indicates expressly specified, defined, or configured utility, such as user or system defined utility. Probabilistic utility indicates utility calculated or determined using utility data and expresses a statistical probability of usefulness for a respective aspect of the low-latency data access and analysis system. Unless otherwise expressly indicated, or otherwise clear from context, utility is access context specific. For example, the utility of an object with respect to the access context of a user may be high relative to the utility of the object with respect to the respective access contexts of other users.

The data utility unit 3720 may receive a signal, message, or other communication, indicating a request for utility information. The request for utility information may indicate an object or data portion. The data utility unit 3720 may determine, identify, or obtain utility data associated with the identified object or data portion. The data utility unit 3720 may generate and send utility response data responsive to the request that may indicate the utility data associated with the identified object or data portion.

The data utility unit 3720 may generate, maintain, operate, or a combination thereof, one or more indexes, such as one or more of a usage (or utility) index, a resolved-request index, or a phrase index, based on the low-latency data stored in the distributed in-memory database 3300, or the external database, the low-latency data access and analysis system 3000, or both.

The insight unit 3730 may automatically identify one or more insights, which may be data other than data expressly requested by a user, and which may be identified and prioritized, or both, based on probabilistic utility.

The object search unit 3800 may generate, maintain, operate, or a combination thereof, one or more object indexes, which may be based on the analytical objects represented in the low-latency data access and analysis system 3000, or a portion thereof, such as pinboards, answers, and worksheets. An object index may be a defined data structure, or combination of data structures, for storing analytical-object data in a form optimized for searching. Although shown as a single unit in FIG. 3, the object search unit 3800 may interface with a distinct, separate, object indexing unit (not expressly shown).

The object search unit 3800 may include an object-index population interface, an object-index search interface, or both. The object-index population interface may obtain and store, load, or populate analytical-object data, or a portion thereof, in the object indexes. The object-index search interface may efficiently access or retrieve analytical-object data from the object indexes such as by searching or traversing the object indexes, or one or more portions thereof. In some implementations, the object-index population interface, or a portion thereof, may be a distinct, independent unit.

The object-index population interface may populate, update, or both the object indexes, such as periodically, such as in accordance with a defined temporal period, such as thirty minutes. Populating, or updating, the object indexes may include obtaining object indexing data for indexing the analytical objects represented in the low-latency data access and analysis system 3000. For example, the object-index population interface may obtain the analytical-object indexing data, such as from the distributed in-memory ontology unit 3500. Populating, or updating, the object indexes may include generating or creating an indexing data structure representing an object. The indexing data structure for representing an object may differ from the data structure used for representing the object in other components of the low-latency data access and analysis system 3000, such as in the distributed in-memory ontology unit 3500.

The object indexing data for an analytical object may be a subset of the object data for the analytical object. The object indexing data for an analytical object may include an object identifier for the analytical object uniquely identifying the analytical object in the low-latency data access and analysis system 3000, or in a defined data-domain within the low-latency data access and analysis system 3000. The low-latency data access and analysis system 3000 may uniquely, unambiguously, distinguish an object from other objects based on the object identifier associated with the object. The object indexing data for an analytical object may include data non-uniquely identifying the object. The low-latency data access and analysis system 3000 may identify one or more analytical objects based on the non-uniquely identifying data associated with the respective objects, or one or more portions thereof. In some implementations, an object identifier may be an ordered combination of non-uniquely identifying object data that, as expressed in the ordered combination, is uniquely identifying. The low-latency data access and analysis system 3000 may enforce the uniqueness of the object identifiers.

Populating, or updating, the object indexes may include indexing the analytical object by including or storing the object indexing data in the object indexes. For example, the object indexing data may include data for an analytical object, the object indexes may omit data for the analytical object, and the object-index population interface may include or store the object indexing data in an object index. In another example, the object indexing data may include data for an analytical object, the object indexes may include data for the analytical object, and the object-index population interface may update the object indexing data for the analytical object in the object indexes in accordance with the object indexing data.

Populating, or updating, the object indexes may include obtaining object utility data for the analytical objects represented in the low-latency data access and analysis system 3000. For example, the object-index population interface may obtain the object utility data, such as from the object utility unit 3810. The object-index population interface may include the object utility data in the object indexes in association with the corresponding objects.

In some implementations, the object-index population interface may receive, obtain, or otherwise access the object utility data from a distinct, independent, object utility data population unit, which may read, obtain, or otherwise access object utility data from the object utility unit 3810 and may send, transmit, or otherwise provide, the object utility data to the object search unit 3800. The object utility data population unit may send, transmit, or otherwise provide, the object utility data to the object search unit 3800 periodically, such as in accordance with a defined temporal period, such as thirty minutes.

The object-index search interface may receive, access, or otherwise obtain data expressing usage intent with respect to the low-latency data access and analysis system 3000, which may represent a request to access data in the low-latency data access and analysis system 3000, which may represent a request to access one or more analytical objects represented in the low-latency data access and analysis system 3000. The object-index search interface may generate one or more object-index queries based on the data expressing usage intent. The object-index search interface may send, transmit, or otherwise make available the object-index queries to one or more of the object indexes.

The object-index search interface may receive, obtain, or otherwise access object search results data indicating one or more analytical objects identified by searching or traversing the object indexes in accordance with the object-index queries. The object-index search interface may sort or rank the object search results data based on probabilistic utility in accordance with the object utility data for the analytical objects in the object search results data. In some implementations, the object-index search interface may include one or more object search ranking metrics with the object-index queries and may receive the object search results data sorted or ranked based on probabilistic utility in accordance with the object utility data for the objects in the object search results data and in accordance with the object search ranking metrics.

For example, the data expressing usage intent may include a user identifier, and the object search results data may include object search results data sorted or ranked based on probabilistic utility for the user. In another example, the data expressing usage intent may include a user identifier and one or more search terms, and the object search results data may include object search results data sorted or ranked based on probabilistic utility for the user identified by searching or traversing the object indexes in accordance with the search terms.

The object-index search interface may generate and send, transmit, or otherwise make available the sorted or ranked object search results data to another component of the low-latency data access and analysis system 3000, such as for further processing and display to the user.

The object utility unit 3810 may receive, process, and maintain user-specific object utility data for objects represented in the low-latency data access and analysis system 3000. The user-specific object utility data may indicate whether an object has high utility or low utility for the user.

The object utility unit 3810 may store the user-specific object utility data, such as on a per-object basis, a per-activity basis, or both. For example, in response to data indicating an object access activity, such as a user using, viewing, or otherwise accessing, an object, the object utility unit 3810 may store user-specific object utility data indicating the object access activity for the object, which may include incrementing an object access activity counter associated with the object, which may be a user-specific object access activity counter. In another example, in response to data indicating an object storage activity, such as a user storing an object, the object utility unit 3810 may store user-specific object utility data indicating the object storage activity for the object, which may include incrementing a storage activity counter associated with the object, which may be a user-specific object storage activity counter. The user-specific object utility data may include temporal information, such as a temporal location identifier associated with the object activity. Other information associated with the object activity may be included in the object utility data.

The object utility unit 3810 may receive a signal, message, or other communication, indicating a request for object utility information. The request for object utility information may indicate one or more objects, one or more users, one or more activities, temporal information, or a combination thereof. The request for object utility information may indicate a request for object utility data, object utility counter data, or both.

The object utility unit 3810 may determine, identify, or obtain object utility data in accordance with the request for object utility information. The object utility unit 3810 may generate and send object utility response data responsive to the request that may indicate the object utility data, or a portion thereof, in accordance with the request for object utility information.

For example, a request for object utility information may indicate a user, an object, temporal information, such as information indicating a temporal span, and an object activity, such as the object access activity. The request for object utility information may indicate a request for object utility counter data. The object utility unit 3810 may determine, identify, or obtain object utility counter data associated with the user, the object, and the object activity having a temporal location within the temporal span, and the object utility unit 3810 may generate and send object utility response data including the identified object utility counter data.

In some implementations, a request for object utility information may indicate multiple users, or may omit indicating a user, and the object utility unit 3810 may identify user-agnostic object utility data aggregating the user-specific object utility data. In some implementations, a request for object utility information may indicate multiple objects, may omit indicating an object, or may indicate an object type, such as answer, pinboard, or worksheet, and the object utility unit 3810 may identify the object utility data by aggregating the object utility data for multiple objects in accordance with the request. Other object utility aggregations may be used.

The system configuration unit 3820 implements or applies one or more low-latency data access and analysis system configurations to enable, disable, or configure one or more operative features of the low-latency data access and analysis system 3000. The system configuration unit 3820 may store data representing or defining the one or more low-latency data access and analysis system configurations. The system configuration unit 3820 may receive signals or messages indicating input data, such as input data generated via a system access interface, such as a user interface, for accessing or modifying the low-latency data access and analysis system configurations. The system configuration unit 3820 may generate, modify, delete, or otherwise maintain the low-latency data access and analysis system configurations, such as in response to the input data. The system configuration unit 3820 may generate or determine output data, and may output the output data, for a system access interface, or a portion or portions thereof, for the low-latency data access and analysis system configurations, such as for presenting a user interface for the low-latency data access and analysis system configurations. Although not shown in FIG. 3, the system configuration unit 3820 may communicate with a repository, such as an external centralized repository, of low-latency data access and analysis system configurations; the system configuration unit 3820 may receive one or more low-latency data access and analysis system configurations from the repository, and may control or configure one or more operative features of the low-latency data access and analysis system 3000 in response to receiving one or more low-latency data access and analysis system configurations from the repository.

The user customization unit 3830 may receive, process, and maintain user-specific utility data, user defined configuration data, user defined preference data, or a combination thereof. The user-specific utility data may indicate whether a data portion, such as a column, a record, autonomous-analysis (autoanalysis) data, or any other data portion or object, has high utility or low utility to an identified user. For example, the user-specific utility data may indicate that a defined column is a high-utility column or a low-utility column. The user customization unit 3830 may store the user-specific utility data, such as using the low-latency data structure. The user-specific utility data may include, feedback data, such as feedback indicating user input expressly describing or representing the utility of a data portion or object in response to utilization of the data portion or object, such as positive feedback indicating high utility or negative feedback indicating low utility. The user customization unit 3830 may store the feedback in association with a user identifier. The user customization unit 3830 may store the feedback in association with the access context in which feedback was obtained. The user customization data, or a portion thereof, may be stored in an in-memory storage unit of the low-latency data access and analysis system. In some implementations, the user customization data, or a portion thereof, may be stored in the persistent storage unit 3930.

The system access interface unit 3900 may interface with, or communicate with, a system access unit (not shown in FIG. 3), which may be a client device, a user device, or another external device or system, or a combination thereof, to provide access to the internal data, features of the low-latency data access and analysis system 3000, or a combination thereof. For example, the system access interface unit 3900 may receive signals, message, or other communications representing interactions with the internal data, such as data expressing usage intent and may output response messages, signals, or other communications responsive to the received requests.

The system access interface unit 3900 may generate data for presenting a user interface, or one or more portions thereof, for the low-latency data access and analysis system 3000. For example, the system access interface unit 3900 may generate instructions for rendering, or otherwise presenting, the user interface, or one or more portions thereof and may transmit, or otherwise make available, the instructions for rendering, or otherwise presenting, the user interface, or one or more portions thereof to the system access unit, for presentation to a user of the system access unit. For example, the system access unit may present the user interface via a web browser or a web application and the instructions may be in the form of HTML, JavaScript, or the like.

In an example, the system access interface unit 3900 may include a data-analytics field user interface element in the user interface. The data-analytics field user interface element may be an unstructured string user input element or field. The system access unit may display the unstructured string user input element. The system access unit may receive input data, such as user input data, corresponding to the unstructured string user input element. The system access unit may transmit, or otherwise make available, the unstructured string user input to the system access interface unit 3900. The user interface may include other user interface elements and the system access unit may transmit, or otherwise make available, other user input data to the system access interface unit 3900.

The system access interface unit 3900 may obtain the user input data, such as the unstructured string, from the system access unit. The system access interface unit 3900 may transmit, or otherwise make available, the user input data to one or more of the other components of the low-latency data access and analysis system 3000.

In some embodiments, the system access interface unit 3900 may obtain the unstructured string user input as a sequence of individual characters or symbols, and the system access interface unit 3900 may sequentially transmit, or otherwise make available, individual or groups of characters or symbols of the user input data to one or more of the other components of the low-latency data access and analysis system 3000.

In some embodiments, system access interface unit 3900 may obtain the unstructured string user input as a sequence of individual characters or symbols, the system access interface unit 3900 may aggregate the sequence of individual characters or symbols, and may sequentially transmit, or otherwise make available, a current aggregation of the received user input data to one or more of the other components of the low-latency data access and analysis system 3000, in response to receiving respective characters or symbols from the sequence, such as on a per-character or per-symbol basis.

The real-time collaboration unit 3910 may receive signals or messages representing input received in accordance with multiple users, or multiple system access devices, associated with a collaboration context or session, may output data, such as visualizations, generated or determined by the low-latency data access and analysis system 3000 to multiple users associated with the collaboration context or session, or both. The real-time collaboration unit 3910 may receive signals or messages representing input received in accordance with one or more users indicating a request to establish a collaboration context or session, and may generate, maintain, or modify collaboration data representing the collaboration context or session, such as a collaboration session identifier. The real-time collaboration unit 3910 may receive signals or messages representing input received in accordance with one or more users indicating a request to participate in, or otherwise associate with, a currently active collaboration context or session, and may associate the one or more users with the currently active collaboration context or session. In some implementations, the input, output, or both, of the real-time collaboration unit 3910 may include synchronization data, such as temporal data, that may be used to maintain synchronization, with respect to the collaboration context or session, among the low-latency data access and analysis system 3000 and one or more system access devices associated with, or otherwise accessing, the collaboration context or session.

The third-party integration unit 3920 may include an electronic communication interface, such as an application programming interface (API), for interfacing or communicating between an external, such as third party, application or system, and the low-latency data access and analysis system 3000. For example, the third-party integration unit 3920 may include an electronic communication interface to transfer data between the low-latency data access and analysis system 3000 and one or more external applications or systems, such as by importing data into the low-latency data access and analysis system 3000 from the external applications or systems or exporting data from the low-latency data access and analysis system 3000 to the external applications or systems. For example, the third-party integration unit 3920 may include an electronic communication interface for electronic communication with an external exchange, transfer, load (ETL) system, which may import data into the low-latency data access and analysis system 3000 from an external data source or may export data from the low-latency data access and analysis system 3000 to an external data repository. In another example, the third-party integration unit 3920 may include an electronic communication interface for electronic communication with external machine learning analysis software, which may export data from the low-latency data access and analysis system 3000 to the external machine learning analysis software and may import data into the low-latency data access and analysis system 3000 from the external machine learning analysis software. The third-party integration unit 3920 may transfer data independent of, or in conjunction with, the system access interface unit 3900, the enterprise data interface unit 3400, or both.

The persistent storage unit 3930 may include an interface for storing data on, accessing data from, or both, one or more persistent data storage devices or systems. For example, the persistent storage unit 3930 may include one or more persistent data storage devices, such as the static memory 1200 shown in FIG. 1. Although shown as a single unit in FIG. 3, the persistent storage unit 3930 may include multiple components, such as in a distributed or clustered configuration. The persistent storage unit 3930 may include one or more internal interfaces, such as electronic communication or application programming interfaces, for receiving data from, sending data to, or both other components of the low-latency data access and analysis system 3000. The persistent storage unit 3930 may include one or more external interfaces, such as electronic communication or application programming interfaces, for receiving data from, sending data to, or both, one or more external systems or devices, such as an external persistent storage system. For example, the persistent storage unit 3930 may include an internal interface for obtaining key-value tuple data from other components of the low-latency data access and analysis system 3000, an external interface for sending the key-value tuple data to, or storing the key-value tuple data on, an external persistent storage system, an external interface for obtaining, or otherwise accessing, the key-value tuple data from the external persistent storage system, and an internal key-value tuple data for sending, or otherwise making available, the key-value tuple data to other components of the low-latency data access and analysis system 3000. In another example, the persistent storage unit 3930 may include a first external interface for storing data on, or obtaining data from, a first external persistent storage system, and a second external interface for storing data on, or obtaining data from, a second external persistent storage system.

Figure 4:
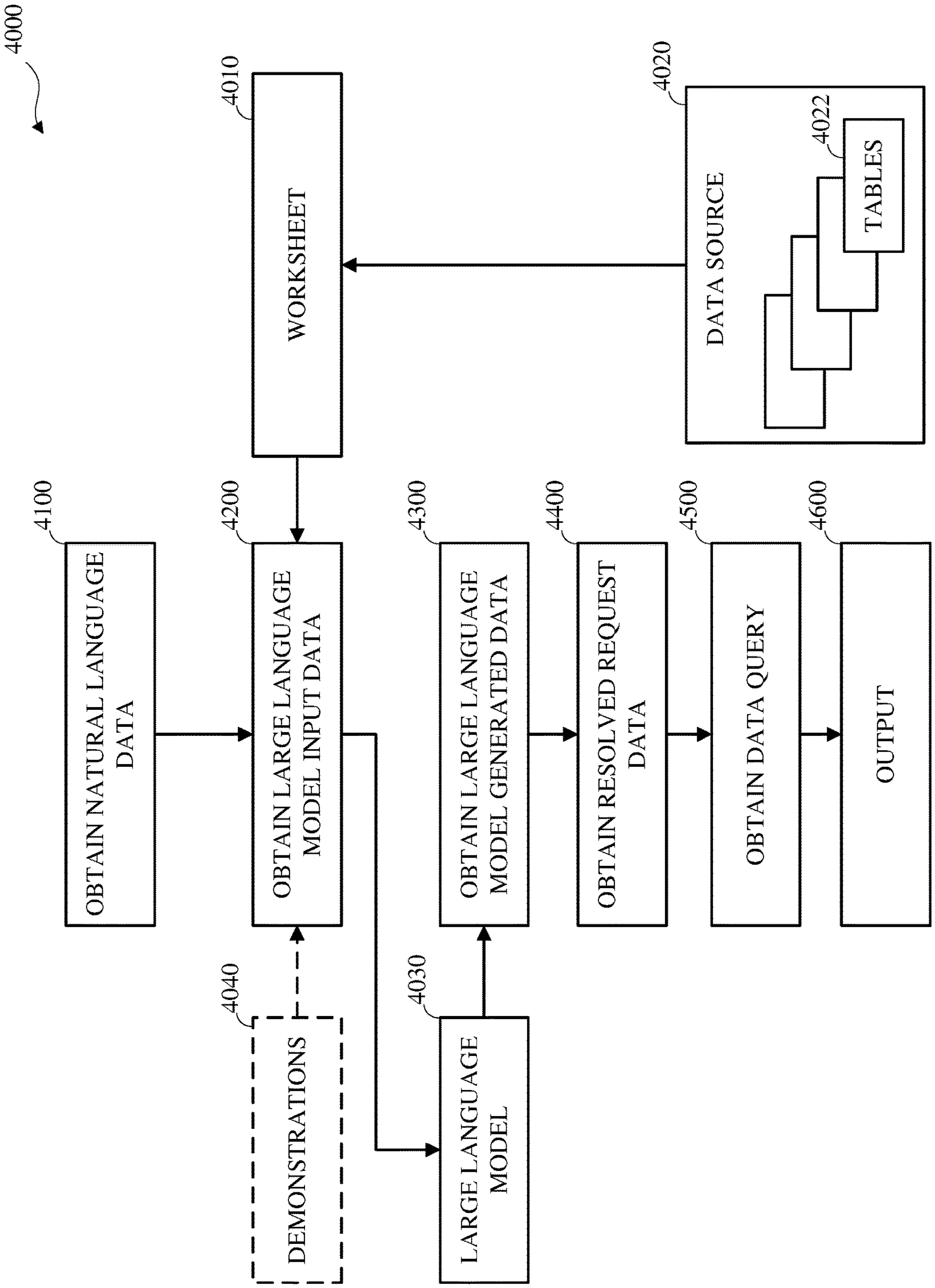
FIG. 4 is a diagram of an example of natural language to query language transformation in a data access and analysis system.

FIG. 4 is a diagram of an example of natural language to query language transformation 4000 in a data access and analysis system. The data access and analysis system may be similar to the data access and analysis system 3000 shown in FIG. 3, except as is described herein or as is otherwise clear from context. The data access and analysis system may implement natural language to query language transformation 4000.

Natural language to query language transformation 4000 includes obtaining natural language data (at 4100). The natural language data, or natural language input, is, or includes, text or string data included in data expressing usage intent, which may be generated by the low-latency data access and analysis system, or a component thereof, such as the system access interface unit 3900 shown in FIG. 3, such as in response to input, such as user input, obtained by the low-latency data access and analysis system. The natural language data (natural language input data) expresses a request for data analysis with respect to data stored in a data source 4020 of the data access and analysis system, such as data from, or based on, a worksheet 4010 that is based on, or associated with, the data source 4020. For example, the natural language data may include the string "How much did it rain in the northeast in the last three months?".

The data source 4020 may be a distributed in-memory database, such as the distributed in-memory database 3300 shown in FIG. 3, an external database, or another data source as described herein. The data source 4020 includes, or stores, one or more tables 4022. The data source 4020 may be, include, or store, complex data, such that the data access, analysis, or both, may be subject to complexities such as chasm-traps, fan-traps, or both. In the absence of data, program logic, or both, indicating join types, cardinality, and the like, automatic identification of joins may be limited, inaccurate, or unavailable.

In one or more examples described herein, the data source 4020 is a meteorological database that includes meteorological, or weather, data stored in the tables 4022.

The worksheet 4010 describes, or defines, an aggregation, or collection, of data from, based on, or a combination thereof, the tables 4022 from the data source 4020. The worksheet 4010 defines, or describes, the data aggregation as including columns that correspond with columns from the tables 4022, columns defined, or described, for data generated in accordance with the worksheet, or both.

For example, the tables 4022 include a first table (T1), a second table (T2), a third table (T3), a fourth table (T4), a fifth table (T5), a sixth table (T6), a seventh table (T7), an eighth table (T8), a ninth table (T9), and a tenth table (T10). The tables 4022 include a number, count, or cardinality, of columns, such as 4500 columns. The worksheet 4010 includes a first aggregation of data based on the tables 4022 (T1-T10) and a second worksheet (not shown) may include a second aggregation of data based on the tables 4022 (T1-T10), wherein the second worksheet (not shown) differs from the worksheet 4010, such as based on joins, column names, data aggregations, or the like. The worksheet 4010 may include a number, count, or cardinality, of columns, such as 5000 columns.

The worksheet 4010 may be previously, such as prior to a current performance of natural language to query language transformation 4000 in the data access and analysis system, defined, such as manually defined, in the data access and analysis system. The worksheet 4010 is represented in the data access and analysis system by a worksheet object, which is a queryable object. Although not shown separately in FIG. 4, obtaining the natural language data (at 4100) may include identifying, or obtaining, the worksheet 4010, which may include obtaining the queryable object (worksheet object) representing the worksheet in the data access and analysis system. In some implementations, the worksheet 4010, the corresponding worksheet object, or both, may be identified prior to obtaining the natural language data (at 4100).

Natural language to query language transformation 4000 in the data access and analysis system may include using one or more machine learning, or artificial intelligence, models, such as one or more large language models, which may be internal, such as implemented by the data access and analysis system, or external, such as accessible, or accessed, by the data access and analysis system. For simplicity, FIG. 4 shows one large language model 4030.

Natural language to query language transformation 4000 in the data access and analysis system includes obtaining large language model input data (at 4200). Obtaining the large language model input data (at 4200) includes the data access and analysis system, or a component thereof, including the natural language input data (obtained at 4100) in the large language model input data.

The large language model 4030 may be subject to limitations, such as a limit on a number, count, or cardinality, of tokens that may be included in input to the large language model 4030 (large language model input data) (at 4200). For example, the large language model 4030 may be limited to a defined maximum number, count, or cardinality of tokens, such as 4000 tokens. Tokens of the large language model 4030 may differ from tokens of the data access and analysis system. A token of the large language model 4030 is an ordered sequence of characters, or symbols, that represent, or form, a word, a word part, whitespace, punctuation, or a combination thereof.

The data source 4020, or the corresponding data model, including the tables 4022 and relationships among the tables 4022, may be incompatible, or incompletely compatible, with the large language model 4030. For example, the data source 4020, or the corresponding data model, including the tables 4022 and relationships among the tables 4022, may correspond with more than the maximum number, count, or cardinality of tokens.

The worksheet 4010 may be incompatible, or incompletely compatible, with the large language model 4030. For example, the worksheet 4010 may include more columns than the maximum number, count, or cardinality of tokens, wherein a column corresponds with one or more tokens with respect to the large language model 4030.

Obtaining the large language model input data (at 4200) includes the data access and analysis system, or a component thereof, obtaining prompt signifier data, which is natural language data, such as "Generate SQL given the question and table to answer the question correctly. Make sure only columns in the table provided are used in the generated SQL." Obtaining the large language model input data (at 4200) includes the data access and analysis system, or a component thereof, including the prompt signifier data in the large language model input data. The prompt signifier data indicates, to the large language model, the task assigned to, or requested of, the large language model.

Obtaining the large language model input data (at 4200) includes the data access and analysis system, or a component thereof, obtaining prompt context data. The data access and analysis system, or a component thereof, obtains the prompt context data using the natural language input data, the worksheet, utility data, such as user-agnostic utility data, such as system configuration data, user-specific utility data, such as utilization data, or both user-agnostic and user-specific utility data, object ontological data, such as object relationship data, or a combination thereof. The object relationship data may be, or may include, aggregated data that indicates a number, count, or cardinality of objects in the data access and analysis system that are related to an object in the data access and analysis system. For example, a first object in the data access and analysis system may represent a column in the table 4022 in the data source 4020, and the object relationship data may include data indicating a number, count, or cardinality, of analytical objects that include one or more references to the first object as a representation of the column. The prompt context data indicates, to the large language model, data for the large language model to use to respond to, or answer, the request indicated by the natural language input data (obtained at 4100) as included in the large language model input data (obtained at 4200).

The prompt context data includes a definition, or description, of a data structure, such as a table structure (table structure data). For example, the prompt context data may be a structured query language instruction to create a table. The table structure data includes an identifier, or name, for the data structure. The table structure data includes column data defining, or describing, one or more columns of the data structure. The column data includes an identifier, or name for a respective column and a corresponding data type for the respective column. The column data may be obtained in accordance with a defined maximum number, count, or cardinality of columns, such as two hundred (200) columns.

To obtain the table structure data, the data access and analysis system, or a component thereof, obtains a request hypothesis based on the natural language input. The data access and analysis system, or a component thereof, uses the request hypothesis to identify, or otherwise obtain, a first subset of the columns from the worksheet, wherein the first subset of the columns from the worksheet includes less than or equal to the defined maximum number, count, or cardinality of columns, such as fifty (50). The data access and analysis system, or a component thereof, includes the first subset of columns, including a column identifier, such as a column name, and a data type for the respective column, from the worksheet in the table structure data.

In some implementations, the first subset of columns includes less than the defined maximum number, count, or cardinality of columns and the data access and analysis system, or a component thereof, obtains, or identifies, a second subset of the columns from the worksheet, wherein the second subset of the columns from the worksheet includes less than or equal to a difference between the defined maximum number, count, or cardinality of columns and the number, count, or cardinality of the first subset of columns, which may be obtained by subtracting the number, count, or cardinality of the first subset of columns from the defined maximum number, count, or cardinality of columns. The data access and analysis system, or a component thereof, identifies, or otherwise obtains, the second subset of the columns from the worksheet using utility data, such as user-agnostic utility data, such as system configuration data, user-specific utility data, such as utilization data, or both user-agnostic and user-specific utility data (probabilistic utility data). The data access and analysis system, or a component thereof, identifies the second subset of the columns from the worksheet having the highest, maximal, or greatest, utility, as indicated by the utility data (descending utility order). The data access and analysis system, or a component thereof, includes the second subset of columns, including a column identifier, such as a column name, and a data type for the respective column, from the worksheet in the table structure data. The second subset of columns may be columns from the worksheet other than the columns included in the first subset of columns (non-overlapping). Obtaining the second subset of columns may be agnostic of (omit using) the natural language input.

In some implementations, the first subset of columns and the second subset of columns, in combination, includes less than the defined maximum number, count, or cardinality of columns and the data access and analysis system, or a component thereof, obtains, or identifies, a third subset of the columns from the worksheet, wherein the third subset of the columns from the worksheet includes less than or equal to a difference between the defined maximum number, count, or cardinality of columns and a sum of the number, count, or cardinality of the first subset of columns and the number, count, or cardinality of the second subset of columns, which may be obtained by subtracting the sum of the number, count, or cardinality of the first subset of columns and the number, count, or cardinality of the second subset of columns from the defined maximum number, count, or cardinality of columns. The data access and analysis system, or a component thereof, identifies the third subset of the columns from the worksheet using ontological data indicating a number, count, or cardinality, of previously generated analytical objects in the data access and analysis system that reference, or have a defined relationship to, the respective column (related analytical objects). The data access and analysis system, or a component thereof, identifies the third subset of the columns from the worksheet having the highest, maximal, or greatest, number, count, or cardinality, of related analytical objects (descending relations order). The data access and analysis system, or a component thereof, includes the third subset of columns, including a column identifier, such as a column name, and a data type for the respective column, from the worksheet in the table structure data. Obtaining the third subset of columns may be agnostic of (omit using) the natural language input.

In some implementations, the first subset of columns, the second subset of columns, and the third subset of columns, in combination, includes less than the defined maximum number, count, or cardinality of columns and the data access and analysis system, or a component thereof, obtains, or identifies, a fourth subset of the columns from the worksheet, wherein the fourth subset of the columns from the worksheet includes less than or equal to a difference between the defined maximum number, count, or cardinality of columns and a sum of the number, count, or cardinality of the first subset of columns, the number, count, or cardinality of the second subset of columns, and the number, count, or cardinality of the third subset of columns, which may be obtained by subtracting the sum of the number, count, or cardinality of the first subset of columns, the number, count, or cardinality of the second subset of columns, and the number, count, or cardinality of the third subset of columns from the defined maximum number, count, or cardinality of columns. The data access and analysis system, or a component thereof, identifies the fourth subset of the columns from the worksheet randomly, or pseudo-randomly. The data access and analysis system, or a component thereof, includes the fourth subset of columns, including a column identifier, such as a column name, and a data type for the respective column, from the worksheet in the table structure data. Obtaining the fourth subset of columns may be agnostic of (omit using) the natural language input.

In some implementations, obtaining the first subset of columns may be omitted, wherein obtaining the table structure data includes one or more of obtaining the second subset of columns, obtaining the third subset of columns, or obtaining the fourth subset of columns. In some implementations, obtaining the second subset of columns may be omitted, wherein obtaining the table structure data includes one or more of obtaining the first subset of columns, obtaining the third subset of columns, or obtaining the fourth subset of columns. In some implementations, obtaining the third subset of columns may be omitted, wherein obtaining the table structure data includes one or more of obtaining the first subset of columns, obtaining the second subset of columns, or obtaining the fourth subset of columns. In some implementations, obtaining the fourth subset of columns may be omitted, wherein obtaining the table structure data includes one or more of obtaining the first subset of columns, obtaining the second subset of columns, or obtaining the third subset of columns.

To obtain the request hypothesis the data access and analysis system, or a component thereof, identifies one or more patterns in the natural language input data and generates one or more request hypotheses about the data. To obtain the request hypothesis the data access and analysis system, or a component thereof, may use a search algorithm, such as a greedy search algorithm, a beam search, a breadth-first search, a best fit search, or the like. In some implementations, the data access and analysis system, or a component thereof, uses a beam search to obtain the requested hypothesis. The beam search is a heuristic search algorithm used in natural language processing (NLP) to find a most likely sequence of words in a sentence. The beam search works by expanding the most promising partial sequences and keeping the best partial sequences.

To obtain the request hypothesis the data access and analysis system, or a component thereof, tokenizes the natural language input to obtain an ordered sequence of tokens having a number, count, or cardinality of tokens (N). For example, the natural language input data may be the string "how much did it rain yesterday" and the corresponding ordered sequence of tokens is "how", "much", "did", "it", "rain", "yesterday" and the cardinality of tokens (N) is six (N=6).

To obtain the request hypothesis the data access and analysis system, or a component thereof, processes, such as iteratively, token subsequences from the orders sequence of tokens, wherein the token subsequences are contiguous in the ordered sequence of tokens and have a length in a range from one token to a defined maximum token subsequence length (K), wherein the defined maximum token subsequence length (K) is the number, count, or cardinality of tokens in the respective token subsequence.

To obtain the token subsequences, the data access and analysis system, or a component thereof, obtains, or identifies, a sequentially first token from the ordered sequence of tokens, other than tokens previously identified as a sequentially first token for current natural language input, as a current token subsequence. For example, for the ordered sequence of tokens is "how", "much", "did", "it", "rain", "yesterday", the first sequentially first token is "how".

The data access and analysis system, or a component thereof, determines whether the current token subsequence matches a token, a portion of a token, or a combination of tokens defined, or described, in the data access and analysis system.

In some implementations, the data access and analysis system, or a component thereof, may determine that the current token subsequence is matching with a token, a portion of a token, or a combination of tokens defined, or described, in the data access and analysis system. In response to determining that the current token subsequence matches a token, a portion of a token, or a combination of tokens defined, or described, in the data access and analysis system, the data access and analysis system, or a component thereof, obtains, or identifies, a combination of the current token subsequence and a subsequent token as the current token subsequence. For example, in a first iteration, the current token subsequence may be identified as "how", "how" may be determined as matching a token defined, or described in the data access and analysis system, and the combination of the token "how" and the token "much" ("how much") may be identified as the current token subsequence.

In some implementations, the data access and analysis system, or a component thereof, may determine that the current token subsequence is non-matching with a token, a portion of a token, or a combination of tokens defined, or described, in the data access and analysis system. For example, a token, a portion of a token, or a combination of tokens matching the current token subsequence may be unavailable in the data access and analysis system. In response to determining that the current token subsequence is non-matching, the data access and analysis system, or a component thereof, obtains, or identifies, a sequentially first token from the ordered sequence of tokens, other than tokens previously identified as a sequentially first token for current natural language input, as the current token subsequence. For example, for the ordered sequence of tokens is "how", "much", "did", "it", "rain", "yesterday", wherein the first sequentially first token, "how", may be previously identified as a sequentially first token from the ordered sequence of tokens, the next sequentially first token, other than "how", is "much", and "much" is identified as the current token subsequence.

For example, for the ordered sequence of tokens is "how", "much", "did", "it", "rain", "yesterday", the token subsequence "how" may be identified as matching, the token subsequence "how much" may be identified as matching, the token subsequence "how much did" may be identified as non-matching, the token subsequence "much" may be identified as matching, the token subsequence "much did" may be identified as matching, the token subsequence "much did it" may be identified as non-matching, the token subsequence "did" may be identified as non-matching, the token subsequence "did it" may be identified as matching, the token subsequence "did it rain" may be identified as non-matching, the token subsequence "it" may be identified as matching, the token subsequence "it rain" may be identified as non-matching, the token subsequence "rain" may be identified as matching, the token subsequence "rain yesterday" may be identified as non-matching, and the token subsequence "yesterday" may be identified as matching.

In some implementations, the data access and analysis system, or a component thereof, determines whether the current token subsequence matches a column name, a substring of a column name, a filter value, a substring of a filter value, a data value from a row of results data, or sample results data, for the worksheet, or a substring of a data value from a row of results data, or sample results data, for the worksheet. With respect to determining whether the current token subsequence matches, the worksheet may be referred to herein as a token matching repository.

In some implementations, the data access and analysis system, or a component thereof, determines whether the current token subsequence matches a value in an ontological data index, wherein the ontological data index includes column identifiers, or names, corresponding synonyms, and corresponding associations. With respect to determining whether the current token subsequence matches, the ontological data index may be referred to herein as a token matching repository.

In some implementations, the data access and analysis system, or a component thereof, determines whether the current token subsequence matches a value in a constituent data index, wherein the constituent data index includes constituent data value of the rows, cells, fields, or records, from the worksheet for the columns representing strings. With respect to determining whether the current token subsequence matches, the constituent data index may be referred to herein as a token matching repository.

In some implementations, the data access and analysis system, or a component thereof, determines whether the current token subsequence matches a value in a control-word index, wherein the control-word index includes control-word values, or keywords, which may be mathematical operators. With respect to determining whether the current token subsequence matches, the control-word index may be referred to herein as a token matching repository.

In some implementations, the data access and analysis system, or a component thereof, determines whether the current token subsequence matches a value in a constant index, wherein the constant index includes constant values defined in the data access and analysis system, such as "100" or "true". With respect to determining whether the current token subsequence matches, the constant index may be referred to herein as a token matching repository.

In some implementations, the data access and analysis system, or a component thereof, determines whether the current token subsequence matches a value in a numeral index, wherein the numeral index includes number word tokens (or named numbers), such as number word tokens for the positive integers between zero and one million, inclusive. With respect to determining whether the current token subsequence matches, the numeral index may be referred to herein as a token matching repository.

In some implementations, the data access and analysis system, or a component thereof, determines whether the current token subsequence matches a value in a chronometric dataset defined in the data access and analysis system or a chronometric phrase pattern defined in the data access and analysis system, such as "last 2 weeks". With respect to determining whether the current token subsequence matches, the chronometric datasets defined in the data access and analysis system and the chronometric phrase patterns defined in the data access and analysis system may be referred to herein as token matching repositories.

The data access and analysis system, or a component thereof, identifies, or otherwise obtains, token subsequence scores for the token subsequences that are identified as matching, such that a respective token subsequence score is obtained, calculated, or identified, for a respective token subsequence identified as matching. The token subsequence score is identified, determined, or otherwise obtained based on the corresponding token matching repository and the match quality (match quality metric or match type), such as exact match, substring match, or the like, wherein an exact match is assigned a token subsequence score that is higher than a substring match, and wherein a match in the ontological data index is assigned a score that is higher than a match in the constituent data index.

The data access and analysis system, or a component thereof, categorizes the respective matching token subsequences as a measure, such as a measure column, an attribute, such as an attribute column, a value, such as a value in a row, cell, field, or record for a column in the worksheet, a control-word, an operator, a numeral, a chronometric unit, a constant, a stop word, or a skip token.

The data access and analysis system, or a component thereof, performs the search, such as the beam search, using the matching token subsequences to obtain one or more request hypothesis, which includes identifying a subset of the matching token subsequences (candidate matching token subsequences), the subset of the matching token subsequences having a size, number, count, or cardinality of the defined maximum token subsequence length (K), including the matching token subsequences having a respective relatively high token subsequence score, wherein token subsequences having a respective relatively low token subsequence score are omitted from the subset of the matching token subsequences (descending token subsequence score order). The beam search identifies non-overlapping token subsequences from the matching token subsequences. In an example, the matching token subsequences "how" and "how much" are overlapping, the token subsequence score for the matching token subsequence "how" may be higher than the token subsequence score for the matching token subsequence "how much", the beam search may identify the matching token subsequence “how” as a candidate matching token subsequence, and may omit or exclude the matching token subsequence “how much” from the candidate matching token subsequences as overlapping with the candidate matching token subsequence “how”. The defined maximum token subsequence length (K) may be referred to as the beam width with respect to the beam search.

The data access and analysis system, or a component thereof, includes the size K subset of non-overlapping, token matching score maximized, matching token subsequences identified by the search in the request hypotheses.

The data access and analysis system, or a component thereof, includes the request hypotheses that correspond to columns in the worksheet, or filters on the columns in the worksheet, in the prompt context data.

In an example, including prompt context data that indicates that the token “clouds” corresponds to the token sequences “cirrus clouds”, “cumulus clouds”, and “stratus clouds”, increases the probability that the large language model will interpret a request for data that includes the word “clouds” as indicating that the output should refer to a data element as containing, or including, the word “clouds”, such as in combination with other words, and a lower probability as indicating that the output should refer to a data being equal to the word “clouds”.

The data access and analysis system, or a component thereof, includes prompt signifier data, the prompt context data, and the natural language input data in the large language model input data (at 4200).

The data access and analysis system, or a component thereof, sends, transmits, or otherwise makes available, the large language model input data to the large language model 4030 (at 4200).

The large language model 4030 receives, reads, obtains, or otherwise accesses, the large language model input data and automatically generates corresponding, or resulting, large language model generated data, such as in response to receiving the large language model input data. The large language model 4030 outputs, sends, transmits, or otherwise makes available, the language model generated data to the data access and analysis system, or a component thereof.

In some implementations, the data access and analysis system, or a component thereof, obtains, or generates, demonstrations data (demonstrations) 4040, or few-shot examples. In some implementations, the data access and analysis system, or a component thereof, includes the demonstrations data in the large language model input data (at 4200). The demonstrations data 4040 is included in the large language model input data prior to the natural language input data. For example, the large language model input data may include the prompt signifier data, followed by the prompt context data, followed by the demonstrations data 4040, followed by the natural language input data. Although described as included in the large language model input data, the demonstrations data 4040 may be sent, transmitted, or otherwise made available, to the large language model 4030 separately from the large language model input data and in association with sending, transmitting, or otherwise making available, the large language model input data to the large language model 4030. The demonstrations data 4040 is shown in FIG. 4 using a broken line border to indicate that obtaining the demonstrations data 4040 and including the demonstrations data 4040 in the large language model input data (at 4200) may be omitted.

Figure 6:
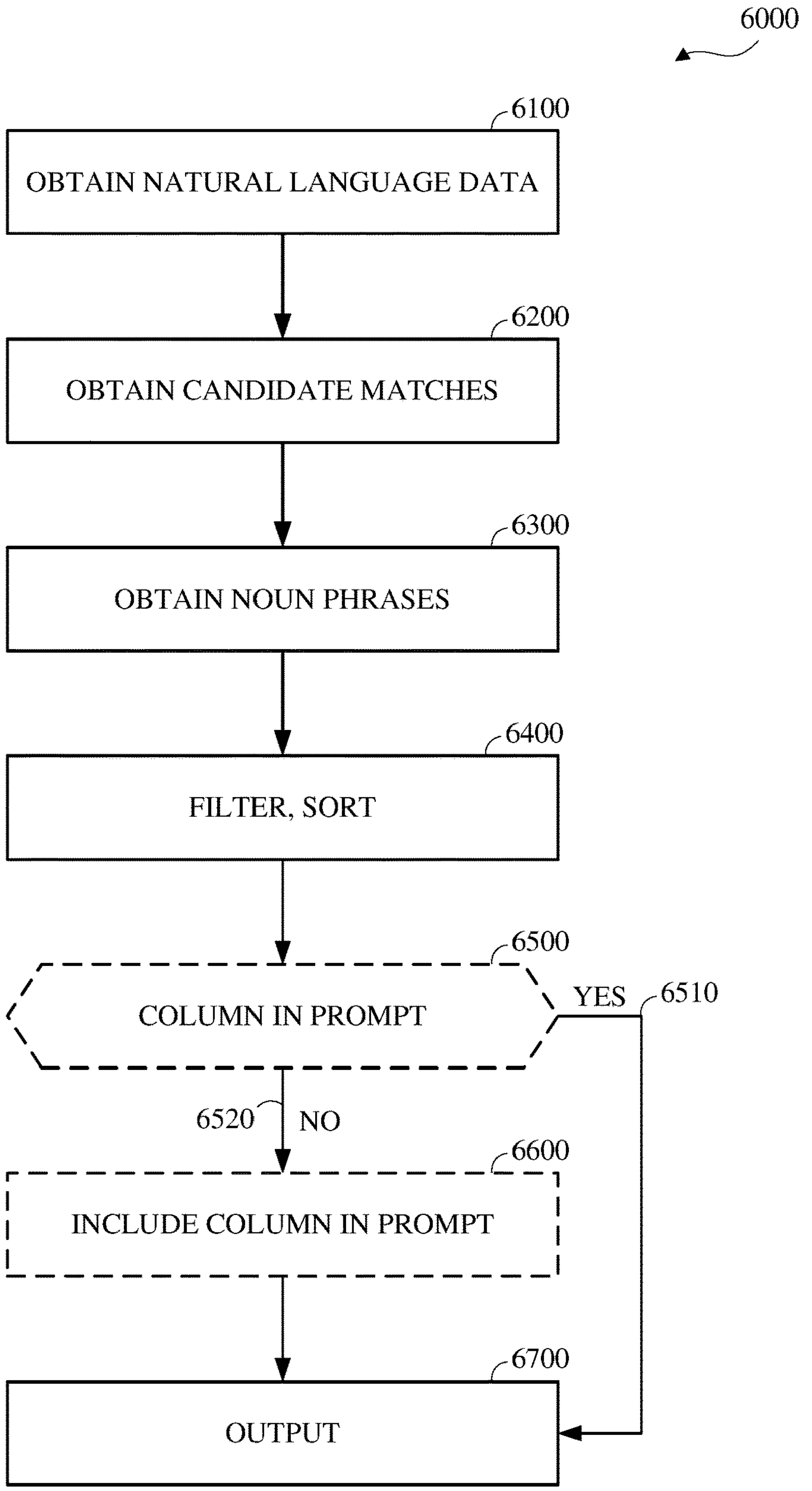
FIG. 6 is a flowchart of an example of obtaining demonstration data in a data access and analysis system.

The demonstrations data 4040 includes one or more demonstrations, wherein a demonstration includes a question portion and a corresponding answer portion. The question portion is expressed using previously obtained, such as stored in the data access and analysis system, or a component thereof, natural language input data. The answer portion is expressed using data previously obtained, such as stored in the data access and analysis system, or a component thereof, corresponding to the question portion, and that is similar to the structured query language used, or output, by the large language model. The large language model uses the demonstrations data 4040 to improve the accuracy of the large language model output data relative to generating the large language model output data in the absence of the demonstrations data 4040. An example of obtaining demonstrations data 4040 is shown in FIG. 6.

The data access and analysis system, or a component thereof, receives, reads, obtains, or otherwise accesses, large language model generated data (at 4300), such as in response to the large language model input data. The large language model generated data is a representation of the natural language input data in a form other than natural language form, such as in a structured query language form. For example, the worksheet identifier, or name, may be “meteorologicalData”, the worksheet may include a “precipitation” column and a “dateCaptued” column, the natural language input data may include the string “How much did it rain last week?”, and the corresponding large language model generated data may include the string “select precipitation from meteorologicalData where dateCaptued=“last week””. The language model generated data differs from the natural language input data and equivalently expresses the natural language input data, such as in accordance with the structured query language.

The data access and analysis system, or a component thereof, transforms the large language model generated data representing the natural language input data into resolved request data representing the natural language input data (at 4400). For example, the large language model generated data may include the string “select precipitation from meteorologicalData where dateCaptued=“last week”” and the corresponding resolved request data may be expressed as“[sum precipitation] [dateCaptued=last week]”. The resolved request data differs from the natural language input data and the language model generated data, and equivalently expresses the natural language input data and the language model generated data, such as in accordance with the defined data-analytics grammar implemented by the data access and analysis system.

The data access and analysis system, or a component thereof, transforms the resolved request data corresponding to the large language model generated data and expressing the natural language input data to obtain a data query in accordance with a defined structured query language implemented by the data source (at 4500). In some implementations, the defined structured query language implemented by the data source differs from the structured query language used by the large language model to generate the large language model output data.

In some implementations, one or more portions of the large language model generated data may be incompatible with the defined data-analytics grammar implemented by the data access and analysis system. To reduce, or eliminate, incompatibilities between the large language model generated data and the defined data-analytics grammar, the data access and analysis system may automatically generate one or more automatically generated formulas to augment the defined data-analytics grammar.

For example, the natural language input data may include the string “precipitation in the northeast or precipitation before last year". The corresponding large language model generated data, which may include a subquery, may be "SELECT sum(precipitation) from W1 where (region=northeast) OR (date <last year)", wherein W1 is the identifier, or name, for the data structure indicated in the table structure data, and wherein "(region=northeast)" and "(date <last year)" are filters across columns. The defined data-analytics grammar may limit combinations of filters across columns, such as "(region=northeast)" and "(date <last year)", to conjunction ("AND"), where valid result data satisfies both filters, and disjunction ("OR") between filters across columns, wherein valid result data satisfies one or both of the filters may be incompatible with the defined data-analytics grammar. The data access and analysis system automatically generates an automatically generated formula to represent the disjunctive phrase "(region=northeast) OR (date <last year)", such as "formula F1=([region=northeast] or [date <last year])". The data access and analysis system uses the automatically generated formula to transform the incompatible portion of the large language model generated data to a resolved request.

For example, in the absence of the automatically generated formula, the transformation of the large language model generated data to a resolved request may be "[sum precipitation] [region=northeast] [date <last year]", wherein the connective between "[region=northeast]" and "[date <last year]" is implicit in the defined data-analytics grammar. The transformation of the large language model generated data to a resolved request in the absence of the automatically generated formula is an inaccurate representation of the natural language input data, "precipitation in the northeast or precipitation before last year". Using the automatically generated formula, the transformation of the large language model generated data to a resolved request may be "[sum precipitation][F1]", which is an accurate representation of the natural language input data, "precipitation in the northeast or precipitation before last year".

The data access and analysis system, or a component thereof, outputs results presentation data (at 4600) for presenting one or more portions of results data responsive to the natural language input data (obtained at 4100).

Outputting the results presentation data (at 4600) includes obtaining the results data. To obtain the results data, the data access and analysis system, or a component thereof, sends, transmits, or otherwise makes available, the data query (generated at 4500) to the data source. The data access and analysis system, or a component thereof, obtains the results data output by the data source responsive to execution of the data query by the data source. Outputting the results presentation data (at 4600) includes generating, or otherwise obtaining, the results presentation data (at 4600) in accordance with the results data. For example, the results presentation data may include a visualization of the results data, or one or more portions thereof. The data access and analysis system, or a component thereof, such as the system access interface unit 3900 shown in FIG. 3, may output, or present, the results presentation data, or a portion thereof, which may include displaying the visualization.

Figure 5:
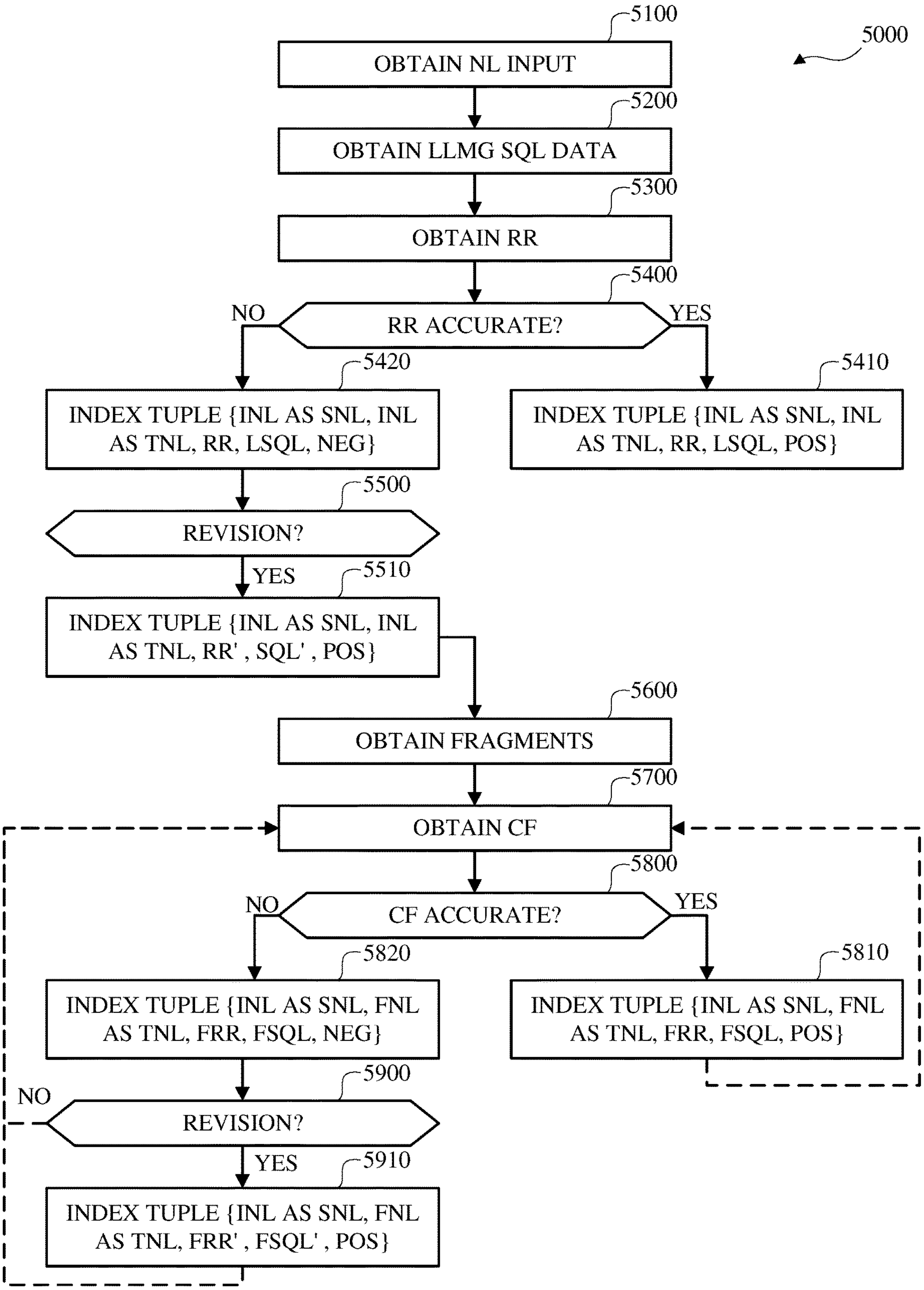
FIG. 5 is a flowchart of an example of validated resolved request data in a data access and analysis system.

FIG. 5 is a flow chart of an example of indexing validated resolved request data 5000 in a data access and analysis system. A data access and analysis system, such as the low-latency data access and analysis system 3000 shown in FIG. 3, or one or more components thereof, may implement indexing validated resolved request data 5000, or a portion thereof.

As shown in FIG. 5, indexing validated resolved request data 5000 includes obtaining input data (at 5100), obtaining large language model generated structured query language data (at 5200), obtaining resolved request data (at 5300), obtaining validated resolved request data (at 5400), indexing (at 5410, 5420), revision (at 5500), indexing (at 5510), obtaining fragments data (at 5600), obtaining current fragment data (at 5700), obtaining validated fragment data (at 5800), indexing (at 5810, 5820), revision (at 5900), and indexing (at 5910).

Obtaining input data (at 5100) includes receiving, reading, obtaining, or otherwise accessing, (at 5100), by the data access and analysis system, or a component thereof, such as a system access interface unit of the data access and analysis system, such as the system access interface unit 3900 shown in FIG. 3, input data, such as user input data (first user input data), including a natural language (NL) string (input natural language (INL) data), such as by obtaining data expressing usage intent with respect to the data access and analysis system including the user input data including the natural language string, wherein the natural language string expresses a request for data, or request to obtain data, from the data access and analysis system. For example, obtaining the input data (at 5100) may include a relational analysis unit of the data access and analysis system, such as the relational analysis unit 3700 shown in FIG. 3, obtaining the input data from the system access interface unit.

Obtaining the first user input data includes obtaining data source data identifying a database, or another data source, or a combination of data sources. For example, the data identifying the data source may identify a worksheet, such as the worksheet 4010 shown in FIG. 4. In another example, the data identifying the data source may identify a database accessible by the data access and analysis system, such as the distributed in-memory database 3300 shown in FIG. 3, or an external database. In an example, the data identifying the data source identifies a worksheet that identifies a database as a data source for populating one or more columns of the worksheet using data from, or data generated from, one or more columns from one or more tables stored in, by, or at, the database.

For example, the input natural language data may be "How many active observation stations are there in the current quarter?".

The data access and analysis system, or a component thereof, such as the relational analysis unit, obtains large language model generated structured query language (LSQL) data (large language model generated structured query language data) expressing the input natural language data (at 5200). Obtaining the large language model generated structured query language data may be similar to obtaining large language model generated data as shown (at 4300) in FIG. 4, except as is described herein or as is otherwise clear from context.

To obtain the large language model generated structured query language data expressing the input natural language data (at 5200), the data access and analysis system, or a component thereof, such as the relational analysis unit, generates, creates, or otherwise obtains, large language model input data (first large language model input data) including the input natural language data. Obtaining the first large language model input data may be similar to obtaining large language model input data as shown (at 4200) in FIG. 4, except as is described herein or as is otherwise clear from context.

To obtain the large language model generated structured query language data expressing the input natural language data (at 5200), the data access and analysis system, or a component thereof, such as the relational analysis unit, sends, transmits, or otherwise makes available, the first large language model input data to a large language model accessible by the data access and analysis system, such as the large language model 4030 shown in FIG. 4.

To obtain the large language model generated structured query language data expressing the input natural language data (at 5200), the data access and analysis system, or a component thereof, such as the relational analysis unit, receives, reads, obtains, or otherwise accesses, first large language model generated data including the large language model generated structured query language data from the large language model in response to the first large language model input data, which may be similar to obtaining large language model generated data as shown (at 4300) in FIG. 4, except as is described herein or as is otherwise clear from context.

The data access and analysis system, or a component thereof, such as the relational analysis unit, obtains first resolved request (RR) data expressing the input natural language data in accordance with the defined data-analytics grammar implemented by the data access and analysis system by transforming, or otherwise processing or using, the large language model generated structured query language data (at 5300). Obtaining the first resolved request data may be similar to transforming the large language model generated data representing the natural language input data into resolved request data representing the natural language input data as shown (at 4400) in FIG. 4, except as is described herein or as is otherwise clear from context.

The data access and analysis system, or a component thereof, such as the relational analysis unit, obtains validated resolved request data (at 5400) for the first resolved request data (obtained at 5300) expressing the input natural language data (obtained at 5100). The validated resolved request data includes data indicating a result of an accuracy, or validity, determination for the first resolved request data (RR ACCURATE?).

To obtain the validated resolved request data (at 5400) the data access and analysis system, or a component thereof, such as the relational analysis unit, generates data for presenting the first resolved request data, or one or more portions thereof, such as via an interface, such as a graphical user interface of the data access and analysis system, or a component thereof. The data for presenting the first resolved request data may include a request for the accuracy determination (validation). The accuracy determination, or validation, may be performed manually, such as by a user of the data access and analysis system.

To obtain the validated resolved request data (at 5400) the data access and analysis system, or a component thereof, such as the system access interface unit, presents, or otherwise outputs, the data for presenting the first resolved request data, such as to a user of the data access and analysis system.

To obtain the validated resolved request data (at 5400), the data access and analysis system, or a component thereof, such as the system access interface unit, receives, reads, obtains, or otherwise accesses, input data, such as user input data, including the validated resolved request data, or one or more portions thereof.

The validated resolved request data, or a portion thereof, indicates that the result of the accuracy determination, or validation, is negative (negative validated resolved request data, negative accuracy determination data, NO, NEG) or that the result of the accuracy determination is positive (positive validated resolved request data, positive accuracy determination data, YES, POS). Positive validated resolved request data indicates a determination, such as a manual determination, that the first resolved request data accurately, or validly, expresses the input natural language data in accordance with the defined data-analytics grammar. Negative validated resolved request data indicates a determination, such as a manual determination, that the first resolved request data inaccurately, inefficiently, or both, expresses the input natural language data with respect to the defined data-analytics grammar.

In some implementations, the validated resolved request data (obtained at 5400) indicates that the result of the accuracy determination is positive (YES) and the data access and analysis system, or a component thereof, such as an indexing unit of the data access and analysis system, indexes (at 5410) the validated resolved request data in an index, such as a demonstrations index or a validated resolved request data index, of the data access and analysis system. For example, the data access and analysis system, or a component thereof, such as the relational analysis unit may send, transmit, or otherwise make available the validated resolved request data to the indexing unit for indexing. The validated resolved request data index, or demonstrations index, is an index data structure in the data access and analysis system that indexes resolved request data validated prior to indexing.

Indexing the validated resolved request data including the positive accuracy determination data (at 5410) includes indexing a tuple, or document. The tuple includes the input natural language (INL) data (obtained at 5100) as source, or input, natural language (SNL) data. The tuple includes the input natural language data (obtained at 5100) as target, or fragment specific, natural language (TNL) data. The tuple includes the first resolved request (obtained at 5300) as resolved request (RR) data. The tuple includes the large language model generated structured query language (LSQL) data (obtained at 5200) as structured query language data. The tuple includes data indicating the positive accuracy determination, such as a positive integer value of one (1), as positive accuracy determination data (validation data). The tuple includes temporal data (not expressly shown), such as data indicating a temporal location corresponding to indexing the tuple. The tuple may include data source data (not expressly shown), such as column identifier, or name, data, indicating one or more data sources, or columns, such as data sources indicated by the resolved request (RR) data (obtained at 5300), the structured query language (SQL) data (obtained at 5200), or both.

In some implementations, the tuple, or data indexed in association with the tuple, may include other data, such as usage data, mapping scope data, data-domain data, a user identifier, data indicating whether the validated resolved request data is associated with an administrative account, which may indicate an administrative account type, ontological data for the natural language string, which may include categorical data.

In some implementations, indexing the validated resolved request data includes (at 5410) determining that the validated resolved request data index includes previously indexed validated resolved request data (indexed tuple) matching the validated resolved request data with respect to the source natural language (SNL) data, the target natural language (TNL) data, the resolved request (RR) data, and the large language model generated structured query language (LSQL) data, and indexing the validated resolved request data includes incrementing, such as by adding one (1), the positive accuracy determination data in the indexed tuple.

In some implementations, the validated resolved request data (obtained at 5400) indicates that the result of the accuracy determination is negative (NO) and the data access and analysis system, or a component thereof, such as an indexing unit of the data access and analysis system, indexes (at 5420) the validated resolved request data in the validated resolved request data index. For example, the data access and analysis system, or a component thereof, such as the relational analysis unit may send, transmit, or otherwise make available the validated resolved request data to the indexing unit for indexing.

Indexing the validated resolved request data including the negative accuracy determination data (at 5420) includes indexing a tuple, or document. The tuple includes the input natural language data (obtained at 5100) as source, or input, natural language (SNL) data. The tuple includes the input natural language data (obtained at 5100) as target, or fragment specific, natural language (TNL) data. The tuple includes the first resolved request data (obtained at 5300) as resolved request (RR) data. The tuple includes the large language model generated structured query language (LSQL) data (obtained at 5200). The tuple includes data indicating the negative accuracy determination, such as an integer value of one (1), as negative accuracy determination data (validation data). The tuple includes temporal data (not expressly shown), such as data indicating a temporal location corresponding to indexing the tuple. The tuple may include data source data (not expressly shown), such as column identifier, or name, data, indicating one or more data sources, or columns, such as data sources indicated by the resolved request (RR) data (obtained at 5300), the structured query language (SQL) data (obtained at 5200), or both.

In some implementations, the tuple, or data indexed in association with the tuple, may include other data, such as usage data, mapping scope data, data-domain data, a user identifier, data indicating whether the validated resolved request data is associated with an administrative account, which may indicate an administrative account type, ontological data for the natural language string, which may include categorical data.

In some implementations, indexing the validated resolved request data including the negative accuracy determination data (at 5420) includes determining that the validated resolved request data index includes previously indexed validated resolved request data (indexed tuple) matching the validated resolved request data with respect to the source natural language data, the target natural language data, the resolved request data, and the structured query language data, and indexing the validated resolved request data includes incrementing, such as by adding one (1), the negative accuracy determination data in the indexed tuple.

The data access and analysis system, or a component thereof, such as the relational analysis unit, determines (at 5500) whether revised resolved request (RR') data expressing the input natural language data (obtained at 5100) in accordance with the defined data-analytics grammar is available (REVISION?) for the resolved request data (obtained at 5300). Determining whether the revised resolved request data is available for the resolved request data includes obtaining the revised resolved request data (at 5500).

To obtain the revised resolved request data expressing the input natural language data in accordance with the defined data-analytics grammar (at 5500), the data access and analysis system, or a component thereof, such as the relational analysis unit, generates data for presenting a request for the revised resolved request data, such as via an interface, such as a graphical user interface of the data access and analysis system, or a component thereof. The data for presenting a request for the revised resolved request data includes the resolved request data (obtained at 5300). The data for presenting a request for the revised resolved request data includes a request to revise, correct, modify, or amend, the resolved request data.

To obtain the revised resolved request data (at 5500) the data access and analysis system, or a component thereof, such as the system access interface unit, presents, or otherwise outputs, the data for presenting the request for the revised resolved request data, such as to a user of the data access and analysis system.

To obtain the revised resolved request data (at 5500), the data access and analysis system, or a component thereof, such as the system access interface unit of the data access and analysis system, receives, reads, obtains, or otherwise accesses, input data, such as user input data, including the revised resolved request data, or one or more portions thereof.

The revised resolved request data is similar to the resolved request data (obtained at 5300), except as is described herein or as is otherwise clear from context. One or more portions of the revised resolved request data (obtained at 5500) differ from corresponding portions of the resolved request data (obtained at 5300). One or more portions of the revised resolved request data (obtained at 5500) match, or are obtained from, corresponding portions of the resolved request data (obtained at 5300).

The difference, or differences, between the resolved request data (obtained at 5300) and the revised resolved request data (obtained at 5500) may be manually generated differences. For example, the revised resolved request data (obtained at 5500) may include one or more portions of the resolved request data (obtained at 5300), one or more modified, such as manually modified, portions, or a combination thereof. For example, a first portion of the revised resolved request data (obtained at 5500) may be, or match, a first portion of the resolved request data (obtained at 5300) and a second portion of the revised resolved request data (obtained at 5500) may be a manually generated modification, or replacement, of a second portion of the resolved request data (obtained at 5300).

In response to obtaining the revised resolved request data, or otherwise determining that the revised resolved request data is available (YES), (at 5500), the data access and analysis system, or a component thereof, such as a semantic interface unit of the data access and analysis system, such as the semantic interface unit 3600 shown in FIG. 3, obtains (at 5500) regenerated structured query language (SQL') data, which is access and analysis system generated structured query language data expressing the input natural language data in accordance with the defined structured query language associated with, such as implemented by, the distributed in-memory database 3300, obtained by automatically transforming the revised resolved request data (obtained at 5500), which may be similar to the transforming described with respect to the semantic interface unit 3600 shown in FIG. 3, except as is described herein or as is otherwise clear from context.

In response to obtaining the revised resolved request data, or otherwise determining that the revised resolved request data is available (YES), (at 5500), the data access and analysis system, or a component thereof, such as an indexing unit of the data access and analysis system, indexes (at 5510) the validated resolved request data including the revised resolved request data in the validated resolved request data index. For example, the data access and analysis system, or a component thereof, such as the relational analysis unit may send, transmit, or otherwise make available the validated resolved request data including the revised resolved request data to the indexing unit for indexing.

Indexing the validated resolved request data (at 5510) includes indexing a tuple, or document. The tuple includes the input natural language (INL) data (obtained at 5100) as source, or input, natural language (SNL) data. The tuple includes the input natural language (INL) data (obtained at 5100) as target, or fragment specific, natural language (TNL) data. The tuple includes the revised resolved request (RR') data (obtained at 5500). The tuple includes the regenerated structured query language (SQL') data (obtained at 5500). The tuple includes data indicating a positive accuracy determination, such as a positive integer value of one (1), as positive accuracy determination data (validation data). The tuple includes temporal data (not expressly shown), such as data indicating a temporal location corresponding to indexing the tuple. The tuple may include data source data (not expressly shown), such as column identifier, or name, data, indicating one or more data sources, or columns, such as data sources indicated by the revised resolved request (RR') data (obtained at 5500), the regenerated structured query language (SQL') data (obtained at 5500), or both.

In some implementations, the tuple, or data indexed in association with the tuple, may include other data, such as usage data, mapping scope data, data-domain data, a user identifier, data indicating whether the validated resolved request data is associated with an administrative account, which may indicate an administrative account type, ontological data for the natural language string, which may include categorical data.

In some implementations, indexing the validated resolved request data (at 5510) includes determining that the validated resolved request data index includes previously indexed validated resolved request data (indexed tuple) matching the validated resolved request data with respect to the source natural language data, the target natural language data, the revised resolved request data, and the regenerated structured query language data, and indexing the validated resolved request data (at 5510) includes incrementing, such as by adding one (1), the positive accuracy determination data in the indexed tuple.

In response to determining (at 5500) that the revised resolved request data is unavailable (NO), indexing (at 5510) the validated resolved request data is omitted, excluded, or skipped.

The data access and analysis system, or a component thereof, such as the relational analysis unit, obtains fragments data (at 5600). To obtain the fragments data, the data access and analysis system, or a component thereof, such as the relational analysis unit, obtains, or generates, large language model input data (second large language model input data). To obtain the second large language model input data, the data access and analysis system, or a component thereof, such as the relational analysis unit, obtains, or generates, large language model prompt data.

In an example, the revised resolved request data is unavailable (at 5500), and the large language model prompt data includes a defined fragments generation prompt portion, the input natural language data (obtained at 5100), the resolved request data (obtained at 5300), and the structured query language data (obtained at 5300).

In another example, the revised resolved request data is available (at 5500), and the large language model prompt data includes the defined fragments generation prompt portion, the input natural language data (obtained at 5100), the revised resolved request data (obtained at 5500), and the regenerated structured query language data (obtained at 5500).

Obtaining the large language model prompt data includes obtaining the defined fragments generation prompt portion. Obtaining the defined fragments generation prompt portion may be similar to obtaining prompt data as shown (at 4200) in FIG. 4, except as is described herein or as is otherwise clear from context.

The defined fragments generation prompt portion may be expressed as the following:

```
"
'''
As a SQL data analyst expert, match the provided NL query fragments to the
phrases present in the "Phrases" set, covering all SQL clauses. Examples are
provided to explain the task.
'''
Example Input:
NL: [most active precipitation type] [monthly] [for] [last year]
Phrases: [sum Precipitation] [monthly RecordDate] [Rain Snow Hail]
[Precipitation Type] [sort by Precipitation descending] [last year]
SQL: select SUM(Precipitation), Precipitation__Type, MONTHLY(RecordDate)
from __Recorded__Precipitation WHERE ( Precipitation__Type in ( 'Rain', 'Snow',
'Hail') AND RecordDate = __last__year( )) group by Precipitation__Type order by
SUM(Precipitation) desc;
Output:
{
"fragments": [
  {
  "nl": "most active precipitation type",
  "indices": [2, 4]
  },
  {
  "nl": "monthly",
  "indices": [1]
  },
  {
  "nl": "last year",
  "indices": [5]
  }
]
}
```

-continued

Explanation:
The input field "NL" is the user's natural language query broken down into fragments enclosed in square brackets. We need to assign phrases from: "Phrases" input field to each of the fragments in "NL" query & return the index of the phrase in the Phrases set. The index of each phrase in "Phrases" set is in the order of appearance i.e. [sum Precipitation] has index 0, then [monthly RecordDate] has index 1, so on, basically they are 0-indexed.
The input field "Phrases" contains all clauses extracted from the given SQL query & enclosed in square brackets.
We can match the fragments in the example as follows:
1. "most active precipitation type":
In SQL query, most active is represented by "order by SUM(precipitation) desc" clause, which orders the results based on the sum of precipitation in descending order. By sorting the data in descending order, we can identify the most active precipitation type.
For this fragment's phrase query, it borrows phrases with index 0 and 4 i.e. [sum precipitation] and [sort by Precipitation descending] respectively. In the SQL query, "precipitation type" is represented as filter: WHERE (Precipitation_Type in ('Rain', 'Snow', 'Hail')). We can similarly deduce its phrase indices as well: [2, 3].
2. "monthly":
This fragment indicates that we want to analyze the activity of precipitation types on a monthly basis. In the SQL query, the "MONTHLY(RecordDate)" function is used to group the data by months of the "RecordDate" column. Its phrase is: [monthly RecordDate] & its index is 1.
3. "for":
This fragment cannot be matched with any phrase but only used to form user's NL sentence. Ignore this fragment.
4. "last year"
This is present in Phrases set as well as in the SQL WHERE clause as a filter: "RecordDate = __last__year( )". Its phrase is: [last year] & its index in Phrases set is: 5.
Ignore NL query fragments that do not have any phrase match, for example in above example, "for" does not have any phrase match.
Union of all indices in all the fragments would be: [0, 1, 2, 3, 4, 5] i.e. it covers all the phrases in "Phrases" set. No phrase in the "Phrases" set should be left un-matched.
' ' '
Lets take another example input:
' ' '
Example Input:
NL: [What] [were] [the top 3 states] [for] [snow]
Phrases: [state] [sum Precipitation] [precipitation_type = 'snow'] [by state] [sort by sum Precipitation descending] [top 3]
SQL: select state, SUM(Precipitation) from Recorded_Precipitation where Precipitation_Type = 'snow' group by state order by SUM(Precipitation) desc limit 3
Output:

```
{
"fragments": [
  {
  "nl": " the top 3 states ",
  "indices": [0, 3, 4, 5]
  },
  {
  "nl": "snow precipitation",
  "indices": [1,2]
  },
]
}
```

Explanation

Ignore NL query fragments that do not have any phrase match, for example in above example, "what", "were" & "for" do not have any direct phrase match but only help in sentence forming.

Union of all indices is: [0, 1, 2, 3, 4, 5] i.e. it covers all the phrases in "Phrases" set. No phrase in the "Phrases" set should be left un-matched.

"the top 3 states" fragment hints that it is a top/bottom type of fragment. Such fragments are synonymous with best performing, most active, so on. Its matched phrases are composed of a sort by or ranked by phrase. In the current example that would be phrase with index: 4→[sort by sum precipitation descending]. Then it involves picking the top "n" (default is 10), in this case it is 3, so we need to pick top 3 states based on precipitation in those states. So we can also assign the phrases [top 3], [state] and [by state] as well.

' ' '
' ' '
Now return only the output in JSON format for the input below (NO Explanation is required):
NL: [In] [how many sessions] [was] [the trip Berlin] [to] [Muenchen] [searched] [for] [in] [the last month?]
Phrases: [Route = 'berlin#muenchen'] [Session Start Date = this month] [No. Searches]

-continued

```
SQL: select No_Searches from Web_Traffic where (
Session_Start_Date = 'this month' and Route = 'berlin#muenchen' ) ;
Output:".
```

Other expressions of the defined fragments generation prompt portion may be used.

The data access and analysis system, or a component thereof, such as the relational analysis unit, includes the defined fragments generation prompt portion in the large language model prompt data.

The data access and analysis system, or a component thereof, such as the relational analysis unit, includes, in the large language model prompt data, subsequent to the defined fragments generation prompt portion, a first text preamble, such as "NL:", indicating that the subsequent portion includes natural language data.

The data access and analysis system, or a component thereof, such as the relational analysis unit, includes, in the large language model prompt data, subsequent to the first text preamble, the input natural language data (obtained at 5100).

The data access and analysis system, or a component thereof, such as the relational analysis unit, includes, in the large language model prompt data, subsequent to the input natural language data, a second text preamble, such as "Phrase:", indicating that the subsequent portion includes resolved request data.

In an example, the validated resolved request data is unavailable (at 5500), and the data access and analysis system, or a component thereof, such as the relational analysis unit, includes, in the large language model prompt data, subsequent to the second text preamble, the resolved request data (obtained at 5300).

In another example, the validated resolved request data is available (at 5500), and the data access and analysis system, or a component thereof, such as the relational analysis unit, includes, in the large language model prompt data, subsequent to the second text preamble, the revised resolved request data (obtained at 5500).

The data access and analysis system, or a component thereof, such as the relational analysis unit, includes, in the large language model prompt data, subsequent to the resolved request data, a third text preamble, such as "SQL:", indicating that the subsequent portion includes structured query language data.

In an example, the validated resolved request data is unavailable (at 5500), and the data access and analysis system, or a component thereof, such as the relational analysis unit, includes, in the large language model prompt data, subsequent to the third text preamble, the structured query language data (obtained at 5300).

In another example, the validated resolved request data is available (at 5500), and the data access and analysis system, or a component thereof, such as the relational analysis unit, includes, in the large language model prompt data, subsequent to the third text preamble, the regenerated structured query language data (obtained at 5500).

The data access and analysis system, or a component thereof, such as the relational analysis unit, sends, transmits, or otherwise makes available, the large language model prompt data to the large language model as large language model input data (the second large language model input data).

The data access and analysis system, or a component thereof, such as the relational analysis unit, receives, reads, obtains, or otherwise accesses, from the large language model, the fragments data (at 5600), such as in response to sending, transmitting, or otherwise making available, the first prompt data to the large language model.

The fragments data includes one or more fragment tuples. A fragment tuple includes a fragment, such as a phrase or chunk, of the natural language ("NL:") data from the large language model input data and resolved request phrase data including one or more index values, with respect to an index of the phrases from the phrases ("Phrases:") data from the large language model input data, associated with the fragment of the natural language data.

For example, the phrases ("Phrases:") data from the large language model input data may include "[sum Precipitation] [monthly RecordDate] [Rain Snow Hail] [Precipitation Type] [sort by Precipitation descending] [last year]," and the index of the index of the phrases data may index a first phrase, or chunk, of the resolved request, "[sum Precipitation]" at a first index location (0), a second phrase, or chunk, of the resolved request, "[monthly RecordDate]" at a second index location (1), a third phrase, or chunk, of the resolved request, "[Rain Snow Hail]" at a third index location (2), a fourth phrase, or chunk, of the resolved request, "[Precipitation Type]" at a fourth index location (3), a fifth phrase, or chunk, of the resolved request, "[sort by Precipitation descending]" at a fifth index location (4), and a sixth phrase, or chunk, of the resolved request, "[last year]" at a sixth index location (5).

In an example, the fragments data may be expressed as the following:

```
"{
"fragments": [
  {
  "nl": " most active precipitation type ",
  "indices": [2, 4]
  },
  {
  "nl": "monthly",
  "indices": [1]
  },
  {
  "nl": "last year",
  "indices": [5]
  }
 ]
}".
```

The data access and analysis system, or a component thereof, such as the relational analysis unit, obtains (at 5700) current fragment (CF) data for a current fragment from the fragments data (obtained at 5600). Although described with respect to a (one) current fragment, obtaining current fragment data (at 5700), obtaining validated fragment data (at 5800), and indexing (at 5810, 5820), revision (at 5900), and indexing (at 5910) may be performed for multiple fragments, such as the fragments from the fragments data (obtained at 5600), such as concurrently or iteratively, as indicated by the directional broken lines from indexing (at 5810), revision (at 5900), and indexing (at 5910) to obtaining the current fragment (at 5700).

In an example, the fragments data (obtained at 5600) includes a first fragment tuple, obtained as the current fragment data (at 5700), which includes a fragment, chunk, or phrase, of the input natural language data and resolved request phrase data, including one or more index values, with respect to an index of the phrases from the phrases ("Phrases:") data from the large language model input data, associated with, or expressing, the fragment of the natural language data.

The data access and analysis system, or a component thereof, such as the relational analysis unit, obtains validated fragment data (at 5800) for the current fragment data (obtained at 5700). The validated fragment data includes data indicating a result of an accuracy, or validity, determination (second accuracy determination) for the current fragment (CF ACCURATE?).

To obtain the validated fragment data (at 5800), the data access and analysis system, or a component thereof, such as the relational analysis unit, obtains fragment resolved request (FRR) data expressing the resolved request phrase data from the current fragment data (obtained at 5700). To obtain the fragment resolved request (FRR) data, the data access and analysis system, or a component thereof, such as the relational analysis unit, obtains the resolved request phrase data including one or more index values, with respect to the index of the phrases from the phrases ("Phrases:") data from the large language model input data. To obtain the fragment resolved request (FRR) data, the data access and analysis system, or a component thereof, such as the relational analysis unit, obtains the phrase, chunk, phrases, or chunks, of the resolved request indicated by the one or more index values from the resolved request phrase data.

In some implementations, the resolved request phrase data includes one index value with respect to the index of the phrases from the phrases ("Phrases:") data from the large language model input data, and the data access and analysis system, or a component thereof, such as the relational analysis unit, obtains the phrase, or chunk, of resolved request data indicated by the index value. For example, the phrases ("Phrases:") data from the large language model input data may be "Phrases: [sum Precipitation] [monthly RecordDate] [Rain Snow Hail] [Precipitation Type] [sort by Precipitation descending] [last year]," the current fragment data (obtained at 5700) may be "{"n1": "monthly", "indices": [1]}," and the data access and analysis system, or a component thereof, such as the relational analysis unit, obtains the phrase, or chunk, of resolved request data, "monthly RecordDate" indicated by the index value one (1) as the fragment resolved request (FRR) data.

In some implementations, the resolved request phrase data includes two or more index values with respect to the index of the phrases from the phrases ("Phrases:") data from the large language model input data, and the data access and analysis system, or a component thereof, such as the relational analysis unit, obtains the phrases, or chunks, of resolved request data indicated by the index values, and aggregates, or combines, the phrases, or chunks, of resolved request data to obtain the fragment resolved request (FRR) data. For example, the phrases ("Phrases:") data from the large language model input data may be "Phrases: [sum Precipitation] [monthly RecordDate] [Rain Snow Hail] [Precipitation Type] [sort by Precipitation descending] [last year]," the current fragment data (obtained at 5700) may be "{"n1": "most active precipitation type", "indices": [2, 4]}," the data access and analysis system, or a component thereof, such as the relational analysis unit, obtains the phrase, or chunk, of resolved request data, "Rain Snow Hail" indicated by the index value two (2) and the phrase, or chunk, of resolved request data, "sort by Precipitation descending" indicated by the index value four (4), and the data access and analysis system, or a component thereof, such as the relational analysis unit, obtains, as the fragment resolved request (FRR) data, an aggregation, or combination, of "Rain Snow Hail" and "sort by Precipitation descending", such as "Rain Snow Hail sort by Precipitation descending."

To obtain the validated fragment data (at 5800) the data access and analysis system, or a component thereof, such as the relational analysis unit, generates data for presenting the fragment resolved request (FRR) data corresponding to the current fragment data, or one or more portions thereof, such as via an interface, such as a graphical user interface of the data access and analysis system, or a component thereof. The data for presenting the fragment resolved request (FRR) data may include a request for the accuracy determination (validation). The accuracy determination, or validation, may be performed manually, such as by a user of the data access and analysis system.

To obtain the validated fragment data (at 5800), the data access and analysis system, or a component thereof, such as the system access interface unit, presents, or otherwise outputs, the data for presenting the fragment resolved request (FRR) data, such as to a user of the data access and analysis system.

To obtain the validated fragment data (at 5800), the data access and analysis system, or a component thereof, such as the system access interface unit, receives, reads, obtains, or otherwise accesses, input data, such as user input data, including the validated fragment data, or one or more portions thereof.

The validated fragment data, or a portion thereof, indicates that the result of the accuracy determination, or validation, is negative (negative validated fragment data, negative accuracy determination data, NO, NEG) or that the result of the accuracy determination is positive (positive validated fragment data, positive accuracy determination data, YES, POS). Positive validated fragment data indicates a determination, such as a manual determination, that the fragment resolved request (FRR) data for the current fragment data accurately, or validly, expresses the fragment of the input natural language data from the current fragment data in accordance with the defined data-analytics grammar. Negative validated fragment data indicates a determination, such as a manual determination, that the fragment resolved request (FRR) data for the current fragment data inaccurately, inefficiently, or both, expresses the fragment of the input natural language data from the current fragment data with respect to the defined data-analytics grammar.

In some implementations, the validated fragment data (obtained at 5800) indicates that the result of the accuracy determination (at 5800) is positive (YES) and the data access and analysis system, or a component thereof, such as an indexing unit of the data access and analysis system, indexes (at 5810) the validated fragment data in the index, such as the demonstrations index or the validated resolved request data index, of the data access and analysis system. For example, the data access and analysis system, or a component thereof, such as the relational analysis unit may send, transmit, or otherwise make available the validated fragment data to the indexing unit for indexing.

To index the validated fragment data (obtained at 5800), the data access and analysis system, or a component thereof, such as the relational analysis unit, obtains regenerated structured query language data for the fragment (fragment structured query language (FSQL) data), which is access and analysis system generated structured query language data expressing the resolved request phrase fragment indicated in the fragment resolved request (FRR) data in accordance with the defined structured query language associated with, such as implemented by, the distributed in-memory database 3300, obtained by automatically transforming the resolved request phrase fragment indicated in the fragment resolved request (FRR) data, which may be similar to the transforming described with respect to the semantic interface unit 3600 shown in FIG. 3, except as is described herein or as is otherwise clear from context.

Indexing the validated fragment data (at 5810) includes indexing a tuple, or document. The tuple (indexed at 5810) includes the input natural language (INL) data (obtained at 5100) as source, or input, natural language (SNL) data. The tuple includes the fragment of the input natural language data (FNL) from the current fragment data (obtained at 5700) as target, or fragment specific, natural language (TNL) data. The tuple includes the automatically generated fragment resolved request (FRR) data expressing the fragment of the input natural language data from the current fragment data (obtained at 5700). The tuple includes the structured query language (SQL) data automatically generated for the fragment resolved request (FRR) data (fragment structured query language (FSQL) data). The tuple includes data indicating the positive accuracy determination, such as a positive integer value of one (1), as positive accuracy determination data (validation data). The tuple includes temporal data (not expressly shown), such as data indicating a temporal location corresponding to indexing the tuple. The tuple may include data source data (not expressly shown), such as column identifier, or name, data, indicating one or more data sources, or columns, such as data sources indicated by the fragment resolved request (FRR) data (obtained at 5700), the fragment structured query language (FSQL) data, or both.

In some implementations, the tuple, or data indexed in association with the tuple, may include other data, such as usage data, mapping scope data, data-domain data, a user identifier, data indicating whether the validated resolved request data is associated with an administrative account, which may indicate an administrative account type, ontological data for the natural language string, which may include categorical data.

In some implementations, indexing the validated fragment data (at 5810) includes determining that the validated resolved request data index includes previously indexed validated fragment data (indexed tuple) matching the validated fragment data with respect to the source natural language data, the target natural language data, the fragment resolved request data, and the structured query language data from the current fragment, and indexing (at 5810) the validated fragment data includes incrementing, such as by adding one (1), the positive accuracy determination data in the indexed tuple.

In some implementations, the validated fragment data (obtained at 5800) indicates that the result of the accuracy determination is negative (NO) and the data access and analysis system, or a component thereof, such as an indexing unit of the data access and analysis system, indexes (at 5820) the validated fragment data in the validated resolved request data index. For example, the data access and analysis system, or a component thereof, such as the relational analysis unit may send, transmit, or otherwise make available (at 5820) the validated fragment data to the indexing unit for indexing.

Indexing the validated fragment data (at 5820) includes indexing a tuple, or document. The tuple (indexed at 5820) includes the input natural language (INL) data (obtained at 5100) as source, or input, natural language (SNL) data. The tuple includes the fragment of the input natural language data (FNL) from the current fragment data (obtained at 5700) as target, or fragment specific, natural language (TNL) data. The tuple includes the automatically generated fragment resolved request (FRR) data expressing the fragment of the input natural language data from the current fragment data (obtained at 5700). The tuple includes the structured query language (SQL) data automatically generated for the fragment resolved request (FRR) data (fragment structured query language (FSQL) data). The tuple includes data indicating the negative accuracy determination, such as an integer value of one (1), as negative accuracy determination data (validation data). The tuple includes temporal data (not expressly shown), such as data indicating a temporal location corresponding to indexing the tuple. The tuple may include data source data (not expressly shown), such as column identifier, or name, data, indicating one or more data sources, or columns, such as data sources indicated by the fragment resolved request (FRR) data (obtained at 5700), the fragment structured query language (FSQL) data, or both.

In some implementations, the tuple, or data indexed in association with the tuple, may include other data, such as usage data, mapping scope data, data-domain data, a user identifier, data indicating whether the validated resolved request data is associated with an administrative account, which may indicate an administrative account type, ontological data for the natural language string, which may include categorical data.

In some implementations, indexing the validated fragment data (at 5820) includes determining that the validated resolved request data index includes previously indexed validated fragment data matching the validated fragment data (indexed tuple) with respect to the source natural language data, the target natural language data, the fragment resolved request data, and the fragment structured query language data from the current fragment, and indexing (at 5820) the validated fragment data includes incrementing, such as by adding one (1), the negative accuracy determination data in the indexed tuple.

The data access and analysis system, or a component thereof, such as the relational analysis unit, determines (at 5900) whether revised fragment resolved request data (FRR') including a revised fragment resolved request phrase expressing the target natural language data (the fragment of the input natural language data from the current fragment data) in accordance with the defined data-analytics grammar is available (REVISION?) for the resolved request phrase (obtained at 5800). Determining whether the revised fragment resolved request data is available for the resolved request phrase includes obtaining the revised fragment resolved request data (at 5900).

The data access and analysis system, or a component thereof, such as the relational analysis unit, obtains (at 5900) the revised fragment resolved request data (FRR') including a revised fragment resolved request phrase expressing the target natural language data (the fragment of the input natural language data from the current fragment data) in accordance with the defined data-analytics grammar.

To obtain the revised fragment resolved request data including the revised fragment resolved request phrase expressing the target natural language data from the current fragment in accordance with the defined data-analytics grammar (at 5900), the data access and analysis system, or a component thereof, such as the relational analysis unit, generates data for presenting a request for the revised fragment resolved request data, such as via an interface, such as a graphical user interface of the data access and analysis system, or a component thereof. The data for presenting the request for the revised fragment resolved request data includes the fragment resolved request data from the current fragment (obtained at 5700). The data for presenting the request for the revised fragment resolved request data includes a request to revise, correct, modify, or amend, the fragment resolved request data.

To obtain the revised fragment resolved request data including the revised fragment resolved request phrase expressing the target natural language data from the current fragment in accordance with the defined data-analytics grammar (at 5900), the data access and analysis system, or a component thereof, such as the system access interface unit, presents, or otherwise outputs, the data for presenting the request for the revised fragment resolved request data, such as to a user of the data access and analysis system.

To obtain the revised fragment resolved request data including the revised fragment resolved request phrase expressing the target natural language data from the current fragment in accordance with the defined data-analytics grammar (at 5900), the data access and analysis system, or a component thereof, such as the system access interface unit of the data access and analysis system, receives, reads, obtains, or otherwise accesses, user input data including the revised fragment resolved request data, or one or more portions thereof.

The revised fragment resolved request data including the revised fragment resolved request phrase expressing the target natural language data from the current fragment in accordance with the defined data-analytics grammar is similar to the fragment resolved request data from the current fragment, except as is described herein or as is otherwise clear from context. One or more portions of the revised fragment resolved request data (obtained at 5900) differ from corresponding portions of the fragment resolved request data from the current fragment. One or more portions of the revised fragment resolved request data (obtained at 5900) match, or are obtained from, corresponding portions of the fragment resolved request data from the current fragment.

The difference, or differences, between the fragment resolved request data from the current fragment (obtained at 5700) and the revised fragment resolved request data (obtained at 5900) may be manually generated differences. For example, the revised fragment resolved request data (obtained at 5900) may include one or more portions of the fragment resolved request data from the current fragment, one or more modified, such as manually modified, portions, or a combination thereof. For example, a first portion of the revised fragment resolved request data (obtained at 5900) may be, or match, a first portion of the fragment resolved request data from the current fragment and a second portion of the revised fragment resolved request data (obtained at 5900) may be a manually generated modification, or replacement, of a second portion of the fragment resolved request data from the current fragment. The data access and analysis system, or a component thereof, such as the semantic interface unit of the data access and analysis system, replaces, in the current fragment data, the fragment resolved request data (obtained at 5700) with the revised fragment resolved request data (obtained at 5900).

In response to obtaining the revised fragment resolved request data, or otherwise determining that the revised fragment resolved request data is available (YES), (at 5900), the data access and analysis system, or a component thereof, such as the semantic interface unit of the data access and analysis system, obtains (at 5900) regenerated fragment structured query language (FSQL') data expressing the target natural language data from the current fragment, which is access and analysis system generated structured query language data expressing the target natural language data from the current fragment in accordance with the defined structured query language associated with, such as implemented by, the distributed in-memory database 3300, obtained by automatically transforming the revised fragment resolved request data (obtained at 5900), which may be similar to the transforming described with respect to the semantic interface unit 3600 shown in FIG. 3, except as is described herein or as is otherwise clear from context. The data access and analysis system, or a component thereof, such as the semantic interface unit of the data access and analysis system, replaces, in the current fragment data, the fragment structured query language data with the regenerated fragment structured query language data.

In response to obtaining the revised fragment resolved request data, or otherwise determining that the revised fragment resolved request data is available (YES), (at 5900), the data access and analysis system, or a component thereof, such as an indexing unit of the data access and analysis system, indexes (at 5910) the validated fragment data including the revised fragment resolved request data in the validated resolved request data index. For example, the data access and analysis system, or a component thereof, such as the relational analysis unit may send, transmit, or otherwise make available the validated fragment data including the revised fragment resolved request data to the indexing unit for indexing.

Indexing the validated fragment data (at 5910) includes indexing a tuple, or document. The tuple includes the input natural language (INL) data (obtained at 5100) as source, or input, natural language (SNL) data. The tuple includes the fragment of the input natural language data (FNL) from the current fragment data (obtained at 5700) as target, or fragment specific, natural language (TNL) data. The tuple includes the revised fragment resolved request (FRR') data (obtained at 5900) as resolved request data. The tuple includes the regenerated fragment structured query language (FSQL') data (obtained at 5900) as structured query language data. The tuple includes data indicating a positive accuracy determination, such as a positive integer value of one (1), as positive accuracy determination data (validation data). The tuple includes temporal data (not expressly shown), such as data indicating a temporal location corresponding to indexing the tuple. The tuple may include data source data (not expressly shown), such as column identifier, or name, data, indicating one or more data sources, or columns, such as data sources indicated by the revised fragment resolved request (FRR') data (obtained at 5900), the regenerated fragment structured query language (FSQL') data (obtained at 5900), or both.

In some implementations, the tuple, or data indexed in association with the tuple, may include other data, such as usage data, mapping scope data, data-domain data, a user identifier, data indicating whether the validated resolved request data is associated with an administrative account, which may indicate an administrative account type, ontological data for the natural language string, which may include categorical data.

In some implementations, indexing the validated fragment data including the revised fragment resolved request data (at 5910) includes determining that the validated resolved request data index includes previously indexed validated fragment data (indexed tuple) matching the validated fragment data with respect to the source natural language data, the target natural language data, the revised fragment resolved request data, and the regenerated fragment structured query language data, and indexing the validated fragment data including the revised fragment resolved request data includes incrementing (at 5910), such as by adding one (1), the positive accuracy determination data in the indexed tuple.

In response to determining that the revised fragment resolved request data is unavailable (NO), (at 5900), indexing (at 5910) the validated fragment data including the revised fragment resolved request data is omitted, excluded, or skipped.

FIG. 6 is a flowchart of an example of obtaining demonstration data 6000 in a data access and analysis system. The data access and analysis system may be similar to the data access and analysis system 3000 shown in FIG. 3, except as is described herein or as is otherwise clear from context. The data access and analysis system may implement obtaining demonstration data 6000. For example, the data access and analysis system may implement obtaining demonstration data 6000 to obtain the demonstration data 4040 shown in FIG. 4. Obtaining large language model input data, such obtaining large language model input data as shown (at 4200) in FIG. 4, may include obtaining demonstration data 6000.

In accordance with prompt signifier data, such as the prompt signifier data obtained as shown (at 4200) in FIG. 4, prompt context data, such as the prompt context data obtained as shown (at 4200) in FIG. 4, or both, the demonstration data may be, or include, one or more examples of natural language input data and corresponding structured query language data, that the large language model may use to determine how to generate, such as structure, format, or a combination thereof, the large language model generated data responsive to natural language input data (request for data) included in the large language model input data.

Obtaining the demonstration data 6000 includes obtaining natural language data (at 6100), obtaining candidate matching demonstrations (at 6200), obtaining noun-phrase fragments (at 6300), filtering and sorting (at 6400), determining whether the prompt context data includes a column corresponding to a selected determination (at 6500), including the column in the prompt context data (at 6600), and outputting the demonstration data (at 6700).

Obtaining natural language data (at 6100) includes receiving, reading, obtaining, or otherwise accessing, (at 6100), by the data access and analysis system, or a component thereof, such as a system access interface unit of the data access and analysis system, such as the system access interface unit 3900 shown in FIG. 3, input data, such as user input data (first user input data), including a natural language (NL) string (NL input or natural language string), such as by obtaining data expressing usage intent with respect to the data access and analysis system including the user input data including the natural language string, wherein the natural language string expresses a request for data, or request to obtain data, from the data access and analysis system. For example, obtaining the natural language data (at 6100) may include a relational analysis unit of the data access and analysis system, such as the relational analysis unit 3700 shown in FIG. 3, obtaining the natural language data from the system access interface unit.

Obtaining the natural language data includes obtaining data source data identifying a database, or another data source, or a combination of data sources. For example, the data identifying the data source may identify a worksheet, such as the worksheet 4010 shown in FIG. 4. In another example, the data identifying the data source may identify a database accessible by the data access and analysis system, such as the distributed in-memory database 3300 shown in FIG. 3, or an external database. In an example, the data identifying the data source identifies a worksheet that identifies a database as a data source for populating one or more columns of the worksheet using data from, or data generated from, one or more columns from one or more tables stored in, by, or at, the database.

For example, the first natural language string may be "How many active observation stations are there in the current quarter?".

The data access and analysis system, or a component thereof, such as the relational analysis unit, obtains one or more candidate matching demonstrations (at 6200) (first candidate matching demonstrations). A candidate matching demonstration is a previously indexed, such as in the demonstrations, or validated resolved request data, index, tuple that includes source, or input, natural language data, target, or fragment specific, natural language data, resolved request data, structured query language data, data source data, validation data, and temporal data.

The source, or input, natural language data from the candidate matching demonstration is a natural language string, such as the first natural language string previously indexed as shown (at 5410, 5420, 5510, 5810, 5820, or 5910) in FIG. 5. For example, the source, or input, natural language data from the candidate matching demonstration may include the natural language string "What is the precipitation from measurement of rain last year?"

The target natural language data from the candidate matching demonstration, is the source, or input, natural language data, or a portion, such as a fragment, thereof, previously indexed as shown (at 5410, 5420, 5510, 5810, 5820, or 5910) in FIG. 5. For example, the target natural language data may include the natural language string "What is the precipitation from measurement of rain last year?". In another example, the target natural language data may include the natural language string "precipitation from measurement". In another example, the target natural language data may include the natural language string "rain". In another example, the target natural language data may include the natural language string "last year".

The resolved request data from the candidate matching demonstration includes a resolved request expression, in accordance with the defined data-analytics grammar implemented by the data access and analysis system, corresponding to, representing, or expressing, the target natural language data, previously indexed as shown (at 5410, 5420, 5510, 5810, 5820, or 5910) in FIG. 5. For example, the target natural language data from the candidate matching demonstration may include the natural language string "What is the precipitation from measurement of rain last year?" and the corresponding resolved request expression may be "[sum precipitation] [precipitation_type=rain] [date=last year]". In another example, the target natural language data from the candidate matching demonstration may include the natural language string "precipitation from measurement" and the corresponding resolved request expression may be "[sum precipitation]". In another example, the target natural language data from the candidate matching demonstration may include the natural language string "rain" and the corresponding resolved request expression may be "[precipitation_type=rain]". In another example, the target natural language data from the candidate matching demonstration may include the natural language string "last year" and the corresponding resolved request expression may be "[date=last year]".

The structured query language data from the candidate matching demonstration expresses the resolved request data from the candidate matching demonstration, such as in accordance with a defined structured query language implemented by a distributed in-memory database of the data access and analysis system, such as the distributed in-memory database 3300 shown in FIG. 3. For example, the target natural language data from the candidate matching demonstration may include the natural language string “What is the precipitation from measurement of rain last year?”, the corresponding resolved request expression may be “[sum precipitation] [precipitation_type=rain] [date=last year]”, and the structured query language data from the candidate matching demonstration may include “select SUM(Precipitation) from Recorded_Precipitation WHERE (Precipitation_Type=“rain” AND RecordDate=_last_year( ))”. In another example, the target natural language data from the candidate matching demonstration may include the natural language string “precipitation from measurement”, the corresponding resolved request expression may be “[sum precipitation]”, and the structured query language data from the candidate matching demonstration may include “select SUM(Precipitation) from _ Recorded_Precipitation”. In another example, the target natural language data from the candidate matching demonstration may include the natural language string “rain”, the corresponding resolved request expression may be “[precipitation_type=rain]”, and the structured query language data from the candidate matching demonstration may include “select SUM(Precipitation) from _Recorded_Precipitation WHERE (Precipitation_Type=“rain”)”. In another example, the target natural language data from the candidate matching demonstration may include the natural language string “last year”, the corresponding resolved request expression may be “[date=last year]”, and the structured query language data from the candidate matching demonstration may include “select*from Recorded_Precipitation WHERE (RecordDate=_last_year( ))”.

The data source data from the candidate matching demonstration includes one or more data source identifiers, such as one or more column names, wherein the resolved request data from the candidate matching demonstration, the structured query language data from the candidate matching demonstration, or both, indicates, or expresses, a request to obtain data from, or otherwise use, the respective data source. In some implementations, separate, or distinct, data source data may be absent from the candidate matching demonstration, and the data source data may be obtained from the resolved request data from the candidate matching demonstration, the structured query language data from the candidate matching demonstration, or both.

The validation data from the candidate matching demonstration includes positive accuracy determination data, negative accuracy determination data, or both.

The temporal data from the candidate matching demonstration indicates a temporal location, or point in time, corresponding to the indexing of the candidate matching demonstration.

To obtain the candidate matching demonstrations (at 6200), the data access and analysis system, or a component thereof, such as the relational analysis unit, may generate a request for the candidate matching demonstrations. The data access and analysis system, or a component thereof, such as the relational analysis unit, may send, transmit, or otherwise make available the request for the candidate matching demonstrations to another component of the data access and analysis system, such as an indexing unit of the data access and analysis system, such as the indexing unit described with respect to FIG. 5.

To obtain the candidate matching demonstrations (at 6200), the data access and analysis system, or a component thereof, such as the indexing unit, traverses the demonstrations, or validated resolved request data, index. Traversing the demonstrations, or validated resolved request data, index to obtain the candidate matching demonstrations includes identifying previously indexed tuples as candidate matching demonstrations in response to determining that the natural language data (obtained at 6100) is a semantic match with the source, or input, natural language data included in the previously indexed tuple, the target natural language data included in the indexed tuple, or both. For example, whether the natural language data (obtained at 6100) is a semantic match with the source, or input, natural language data included in the previously indexed tuple, or the target natural language data included in the previously indexed tuple, may be determined using a semantic matching algorithm, such as a best matching algorithm, such as BM25.

In some implementations, traversing the available demonstrations, or validated resolved request data, index to obtain the candidate matching demonstrations may include obtaining a matching score with respect to matching the natural language data (obtained at 6100) with the source, or input, natural language data included in the previously indexed tuple. In some implementations, traversing the demonstrations, or validated resolved request data, index to obtain the candidate matching demonstrations may include obtaining a matching score with respect to matching the natural language data (obtained at 6100) with the target natural language data included in the previously indexed tuple.

In some implementations, traversing the demonstrations, or validated resolved request data, index to obtain the candidate matching demonstrations may include obtaining a matching score with respect to matching the natural language data (obtained at 6100) with the source, or input, natural language data included in the previously indexed tuple, obtaining a matching score with respect to matching the natural language data (obtained at 6100) with the target natural language data included in the previously indexed tuple, and obtaining a matching score for the previously indexed tuple as a sum of the matching score for the source, or input, natural language data included in the previously indexed tuple and the matching score with respect to matching the natural language data (obtained at 6100) with the target natural language data included in the previously indexed tuple.

Traversing the demonstrations, or validated resolved request data, index to obtain the candidate matching demonstrations may include obtaining a defined number, count, or cardinality of candidate matching demonstrations, such as ten (10) candidate matching demonstrations, such as in descending matching score order.

Traversing the demonstrations, or validated resolved request data, index to obtain the candidate matching demonstrations may include omitting, skipping, excluding, or filtering, previously indexed tuples other than previously indexed tuples including a positive accuracy determination data value of at least, such as greater than or equal to, one (>=1).

Traversing the demonstrations, or validated resolved request data, index to obtain the candidate matching demonstrations may include omitting, skipping, excluding, or filtering, previously indexed tuples other than previously indexed tuples including a positive accuracy determination data value and a negative accuracy determination value wherein a difference between the positive accuracy determination data value and the negative accuracy determination, such as obtained by subtracting the negative accuracy determination value from the positive accuracy determination data value, of at least, such as greater than or equal to, one (>=1).

In some implementations, obtaining the candidate matching demonstrations includes obtaining the candidate matching demonstrations in descending matching score order.

The data access and analysis system, or a component thereof, such as the relational analysis unit, obtains one or more noun phrases (at 6300) from the natural language input data (obtained at 6100), such as a using a noun phrase chunking model.

The data access and analysis system, or a component thereof, such as the relational analysis unit, filters, sorts, or both, the candidate matching demonstrations (at 6400) to obtain sorted, filtered, candidate matching demonstrations.

For example, the data access and analysis system, or a component thereof, such as the relational analysis unit, may filter the candidate matching demonstrations (at 6400) to obtain filtered candidate matching demonstrations and the data access and analysis system, or a component thereof, such as the relational analysis unit, may sort the filtered candidate matching demonstrations (at 6400) to obtain the sorted, filtered, candidate matching demonstrations.

To filter the candidate matching demonstrations (at 6400), the data access and analysis system, or a component thereof, such as the relational analysis unit, determines whether the target natural language data from a respective candidate matching demonstration includes, or matches with, one or more of the noun phrases (obtained at 6300), which includes determining a number, count, or cardinality, of the noun phrases (obtained at 6300) that match, or are included in, the target natural language data from the respective candidate matching demonstration.

The data access and analysis system, or a component thereof, such as the relational analysis unit, includes, in the filtered candidate matching demonstrations, the candidate matching demonstrations determined to have a number, count, or cardinality, of matching noun phrases greater than or equal to a defined threshold, such as two (2). Candidate matching demonstrations determined to have a number, count, or cardinality, of matching noun phrases less than the defined threshold are omitted, or excluded, from the filtered candidate matching demonstrations.

Sorting the candidate matching demonstrations (at 6400) includes sorting the filtered candidate matching demonstrations in accordance with one or more metrics to obtain the sorted, filtered, candidate matching demonstrations. For example, the data access and analysis system, or a component thereof, such as the relational analysis unit, may sort the filtered candidate matching demonstrations in accordance with the temporal data included in the respective candidate matching demonstrations, such as into recency order. In another example, the data access and analysis system, or a component thereof, such as the relational analysis unit, may sort the filtered candidate matching demonstrations in accordance with the positive accuracy determination data value included in the respective candidate matching demonstrations, such as in descending order. In some implementations, the data access and analysis system, or a component thereof, such as the relational analysis unit, may sort the filtered candidate matching demonstrations in accordance with the temporal data, such as into recency order, and may subsequently sort the temporally ordered filtered candidate matching demonstrations in accordance with the positive accuracy determination data value included in the respective candidate matching demonstrations, such as in descending order.

Sorting and filtering the candidate matching demonstrations (at 6400) includes obtaining a defined number, count, or cardinality, such as three, of the sorted, filtered, candidate matching demonstrations, such as in descending order, as selected demonstrations.

The data access and analysis system, or a component thereof, such as the relational analysis unit, determines (at 6500) whether the prompt context data includes data source data indicating data sources, such as columns, corresponding to the data sources, such as columns, indicated by one or more of the selected determinations (obtained at 6400), such as on a per-data source basis. For example, the data access and analysis system, or a component thereof, such as the relational analysis unit, may determine (at 6500) that a data source identifier, such as a column identifier, such as a column name, included in the data source data from a selected determination (obtained at 6400) is present in the prompt context data (as shown at 6510). In another example, the data access and analysis system, or a component thereof, such as the relational analysis unit, may determine (at 6500) that a data source identifier, such as a column identifier, such as a column name, included in the data source data from a selected determination (obtained at 6400) is absent from the prompt context data (as shown at 6520).

The data access and analysis system, or a component thereof, such as the relational analysis unit, includes the data source identifiers, such as column identifiers, determined (at 6500) to be absent, or omitted, from the prompt context data in the prompt context data (at 6600).

In some implementations, determining whether the prompt context data includes the data source data (at 6500) and including the data source data in the prompt context data (at 6600) may be omitted, or skipped, as indicated by the broken line border (at 6500, 6600).

The data access and analysis system, or a component thereof, such as the relational analysis unit, outputs the selected demonstrations data (at 6700). For example, outputting the selected demonstrations data (at 6700) may include including the selected demonstrations data in the large language model input data, such as subsequent to the prompt context data, such as shown (at 4200) in FIG. 4.

Figure 7:
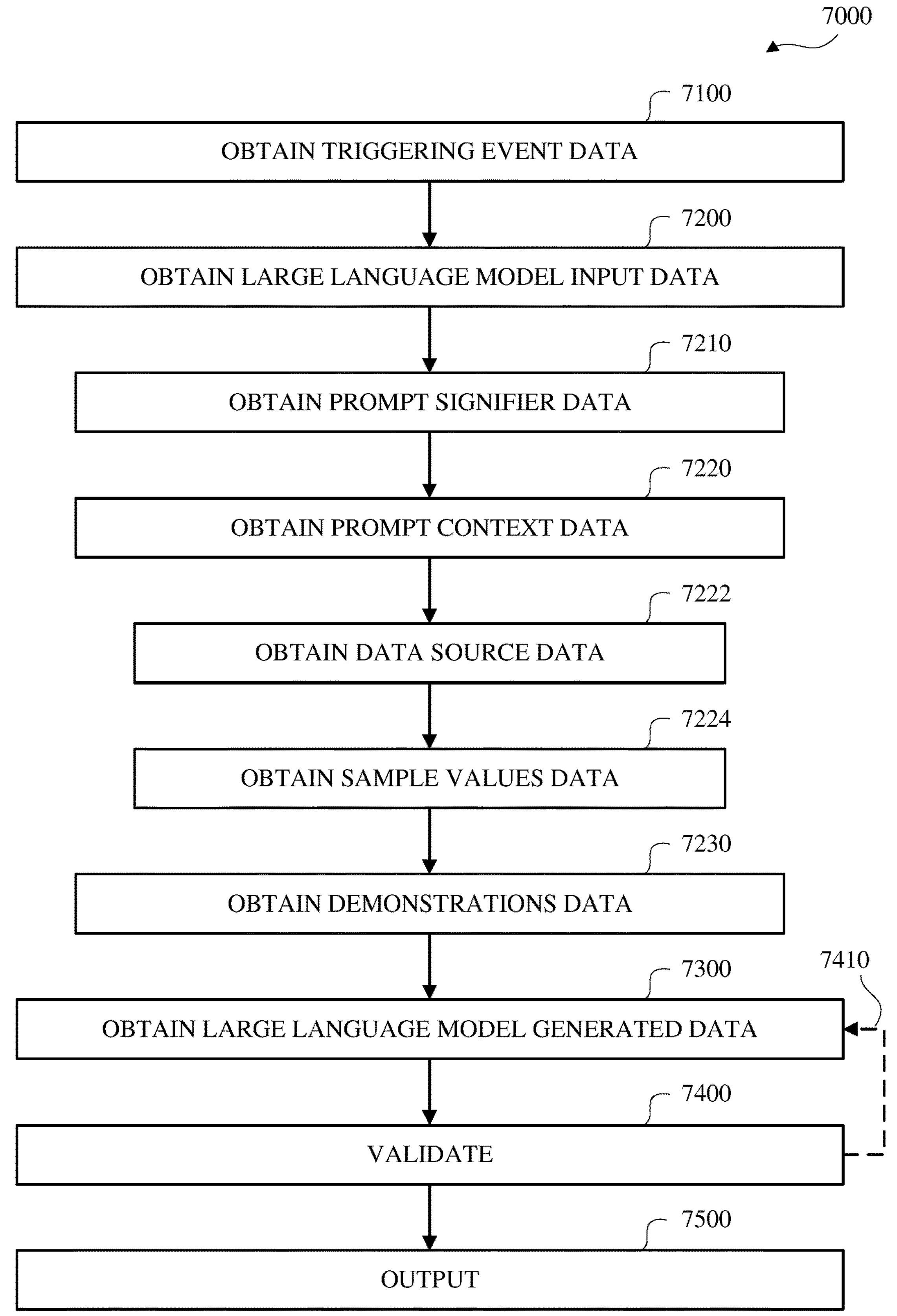
FIG. 7 is a flowchart of an example of obtaining artificial data analysis request data in a data access and analysis system.

FIG. 7 is a flowchart of an example of obtaining artificial data analysis request data 7000 in a data access and analysis system. The data access and analysis system may be similar to the data access and analysis system 3000 shown in FIG. 3, except as is described herein or as is otherwise clear from context. The data access and analysis system may implement obtaining artificial data analysis request data 7000.

Obtaining artificial data analysis request data 7000 includes obtaining one or more artificial data analysis requests. An artificial data analysis request is a data analysis request automatically generated by the data access and analysis system, or a component thereof, such as the relational analysis unit, with respect to a data source. The artificial data analysis request includes a data analysis request string, which is autonomously generated by the data access and analysis system, or a component thereof, such as the relational analysis unit. The data analysis request string is similar to data expressing usage intent, except as is described herein or as is otherwise clear from context. For example, the data analysis request string is automatically generated by the data access and analysis system, or a component thereof, such as the relational analysis unit in the absence of input, such as user input, indicating the data analysis request string. The artificial data analysis request includes a resolved request corresponding to the data analysis request string. The artificial data analysis request includes description data including a text description of the artificial data analysis request.

Obtaining artificial data analysis request data 7000 includes obtaining triggering event data (at 7100), obtaining large language model input data (at 7200), obtaining large language model generated data (at 7300), validating the large language model generated data (at 7400), and outputting the large language model generated data (at 7500).

The data access and analysis system, or a component thereof, such as the relational analysis unit, obtains triggering event data (at 7100) in accordance with one or more defined events (event definitions), or triggers. In the absence of a detected event, or trigger, obtaining artificial data analysis request data 7000 may be otherwise omitted or skipped.

The data access and analysis system, or the component thereof, such as the relational analysis unit, may detect, or determine, (at 7100) an occurrence of an event, or trigger (triggering event) indicating that a previously unavailable, or inaccessible, data source (primary data source), such as a table or a worksheet, is available in, or accessible to, the data access and analysis system. In response to, or in combination with, detecting or determining the occurrence of the triggering event, the data access and analysis system, or a component thereof, such as the relational analysis unit, obtains triggering event data including primary data source data indicating one or more one or more primary data source identifiers. A primary data source identifier is an identifier, such as unique identifier, of a table available in, or accessible by, the data access and analysis system or a worksheet (worksheet object) in the data access and analysis system.

For example, in response to the occurrence of an event, or trigger (detected at 7100) indicating that a worksheet is indexed in the data access and analysis system, the data access and analysis system, or a component thereof, such as the relational analysis unit, may obtain a unique identifier for the worksheet as the primary data source identifier.

The data access and analysis system, or the component thereof, such as the relational analysis unit, may detect, or determine, (at 7100) an occurrence of an event, or trigger in response to a modification of ontological data for a data source, such as a table or a column, in, or accessible by, the data access and analysis system. For example, the data access and analysis system, or the component thereof, such as the relational analysis unit, may detect, or determine, (at 7100) an occurrence of an event, or trigger in response to the inclusion of a previously unavailable column in a table in, or accessible by, the data access and analysis system, and the data access and analysis system, or a component thereof, such as the relational analysis unit, may obtain a unique identifier for the table as the primary data source identifier. In another example, the data access and analysis system, or the component thereof, such as the relational analysis unit, may detect, or determine, (at 7100) an occurrence of an event, or trigger in response to the removal, deletion, or exclusion, of a previously available column in a table in, or accessible by, the data access and analysis system, and the data access and analysis system, or a component thereof, such as the relational analysis unit, may obtain a unique identifier for the table as the primary data source identifier. In another example, the data access and analysis system, or the component thereof, such as the relational analysis unit, may detect, or determine, (at 7100) an occurrence of an event, or trigger in response to a change, or modification, of a data source identifier, such as a column, for a data source in, or accessible by, the data access and analysis system, and the data access and analysis system, or a component thereof, such as the relational analysis unit, may obtain a unique identifier for the table as the primary data source identifier.

The data access and analysis system, or the component thereof, such as the relational analysis unit, may detect, or determine, (at 7100) an occurrence of an event, or trigger indicating a change, or modification, of a data value, such as a bit, or flag, indicating whether obtaining artificial data analysis request data is enabled, or disabled, in the data access and analysis system for a primary data source, and the data access and analysis system, or a component thereof, such as the relational analysis unit, may obtain a unique identifier for the primary data source as the primary data source identifier.

The data access and analysis system, or the component thereof, such as the relational analysis unit, may detect, or determine, (at 7100) an occurrence of an event, or trigger indicating a request to obtain artificial data analysis request data for a primary data source, and the data access and analysis system, or a component thereof, such as the relational analysis unit, may obtain a unique identifier for the primary data source as the primary data source identifier.

The data access and analysis system, or the component thereof, such as the relational analysis unit, may detect, or determine, (at 7100) an occurrence of an event, or trigger indicating that an analytical object, such as a worksheet, such as the worksheet 4010 shown in FIG. 4, is indexed, or reindexed, in the data access and analysis system, and the data access and analysis system, or a component thereof, such as the relational analysis unit, may obtain a unique identifier for the worksheet as the primary data source identifier.

Although described with respect to a primary data source identifier, the triggering event data may indicate multiple primary data sources and obtaining artificial data analysis request data 7000, or one or more portions thereof, may be performed for the primary data sources, such as on a per primary data source basis.

The data access and analysis system, or the component thereof, such as the relational analysis unit, obtains large language model input data (at 7200), such as in response to detecting a trigger (at 7100). For example, the data access and analysis system, or the component thereof, such as the relational analysis unit, may obtain the large language model input data (at 7200) in response to detecting the trigger or event (at 7100). Obtaining the large language model input data (at 7200) may be similar to obtaining large language model input data as shown (at 4200) in FIG. 4, except as is described herein or as is otherwise clear from context.

Obtaining the large language model input data (at 7200) includes the data access and analysis system, or a component thereof, obtaining prompt signifier data (at 7210), obtaining prompt context data (at 7220), and obtaining demonstrations data (at 7230).

The data access and analysis system, or the component thereof, such as the relational analysis unit, obtains the prompt signifier data (at 7210). The prompt signifier data is natural language data, such as "Generate SQL given the question and table to answer the question correctly. Make sure only columns in the table provided are used in the generated SQL." The prompt signifier data indicates, to the large language model, the task assigned to, or requested of, the large language model. Obtaining the prompt signifier data (at 7210) may be similar to obtaining prompt signifier data as shown (at 4200) in FIG. 4, except as is described herein or as is otherwise clear from context. Obtaining the large language model input data (at 7200) includes the data access and analysis system, or a component thereof, including the prompt signifier data in the large language model input data.

The data access and analysis system, or the component thereof, such as the relational analysis unit, obtains the prompt context data (at 7220). The data access and analysis system, or a component thereof, obtains the prompt context data using one or more data sources, utility data, such as user-agnostic utility data, such as system configuration data, user-specific utility data, such as utilization data, or both user-agnostic and user-specific utility data, object ontological data, such as object relationship data, or a combination thereof. The object relationship data may be, or may include, aggregated data that indicates a number, count, or cardinality of objects in the data access and analysis system that are related to an object in the data access and analysis system. For example, a first object in the data access and analysis system may represent a column in a table in a database, and the object relationship data may include data indicating a number, count, or cardinality, of analytical objects that include one or more references to the first object as a representation of the column. The prompt context data indicates, to the large language model, data for the large language model to use to respond to a request for artificial data analysis request data. Obtaining the prompt context data (at 7200) may be similar to obtaining prompt context data as shown (at 4200) in FIG. 4, except as is described herein or as is otherwise clear from context.

Obtaining the prompt context data (at 7220) includes obtaining data source data (at 7222), including one or more secondary data source identifiers, such as column identifiers, and corresponding data type data. Obtaining the data source data (at 7222) including the secondary data source identifiers and corresponding data type data includes obtaining data source identifiers for one or more secondary data sources associated with the primary data source, or primary data sources, indicated by the triggering event data (obtained at 7100).

For example, the triggering event data (obtained at 7100) may indicate a primary data source identifier corresponding to a worksheet analytical object and the data access and analysis system, or a component thereof, such as the relational analysis unit, may obtain one or more column identifiers indicated, or identified, in the worksheet analytical object as available secondary data source identifiers (at 7222).

To obtain the secondary data source identifiers, the data access and analysis system, or a component thereof, such as the relational analysis unit, may generate, or otherwise obtain, a request, or message indicating a request, for ontological data for the primary data source, which may indicate the primary data source identifier. The data access and analysis system, or a component thereof, such as the relational analysis unit, may send, transmit, or otherwise make available the request for ontological data for the primary data source to another component of the data access and analysis system, such as a distributed in-memory ontology unit of the data access and analysis system, such as the distributed in-memory ontology unit 3500 shown in FIG. 3.

The data access and analysis system, or a component thereof, such as the relational analysis unit, may receive, read, obtain, or otherwise access, ontological data for the primary data source, such as from the distributed in-memory ontology unit, indicating one or more available secondary data source identifiers for the primary data source. In some implementations, obtaining the available secondary data source identifiers (at 7200) may include obtain the available secondary data source identifiers from the primary data source, or primary data sources, indicated by the triggering event data (obtained at 7100), using utility data, such as user-agnostic utility data, such as system configuration data, user-specific utility data, such as utilization data, or both user-agnostic and user-specific utility data (probabilistic utility data). For example, the available secondary data source identifiers may be obtained as ranked, sorted, or otherwise ordered, in accordance with the utility data, previously stored in, or otherwise accessible by, the data access and analysis system, or a component thereof, such as the relational analysis unit. The ontological data for the primary data source may include data type data, utility data, or both, for the respective available secondary data sources indicated by the available secondary data source identifiers.

The data access and analysis system, or a component thereof, identifies the secondary data source identifiers having the highest, maximal, or greatest, utility, as indicated by the utility data (descending utility order). The data access and analysis system, or a component thereof, includes the secondary data source identifiers, and corresponding data types for the respective secondary data sources in the prompt context data.

The data access and analysis system, or the component thereof, such as the relational analysis unit, obtains current secondary data source identifiers (at 7222), or a first subset thereof, from the available secondary data source identifiers in accordance with a defined maximum number, count, or cardinality, such as two-hundred fifty (250), of current secondary data source identifiers, a defined token limit for the large language model, such as a defined number, count, or cardinality, such as four thousand (4000), of tokens, or both.

In some implementations, the number, count, or cardinality, of available secondary data source identifiers may be less than, or equal to, the defined maximum number, count, or cardinality, of current secondary data source identifiers and the number, count, or cardinality, of tokens for including the secondary data source identifiers in the prompt context data may be less than, or equal to, the defined token limit for the large language model, and the available secondary data source identifiers may be obtained as current secondary data source identifiers.

In some implementations, the number, count, or cardinality, of available secondary data source identifiers may be greater than the defined maximum number, count, or cardinality, of current secondary data source identifiers, and one or more of the available secondary data source identifiers, such as the available secondary data source identifiers having the lowest utility scores (ascending utility score order) among the available secondary data source identifiers, may be omitted, or excluded, from the current secondary data source identifiers in accordance with the defined number, count, or cardinality, of current secondary data source identifiers.

In some implementations, the number, count, or cardinality, of tokens corresponding to the available secondary data source identifiers that would otherwise be included in the prompt context data may be greater than the defined token limit for the large language model, and one or more of the available secondary data source identifiers, such as the available secondary data source identifiers having the lowest utility scores (ascending utility score order) among the available secondary data source identifiers, may be omitted, or excluded, from the current secondary data source identifiers such that the number, count, or cardinality, of tokens corresponding to the current secondary data source identifiers is less than, or equal to, the defined token limit for the large language model.

In some implementations, a first subset of secondary data source identifiers includes less than the defined maximum number, count, or cardinality of secondary data source identifiers, the number, count, the number, count, or cardinality, of tokens for including the first subset of secondary data source identifiers in the prompt context data is less than the defined token limit for the large language model, or both, and the data access and analysis system, or a component thereof, obtains, or identifies, a second subset of the secondary data source identifiers in accordance with the primary data source, or primary data sources, indicated by the triggering event data (obtained at 7100), wherein the second subset of the secondary data source identifiers includes less than or equal to a difference between the defined maximum number, count, or cardinality of secondary data source identifiers and the number, count, or cardinality of the first subset of secondary data source identifiers, which may be obtained by subtracting the number, count, or cardinality of the first subset of secondary data source identifiers from the defined maximum number, count, or cardinality of secondary data source identifiers, subject to the token limit. The data access and analysis system, or a component thereof, identifies the second subset of the secondary data source identifiers from the primary data source, or primary data sources, indicated by the triggering event data (obtained at 7100) using ontological data indicating a number, count, or cardinality, of previously generated analytical objects in the data access and analysis system that reference, or have a defined relationship to, the respective secondary data source identifiers (related analytical objects or relations data) from the first subset. The data access and analysis system, or a component thereof, identifies the second subset of the secondary data source identifiers having the highest, maximal, or greatest, number, count, or cardinality, of related analytical objects (descending relations order). The data access and analysis system, or a component thereof, includes the second subset of secondary data source identifiers in the prompt context data.

In some implementations, the first subset of secondary data source identifiers and the second subset of secondary data source identifiers, in combination, includes less than the defined maximum number, count, or cardinality of secondary data source identifiers, the number, count, the number, count, or cardinality, of tokens for including the first subset of secondary data source identifiers and the second subset of secondary data source identifiers in the prompt context data is less than the defined token limit for the large language model, or both, and the data access and analysis system, or a component thereof, obtains, or identifies, a third subset of the secondary data source identifiers from the primary data source, or primary data sources, indicated by the triggering event data (obtained at 7100), wherein the third subset of the secondary data source identifiers includes less than or equal to a difference between the defined maximum number, count, or cardinality of secondary data source identifiers and a sum of the number, count, or cardinality of the first subset of secondary data source identifiers and the number, count, or cardinality of the second subset of secondary data source identifiers, which may be obtained by subtracting the sum of the number, count, or cardinality of the first subset of secondary data source identifiers and the number, count, or cardinality of the second subset of secondary data source identifiers from the defined maximum number, count, or cardinality of secondary data source identifiers. The data access and analysis system, or a component thereof, identifies the third subset of the secondary data source identifiers randomly, or pseudo-randomly. The data access and analysis system, or a component thereof, includes the third subset of secondary data source identifiers in the prompt context data.

In some implementations, obtaining the first subset of secondary data source identifiers may be omitted, wherein obtaining the prompt context data includes one or more of obtaining the second subset of secondary data source identifiers and obtaining the third subset of secondary data source identifiers. In some implementations, obtaining the second subset of secondary data source identifiers may be omitted, wherein obtaining the prompt context data includes one or more of the first subset of secondary data source identifiers and the third subset of secondary data source identifiers. In some implementations, obtaining the third subset of secondary data source identifiers may be omitted, wherein obtaining the prompt context data includes one or more of obtaining the first subset of secondary data source identifiers and obtaining the second subset of secondary data source identifiers.

In some implementations, the secondary data source identifiers may include a diverse plurality of attribute secondary data source identifiers, measure secondary data source identifiers, and temporal location secondary data source identifiers.

Obtaining the prompt context data (at 7220) includes obtaining sample values data (at 7224). To obtain the sample values data (at 7224), the data access and analysis system, or a component thereof, such as the relational analysis unit, obtains the sample values data, such as zero or more, such as three, sample value per secondary data source identifier, for the secondary data source, or sources, indicated by the secondary data source identifiers included in the prompt context data, from an index in the data access and analysis system, such as the constituent data index.

For example, the data access and analysis system, or a component thereof, such as a relational analysis unit of the data access and analysis system, such as the relational analysis unit 3700 shown in FIG. 3, may traverse the index in accordance with the secondary data source identifiers included in the prompt context data to obtain the sample values data. In some implementations, sample values data may be unavailable for one or more of the current secondary data sources indicated by the secondary data source identifiers included in the prompt context data.

The data access and analysis system, or a component thereof, such as the relational analysis unit, includes the sample values data in the prompt context data.

Obtaining the large language model input data (at 7200) includes the data access and analysis system, or a component thereof, including the prompt context data in the large language model input data, such as subsequent to the prompt signifier data.

The data access and analysis system, or a component thereof, such as the relational analysis unit, obtains the demonstrations data (at 7230), which may be defined demonstrations data.

Obtaining the large language model input data (at 7200) includes the data access and analysis system, or a component thereof, including the demonstrations data in the large language model input data, such as subsequent to the prompt context data.

The data access and analysis system, or a component thereof, obtains the large language model generated data (at 7300). To obtain the large language model generated data, the data access and analysis system, or a component thereof, such as the relational analysis unit, sends, transmits, or otherwise makes available, the large language model input data to a large language model, such as the large language model 4030 shown in FIG. 3.

The large language model receives, reads, obtains, or otherwise accesses, the large language model input data and automatically generates corresponding, or resulting, large language model generated data, such as in response to receiving the large language model input data. The large language model outputs, sends, transmits, or otherwise makes available, the language model generated data to the data access and analysis system, or a component thereof.

The data access and analysis system, or a component thereof, receives, reads, obtains, or otherwise accesses, the large language model generated data (at 7300), such as in response to sending the large language model input data to the large language model.

The large language model generated data includes one or more candidate artificial data analysis request tuples, such as a defined, such as configured, number, count, or cardinality of candidate artificial data analysis request tuples, such as fifteen (15) or twenty (20) candidate artificial data analysis request tuples. An artificial data analysis request tuple includes a large language model generated, or simulated, natural language data portion, a corresponding large language model generated, or simulated, resolved request data portion, and a corresponding large language model generated, or simulated, description data portion.

The large language model generated natural language data portion includes a large language model generated request for data from the data access and analysis system, or a component thereof, such as data from, or based on data from, one or more of the data sources indicated by the secondary data source identifiers included in the prompt context data, expressed in accordance with a natural language, as automatically generated by the large language model.

The large language model generated resolved request data portion includes large language model generated resolved request data (large language model generated resolved request) representing, or expressing, the large language model generated natural language request for data indicated by the corresponding large language model generated natural language data portion. A large language model generated resolved request, which may be database and visualization agnostic, may be expressed or communicated as string data corresponding to an ordered sequence of tokens. The large language model generated resolved request data is similar to a resolved request, as described herein, except as is described herein or as is otherwise clear from context. For example, the large language model generated resolved request data may omit, or exclude, tokenization binding data.

In an example, an artificial data analysis request tuple may include a large language model generated natural language data portion that includes the string "How many observation stations are in the northeast?" and a corresponding large language model generated resolved request portion that includes the string "count [station] [region='northeast']".

The large language model generated description data portion includes a text, such as a string, description of the large language model generated resolved request data. In an example, an artificial data analysis request tuple may include a large language model generated natural language data portion that includes the string "How many observation stations are in the northeast?", a corresponding large language model generated resolved request portion that includes the string "count [station] [region='northeast']", and the corresponding large language model generated description data portion may include the text "Observation stations in the northeast."

The data access and analysis system, or a component thereof, such as the relational analysis unit, validates the large language model generated data (at 7400). Validating the large language model generated data (at 7400) includes validating the large language model generated resolved request data, such as on a per-candidate artificial data analysis request tuple basis, such as iteratively, using parallel processing, both.

To validate the large language model generated resolved request data from a respective candidate artificial data analysis request tuple, the data access and analysis system, or a component thereof, such as the relational analysis unit, validates the large language model generated resolved request data by validating the respective tokens included in the large language model generated resolved request data in accordance with a defined data-analytics grammar implemented by the data access and analysis system.

The data access and analysis system, or a component thereof, such as the relational analysis unit, may determine that one or more of the candidate artificial data analysis request tuples include invalid large language model generated resolved request data and may identify the respective candidate artificial data analysis request tuple as invalid.

The data access and analysis system, or a component thereof, such as the relational analysis unit, may determine that one or more of the candidate artificial data analysis request tuples include valid large language model generated resolved request data and may identify the respective candidate artificial data analysis request tuple as valid.

In some implementations, validating the large language model generated data (at 7400) includes determining whether the number, count, or cardinality of candidate artificial data analysis request tuples identified as valid is less than the defined, such as configured, number, count, or cardinality of candidate artificial data analysis request tuples.

In some implementations, such as wherein one or more of the candidate artificial data analysis request tuples is identified as invalid, the data access and analysis system, or a component thereof, such as the relational analysis unit, determines, such as subsequent to validating the candidate artificial data analysis request tuples, that the number, count, or cardinality of candidate artificial data analysis request tuples identified as valid is less than the defined, such as configured, number, count, or cardinality of candidate artificial data analysis request tuples, the data access and analysis system, or a component thereof, such as the relational analysis unit, obtains updated large language model generated data, as indicated by the broken directional line (at 7410).

Obtaining the updated large language model generated data includes, in one or more iterations, such as up to a defined maximum number, count, or cardinality, of iterations, such as up to a maximum of five (5) iterations, obtaining updated large language model input data including the large language model input data (obtained at 7200), such as in a first iteration, or the updated large language model input data from a previous iteration, such as in a second iteration, a third iteration, a fourth iteration, or a fifth iteration, and including the candidate artificial data analysis request tuples identified as invalid in the respective iteration, along with data identifying the invalid artificial data analysis request tuples as invalid, obtains the updated large language model generated data (at 7300) by sending, transmitting, or otherwise making available, the updated large language model input data to the large language model, and validates the updated large language model generated data (at 7400).

The data access and analysis system, or a component thereof, such as the relational analysis unit, outputs the artificial data analysis request data (at 7500).

In response to determining that the large language model generated data, or the updated large language model generated data, includes the number, count, or cardinality of candidate artificial data analysis request tuples valid artificial data analysis request tuples, or in response to the maximum number, count, or cardinality of iterations, for candidate artificial data analysis request tuples, other than candidate artificial data analysis request tuples identified as including invalid large language model generated resolved request data, the data access and analysis system, or a component thereof, such as a semantic interface unit of the data access and analysis system, such as the semantic interface unit 3600 shown in FIG. 3, includes the valid artificial data analysis request tuples in the artificial data analysis request data.

In some implementations, the data access and analysis system, or a component thereof, such as the semantic interface unit, generates, or otherwise obtains, for a respective valid candidate artificial data analysis request tuple, a corresponding automatically generated data query automatically generated in accordance with a defined structured query language implemented by the data source, and includes the corresponding automatically generated data query with the respective valid candidate artificial data analysis request tuple in the artificial data analysis request data.

Outputting the artificial data analysis request data may include storing the artificial data analysis request data, such as in a data storage structure of the data access and analysis system and associated with the data source.

Outputting the artificial data analysis request data may include outputting the artificial data analysis request data, or one or more portions thereof, for presentation to a user of the data access and analysis system, such via a system access interface unit of the data access and analysis system, such as the system access interface unit 3900 of FIG. 3.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random-access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine," "identify," "obtain," and "form" or any variations thereof, includes selecting, ascertaining, computing, looking up, receiving, determining, establishing, obtaining, or otherwise identifying or determining in any manner whatsoever using one or more of the devices and methods shown and described herein.

As used herein, the term "computing device" includes any unit, or combination of units, capable of performing any method, or any portion or portions thereof, disclosed herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Attributes may comprise any data characteristic, category, content, etc. that in one example may be non-quantifiable or non-numeric. Measures may comprise quantifiable numeric values such as sizes, amounts, degrees, etc. For example, a first column containing the names of states may be considered an attribute column and a second column containing the numbers of orders received for the different states may be considered a measure column.

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, such as a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:

obtaining, by a data access and analysis system, artificial data analysis request data, wherein obtaining the artificial data analysis request data includes:

obtaining triggering event data indicating an occurrence of an event in the data access and analysis system identified in accordance with one or more event definitions in the data access and analysis system, wherein obtaining the triggering event data includes obtaining primary data source data including at least one primary data source identifier, wherein a primary data source is identified by the at least one primary data source identifier;

in response to obtaining the triggering event data, obtaining large language model input data for obtaining the artificial data analysis request data, wherein obtaining the large language model input data includes:

obtaining prompt context data, wherein obtaining the prompt context data includes:

obtaining data source data including at least one secondary data source identifier associated with the primary data source in accordance with the triggering event data;

including the data source data in the prompt context data;

obtaining sample values data in accordance with the at least one secondary data source identifier; and including the sample values data in the prompt context data; and including the prompt context data in the large language model input data;

obtaining large language model generated data output by a large language model in response to the large language model input data, wherein the large language model generated data includes at least one candidate artificial data analysis request tuple, wherein a respective candidate artificial data analysis request tuple includes a large language model generated natural language data portion, a corresponding large language model generated resolved request data portion, and a corresponding large language model generated description data portion; and validating the large language model generated data, wherein validating the large language model generated data includes validating the at least one candidate artificial data analysis request tuple in accordance with a defined data-analytics grammar implemented by the data access and analysis system; and outputting at least a portion of the artificial data analysis request data for presenting to a user.

2. The method of claim 1, wherein:

obtaining the triggering event data includes obtaining data indicating that a previously unavailable data source indicated by the at least one primary data source identifier is available to the data access and analysis system.

3. The method of claim 1, wherein:

the at least one primary data source identifier identifies a table in a database.

4. The method of claim 1, wherein:

the at least one primary data source identifier identifies a worksheet in the data access and analysis system, wherein the worksheet references a table in a database.

5. The method of claim 4, wherein:

the triggering event data is obtained in response to indexing the worksheet in the data access and analysis system.

6. The method of claim 1, wherein:

the triggering event data is obtained in response to a modification of ontological data for a data source identified by the at least one primary data source identifier.

7. The method of claim 1, wherein:

the triggering event data is obtained in response to a modification of data in the data access and analysis system indicating whether obtaining artificial data analysis request data is enabled for a data source identified by the at least one primary data source identifier.

8. The method of claim 1, wherein:

the triggering event data is obtained in response to obtaining, by the data access and analysis system, a request to obtain artificial data analysis request data for a data source identified by the at least one primary data source identifier.

9. The method of claim 1, wherein:

obtaining the data source data including the at least one secondary data source identifier includes obtaining data type data corresponding to the at least one secondary data source identifier.

10. The method of claim 1, wherein:

obtaining the data source data including the at least one secondary data source identifier includes obtaining, from a distributed in-memory ontology unit of the data access and analysis system, ontological data for the primary data source, the ontological data for the primary data source indicating the at least one secondary data source identifier.

11. The method of claim 1, wherein obtaining the data source data including the at least one secondary data source identifier includes:

obtaining a plurality of secondary data source identifiers that has a cardinality that is greater than a defined maximum cardinality of secondary data source identifiers;

obtaining, by the data access and analysis system, utility scores for the secondary data source identifiers; and omitting secondary data source identifiers from the plurality of secondary data source identifiers in ascending utility score order such that the cardinality of the plurality of secondary data source identifiers is the defined maximum cardinality.

12. The method of claim 11, wherein obtaining the data source data including the at least one secondary data source identifier includes:

obtaining a first subset of the secondary data source identifiers in accordance with the triggering event data; and in response to a determination that the first subset of the secondary data source identifiers has a cardinality that is less than the defined maximum cardinality of secondary data source identifiers, obtaining a second subset of the secondary data source identifiers in accordance with ontological data for the primary data source identified by the at least one primary data source identifier, wherein the ontological data includes relations data that indicates a respective cardinality of previously generated analytical objects in the data access and analysis system that reference a respective secondary data source identifier from the first subset of the secondary data source identifiers, wherein the second subset of the secondary data source identifiers is obtained in descending relations order in accordance with the relations data.

13. The method of claim 12, wherein obtaining the data source data including the at least one secondary data source identifier includes:

in response to a determination that a combination of the first subset of the secondary data source identifiers and the second subset of the secondary data source identifiers has a cardinality that is less than the defined maximum cardinality of secondary data source identifiers, obtaining a third subset of the secondary data source identifiers pseudo-randomly, such that a combination of the first subset of the secondary data source identifiers, the second subset of the secondary data source identifiers, and the third subset of the secondary data source identifiers has a cardinality that is less than or equal to the defined maximum cardinality of secondary data source identifiers.

14. The method of claim 1, wherein obtaining the sample values data includes:

obtaining the sample values data from an index in the data access and analysis system.

15. The method of claim 1, wherein:

the at least one candidate artificial data analysis request tuple includes a plurality of candidate artificial data analysis request tuples; and obtaining the artificial data analysis request data includes:

in response to a determination that, subsequent to validating the large language model generated data, a cardinality of valid candidate artificial data analysis request tuples from the plurality of candidate artificial data analysis request tuples is less than a defined cardinality of candidate artificial data analysis request tuples, obtaining updated large language model generated data; and using the updated large language model generated data as the large language model generated data.

16. The method of claim 15, wherein:

validating the large language model generated data includes:

identifying one or more of the plurality of candidate artificial data analysis request tuples as invalid; and removing the one or more of the plurality of candidate artificial data analysis request tuples identified as invalid from the plurality of candidate artificial data analysis request tuples; and obtaining the updated large language model generated data includes:

obtaining updated large language model input data including:

the large language model input data; and the one or more of the plurality of candidate artificial data analysis request tuples identified as invalid along with data identifying the one or more of the plurality of candidate artificial data analysis request tuples identified as invalid as invalid; and obtaining the updated large language model generated data output by the large language model in response to the updated large language model input data.

17. An apparatus for use in a data access and analysis system, the apparatus comprising:

a non-transitory computer readable medium; and a processor configured to execute instructions stored on the non-transitory computer readable medium to:

obtain artificial data analysis request data, wherein to obtain the artificial data analysis request data the processor executes the instructions to:

obtain triggering event data indicating an occurrence of an event in the data access and analysis system identified in accordance with one or more event definitions in the data access and analysis system, wherein to obtain the triggering event data the processor executes the instructions to obtain primary data source data that includes at least one primary data source identifier, wherein a primary data source is identified by the at least one primary data source identifier;

in response to the triggering event data, obtain large language model input data for obtaining the artificial data analysis request data, wherein to obtain the large language model input data the processor executes the instructions to:

obtain prompt context data, wherein to obtain the prompt context data the processor executes the instructions to:

obtain data source data that includes at least one secondary data source identifier associated with the primary data source in accordance with the triggering event data;

include the data source data in the prompt context data;

obtain sample values data in accordance with the at least one secondary data source identifier; and include the sample values data in the prompt context data; and include the prompt context data in the large language model input data;

obtain large language model generated data output by a large language model in response to the large language model input data, wherein the large language model generated data includes at least one candidate artificial data analysis request tuple, wherein a respective candidate artificial data analysis request tuple includes a large language model generated natural language data portion, a corresponding large language model generated resolved request data portion, and a corresponding large language model generated description data portion; and validate the large language model generated data, wherein to validate the large language model generated data the processor executes the instructions to validate the at least one candidate artificial data analysis request tuple in accordance with a defined data-analytics grammar implemented by the data access and analysis system; and output at least a portion of the artificial data analysis request data for presentation to a user.

18. The apparatus of claim 17, wherein:

the at least one candidate artificial data analysis request tuple includes a plurality of candidate artificial data analysis request tuples; and to obtain the artificial data analysis request data the processor executes the instructions to:

in response to a determination that, subsequent to the validation of the large language model generated data, a cardinality of valid candidate artificial data analysis request tuples from the plurality of candidate artificial data analysis request tuples is less than a defined cardinality of candidate artificial data analysis request tuples, obtain updated large language model generated data; and use the updated large language model generated data as the large language model generated data.

19. A non-transitory computer-readable storage medium, comprising executable instructions that, when executed by a processor, facilitate performance of operations, comprising:

obtaining, by a data access and analysis system, artificial data analysis request data, wherein obtaining the artificial data analysis request data includes:

obtaining triggering event data indicating an occurrence of an event in the data access and analysis system identified in accordance with one or more event definitions in the data access and analysis system, wherein obtaining the triggering event data includes obtaining primary data source data including at least one primary data source identifier, wherein a primary data source is identified by the at least one primary data source identifier;

in response to obtaining the triggering event data, obtaining large language model input data for obtaining the artificial data analysis request data, wherein obtaining the large language model input data includes:

obtaining prompt context data, wherein obtaining the prompt context data includes:

obtaining data source data including at least one secondary data source identifier associated with the primary data source in accordance with the triggering event data;

including the data source data in the prompt context data;

obtaining sample values data in accordance with the at least one secondary data source identifier; and including the sample values data in the prompt context data; and including the prompt context data in the large language model input data;

obtaining large language model generated data output by a large language model in response to the large language model input data, wherein the large language model generated data includes at least one candidate artificial data analysis request tuple, wherein a respective candidate artificial data analysis request tuple includes a large language model generated natural language data portion, a corresponding large language model generated resolved request data portion, and a corresponding large language model generated description data portion; and validating the large language model generated data, wherein validating the large language model generated data includes validating the at least one candidate artificial data analysis request tuple in accordance with a defined data-analytics grammar implemented by the data access and analysis system; and outputting at least a portion of the artificial data analysis request data for presenting to a user.

20. The non-transitory computer-readable storage medium of claim 19, wherein:

the at least one candidate artificial data analysis request tuple includes a plurality of candidate artificial data analysis request tuples; and obtaining the artificial data analysis request data includes:

in response to a determination that, subsequent to validating the large language model generated data, a cardinality of valid candidate artificial data analysis request tuples from the plurality of candidate artificial data analysis request tuples is less than a defined cardinality of candidate artificial data analysis request tuples, obtaining updated large language model generated data; and using the updated large language model generated data as the large language model generated data.

* * * * *